United States Patent
Babaei

(10) Patent No.: US 11,895,727 B2
(45) Date of Patent: *Feb. 6, 2024

(54) DATA TRANSMISSION IN INACTIVE STATE

(71) Applicant: PanPsy Technologies, LLC, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,126

(22) Filed: Feb. 23, 2023

(65) Prior Publication Data

US 2023/0199899 A1 Jun. 22, 2023

Related U.S. Application Data

(63) Continuation of application No. 17/843,981, filed on Jun. 18, 2022, now Pat. No. 11,627,633, which is a
(Continued)

(51) Int. Cl.
*H04W 76/27* (2018.01)
*H04W 56/00* (2009.01)
(Continued)

(52) U.S. Cl.
CPC ........... *H04W 76/27* (2018.02); *H04W 56/00* (2013.01); *H04W 72/1268* (2013.01);
(Continued)

(58) Field of Classification Search
CPC . H04W 72/1268; H04W 72/14; H04W 72/02; H04W 76/27
See application file for complete search history.

(56) References Cited

U.S. PATENT DOCUMENTS

| 8,976,780 B2 | 3/2015 | Cai et al. |
| 10,306,671 B2 | 5/2019 | Li et al. |

(Continued)

FOREIGN PATENT DOCUMENTS

| WO | 2017218847 A1 | 12/2017 |
| WO | 2018059394 A1 | 4/2018 |
| WO | 2018133780 A1 | 7/2018 |

OTHER PUBLICATIONS

3GPP TS 38.211 V16.0.0 (Dec. 2019); Technical Specification; 3rd Generation Partnership Project; Technical Specification Group Radio Access Network; NR; Physical channels and modulation; (Release 16).

(Continued)

*Primary Examiner* — Nam T Huynh
(74) *Attorney, Agent, or Firm* — Alireza Babaei

(57) ABSTRACT

A base station transmits, to a wireless device, a first configuration parameter indicating whether data of a logical channel is allowed to be transmitted using a configured grant of type 1 and a second configuration parameter indicating whether data of the logical channel is allowed to be transmitted using a configured grant of type 1 while in RRC inactive state. The base station may receive or not receive data of the logical channel from the wireless device via configured grants of type 1 while the wireless device is in RRC connected state and while the wireless device is in RRC inactive state based on the configuration parameters.

20 Claims, 63 Drawing Sheets

Related U.S. Application Data continuation of application No. 17/175,652, filed on Feb. 13, 2021, now Pat. No. 11,399,408.

(60) Provisional application No. 62/976,271, filed on Feb. 13, 2020.

(51) Int. Cl.
    *H04W 76/30*       (2018.01)
    *H04W 72/1268*     (2023.01)
    *H04W 72/23*       (2023.01)
    *H04W 72/02*       (2009.01)

(52) U.S. Cl.
    CPC ........... *H04W 72/23* (2023.01); *H04W 76/30* (2018.02); *H04W 72/02* (2013.01)

(56) References Cited

U.S. PATENT DOCUMENTS

| | | |
|---|---|---|
| 2014/0119247 A1 | 5/2014 | Ramkumar et al. |
| 2018/0097679 A1 | 4/2018 | Zhang et al. |
| 2018/0206262 A1 | 7/2018 | Cao et al. |
| 2019/0313443 A1 | 10/2019 | Li et al. |
| 2020/0107219 A1 | 4/2020 | Jang et al. |
| 2020/0107295 A1 | 4/2020 | Lee et al. |
| 2020/0137761 A1 | 4/2020 | Shih et al. |
| 2020/0229265 A1 | 7/2020 | Wang et al. |
| 2021/0014926 A1 | 1/2021 | Xu et al. |
| 2021/0345395 A1 | 11/2021 | Chatterjee et al. |
| 2022/0061070 A1 | 2/2022 | Miao et al. |
| 2022/0095331 A1 | 3/2022 | Laselva et al. |

OTHER PUBLICATIONS

3GPP TS 38.212 V16.0.0 (Dec. 2019); Technical Specification; 3rd Generation Partnership Project; Technical Specification Group Radio Access Network; NR; Multiplexing and channel coding; (Release 16).
3GPP TS 38.213 V16.0.0 (Dec. 2019); Technical Specification; 3rd Generation Partnership Project; Technical Specification Group Radio Access Network; NR; Physical layer procedures for control; (Release 16).
3GPP TS 38.214 V16.0.0 (Dec. 2019); Technical Specification; 3rd Generation Partnership Project; Technical Specification Group Radio Access Network; NR; Physical layer procedures for data; (Release 16).
3GPP TS 38.300 V16.0.0 (Dec. 2019); Technical Specification; 3rd Generation Partnership Project; Technical Specification Group Radio Access Network; NR; NR and NG-RAN Overall Description; Stage 2; (Release 16).
3GPP TS 38.321 V15.8.0 (Dec. 2019); Technical Specification; 3rd Generation Partnership Project; Technical Specification Group Radio Access Network; NR; Medium Access Control (MAC) protocol specification; (Release 15).
3GPP TS 38.331 V15.8.0 (Dec. 2019); Technical Specification; 3rd Generation Partnership Project; Technical Specification Group Radio Access Network; NR; Radio Resource Control (RRC); Protocol specification; (Release 15 ).
3GPP TSG-RAN Meeting #86; RP-192549; Sitges, Spain, Dec. 9-12, 2019; Source: vivo; Title: Views on NR small data transmission enhancements in Rel-17; Agenda Item: 9.1.2; Document for: Discussion and Decision.
3GPP TSG-RAN Meeting #86; RP-192572; Sitges, Spain, Dec. 9-12, 2019; Source: ZTE (email discussion Moderator); Title: Work Item on NR small data transmissions in INACTIVE state; Document for: Approval; Agenda tem: 9.1.2.
3GPP TSG-RAN Meeting #86; RP-192573; Sitges, Spain, Dec. 9-12, 2019; Source: ZTE Corporation, Sanechips; Title: Motivation of smalldata enhancements in NR; Agenda item: 9.1.2; Document for: Discussion and Decision.
3GPP TSG-RAN Meeting #86; RP-192574; Sitges, Spain, Dec. 8-12, 2019; Source: ZTE Corporation (email discussion moderator); Title: Summary of small data enhancements for NR Rel-17—Phase 2; Agenda item: 9.1.2; Document for: Discussion and Decision.
3GPP TSG-RAN Meetings #86; RP-192760; Sitges, Spain, Sep. 9-Sep. 12, 2019; Agenda Item: 9.1.2; Source: OPPO; Title: R-17 work scope for small data transmission; Document for: Information.
3GPP TSG-RAN Meeting #86; RP-192789; Sitges, Spain, Dec. 9-12, 2019; Agenda Item: 9.1.2; Source: Huawei, HiSilicon; Title: Key points on NR small data; Document for: Discussion.
3GPP TSG-RAN WG Meeting #86; RP-192864; Sitges, Spain, Dec. 9-12, 2019; Sitges, Spain, Dec. 9-12, 2019; Document for: Discussion; Agenda Item: 9.1.2; Title: Views on Small Data Transmission in Rel-17; CATT.
3GPP TSG-RAN Meeting #86; RP-193162; Sitges, Spain, Dec. 9-12, 2019; Source: ZTE (email discussion Moderator); Title: Work Item on NR small data transmissions in INACTIVE state; Document for: Approval; Agenda tem: 9.1.2.
3GPP TSG-RAN Meeting #86; RP-193168; Sitges, Spain, Dec. 9-12, 2019; Source: ZTE (email discussion Moderator); Title: Work Item on NR small data transmissions in INACTIVE state; Document for: Approval; Agenda item: 9.1.2.
3GPP TSG-RAN Meeting #86; RP-193252; Sitges, Spain, Dec. 9-12, 2019; Source: ZTE Corporation; Title: Work Item on NR small data transmissions in INACTIVE state; Document for: Approval; Agenda Item: 9.1.2.
3GPP TSG-RAN WG2 Meeting #96; R2-168595; Reno, Nevada, USA Nov. 14-18, 2016; Agenda item: 9.2.2.1; Source: Sierra Wireless; Title: Transmission of Data Grant-Free in Inactive State; Document for: Discussion and Decision.
3GPP TSG-RAN WG2 Meeting #95bis; R2-166059; Kaohsiung, Taiwan Oct. 10-14, 2016; Agenda item: 9.2.2.1; Source: Sierra Wireless; Title: Transmission of Data Grant-Free in New State; Document for: Discussion and Decision.
3GPP TSG-RAN WG2 Meeting #95bis; R2-166997; Kaohsiung, Oct. 10-14, 2016; Source: Huawei, HiSilicon; Title: Infrequent small data transmission in NR; Agenda Item: 9.2.1.3; Document for: Approval.
3GPP TSG-RAN WG2 #95bis; R2-166284; Kaohsiung, Oct. 10-14, 2016; Agenda Item: 9.2.2.1; Source: Huawei, HiSilicon; Title: Data transmission in low activity state; Document for: Discussion and Decision.
3GPP TSG-RAN WG2 Meeting #95-BIS; R2-166538; Kaohsiung, Taiwan, Oct. 10-14, 2016; Agenda item: 9.2.2.1; Source: Samsung; Title: Comparison between active and inactive state for small data transmission from energy efficiency perspective; Document for: Discussion & Decision.
3GPP TSG-RAN WG2 #95bis Tdoc; R2-166921; Kaohsiung, Taiwan, Oct. 10-14, 2016; Agenda Item: 9.2.2.1; Source: Ericsson; Title: Issues in small data transmission in inactive state; Document for: Discussion, Decision.
3GPP TSG-RAN WG2 Meeting #95bis; R2-166238; Kaohsiung, Taiwan, Oct. 10-14, 2016; Agenda item: 9.2.2.1; Source: Nokia, Alcatel-Lucent Shanghai Bell; Title: Discussion on Connectionless; WID/SID: FS_ NR_newRAT—Release 14; Document for: Discussion and Decision.
3GPP TSG-RAN WG2 Meeting #95bis; R2-166581; Kaohsiung, Taiwan, Oct. 10-14, 2016; Agenda item: 9.2.2.1; Source: Mediatek Inc; Title: Infrequent Small Data and New State; Document for: Discussion and Decision.
3GPP TSG-RAN WG2 #95bis; R2-166870; Kaohsiung, Oct. 10-14, 2016; Agenda Item: 9.2.2.1; Source: InterDigital Communications; Title: UE Transmissions in New State for NR; Document for: Discussion, Decision.
3GPP TSG-RAN WG2 #95bis Tdoc; R2-166922; Kaohsiung, Taiwan, Oct. 10-14, 2016; Agenda Item: 9.2.2.1; Source: Ericsson; Title: Small data transmission for inactive UEs; Document for: Discussion, Decision.
3GPP TSG-RAN WG2 Meeting #95bis; R2-166118; Kaohsiung, Oct. 10-14, 2016; Source: CATT; Title: Small data transmission in inactive state; Agenda Item: 9.2.2.1; Document for: Discussion and Decision.

(56) References Cited

OTHER PUBLICATIONS

3GPP TSG-RAN WG2 Meeting #95bis; R2-166187; Kaohsiung, Oct. 10-14, 2016; Agenda Item: 9.2.2.1; Source: OPPO; Title: Discussion on Efficient Small Data transmission in "Inactive" State; Document for: Discussion and Decision.
3GPP TSG-RAN WG2 Meeting #95bis; R2-166527; Kaohsiung, Taiwan, Oct. 10-14, 2016; Agenda item: 9.2.2.1 (FS_NR_newRAT); Source: LG Electronics Inc.; Title: Data transmission in New State; Document for: Discussion and Decision.
3GPP TSG-RAN WG2 #95bis; R2-16xxxx; Kaohsiung, Taiwan, Oct. 10-14, 2016; Agenda Item: 9.2.2.1; Source: III; Title: Consideration small data transmission in New State; Document for: Discussion, Decision.
3GPP TSG-RAN WG2 #95bis; R2-166596; Kaohsiung, Taiwan, Oct. 10-14, 2016; Agenda Item: 9.2.2.1; Source: III; Title: Consideration small data transmission in New State; Document for: Discussion, Decision.
3GPP TSG-RAN WG2 Meeting #95bis; R2-166704; Kaohsiung, Taiwan, Oct. 10-14, 2016; Agenda Item: 9.2.2.1; Source: ETRI; Title: UE behaviour in new state; Document for: Discussion and Decision.
3GPP TSG-RAN WG2 Meeting #95bis; R2-167067; Kaohsiung, Taiwan Oct. 10-14, 2016; Source: Qualcomm Incorporated; Title: Data transmission in the NR inactive state; Document for: Discussion and Approval; Agenda Item: 9.2.2.1.
3GPP TSG-RAN WG2 #96 Tdoc; R2-168714; Reno, Nevada, USA, Nov. 14-18, 2016; Agenda Item: 9.2.2.1; Source: Ericsson; Title: Responding the questions on small data Tx in RRC_INACTIVE; Document for: Discussion, Decision.
3GPP TSG-RAN WG2 #96 Tdoc; R2-168713; Reno, Nevada, USA, Nov. 14-18, 2016; Agenda Item: 9.2.2.1; Source: Ericsson; Title: Baseline solution for small data transmission in RRC_INACTIVE; Document for: Discussion, Decision.
3GPP TSG-RAN WG2 Meeting #96; R2-168280; Reno, USA, Nov. 14-Nov. 18, 2016; Agenda item: 9.2.2.1 (FS_NR_newRAT); Source: LG Electronics Inc.; Title: UL data transmission in RRC_INACTIVE; Document for: Discussion and Decision.
3GPP TSG-RAN WG2 #96; R2-168469; Reno, Nevada Nov. 14-18, 2016; Agenda Item: 9.2.2.1; Source: InterDigital Communications; Title: Uplink Data Transmissions in Inactive State; Document for: Discussion, Decision.
3GPP TSG-RAN WG2 Meeting #96; R2-167954; Reno, USA, Nov. 14-18, 2016; Source: CATT; Title: UL small data transmission in inactive state; Agenda Item: 9.2.2.1; Document for: Discussion and Decision.
3GPP TSG-RAN WG2 Meeting #6; R2-168050; Reno, USA, Nov. 14 to 18, 2016; Agenda item: 9.2.2.1; Source: Samsung; Title: Design requirement for data transfer in inactive state; Document for: Discussion & Decision.
3GPP TSG-RAN WG2 Meeting #6; R2-168051; Reno, USA, Nov. 14 to 18, 2016; Agenda item: 9.2.2.1; Source: Samsung; Title: Overall procedure for data transfer in inactive state; Document for: Discussion & Decision.
3GPP TSG-RAN WG2 Meeting #6; R2-168052; Reno, USA, Nov. 14 to 18, 2016; Agenda item: 9.2.2.1; Source: Samsung; Title: UE energy consumption analysis for data transfer in inactive state; Document for: Discussion & Decision.
3GPP TSG-RAN WG2 Meeting #96; R2-167479; Reno, USA Nov. 14-18, 2016; Agenda Item: 9.2.2.1; Source: OPPO; Title: Discussion on Data transmission in "Inactive" State; Document for: Discussion and Decision.
3GPP TSG-RAN WG2 Meeting #96; R2-167706; Reno, USA, Nov. 14-18, 2016; Agenda item: 9.2.2.1; Source: Nokia, Alcatel-Lucent Shanghai Bell; Title: Data transmission in Inactive; WID/SID: FS_NR_newRAT—Release 14; Document for: Discussion and Decision.
3GPP TSG-RAN WG2 #96; R2-168412; Reno, USA, Nov. 14-18, 2016; Agenda Item: 9.2.2.1; Source: LG Electronics Inc.; Title : State Transition between RRC_INACTIVE and RRC_ACTIVE; Document for : Discussion and Decision.
3GPP TSG-RAN WG2 Meeting #96; R2-168522; Reno, USA Nov. 14-18, 2016; Agenda item: 9.2.2.1; Source: Intel Corporation; Title: Data transfer from NR_RRC_INACTIVE; Document for: Discussion and decision.
3GPP TSG-RAN WG2 #96 Tdoc; R2-168715; Reno, Nevada, USA, Nov. 14-18, 2016; Agenda Item: 9.2.2.1; Source: Ericsson; Title: Requirements and use cases for small data Tx in RRC_INACTIVE; Document for: Discussion, Decision.
3GPP TSG-RAN WG2 Meeting #96; R2-168752; Reno, Nevada, USA, Nov. 14-18, 2016; Agenda item: 9.2.2.1; Source: CMCC; Title: Consideration on UL Data Transmission in New UE State; Document for: Discussion.
3GPP TSG-RAN2 #96 Meeting; R2-168814; Reno, USA, Nov. 14-18, 2016; Agenda item: 9.2.2.1; Source: Mediatek Inc; Title: Procedure for Data transmission; Document for: Discussion and Decision.
3GPP TSG-RAN2 #96 Meeting; R2-168831; Reno, USA, Nov. 14-18, 2016; Agenda item: 9.2.2.1; Source: Mediatek Inc; Title: RRC Inactive State; Document for: Discussion and Decision.

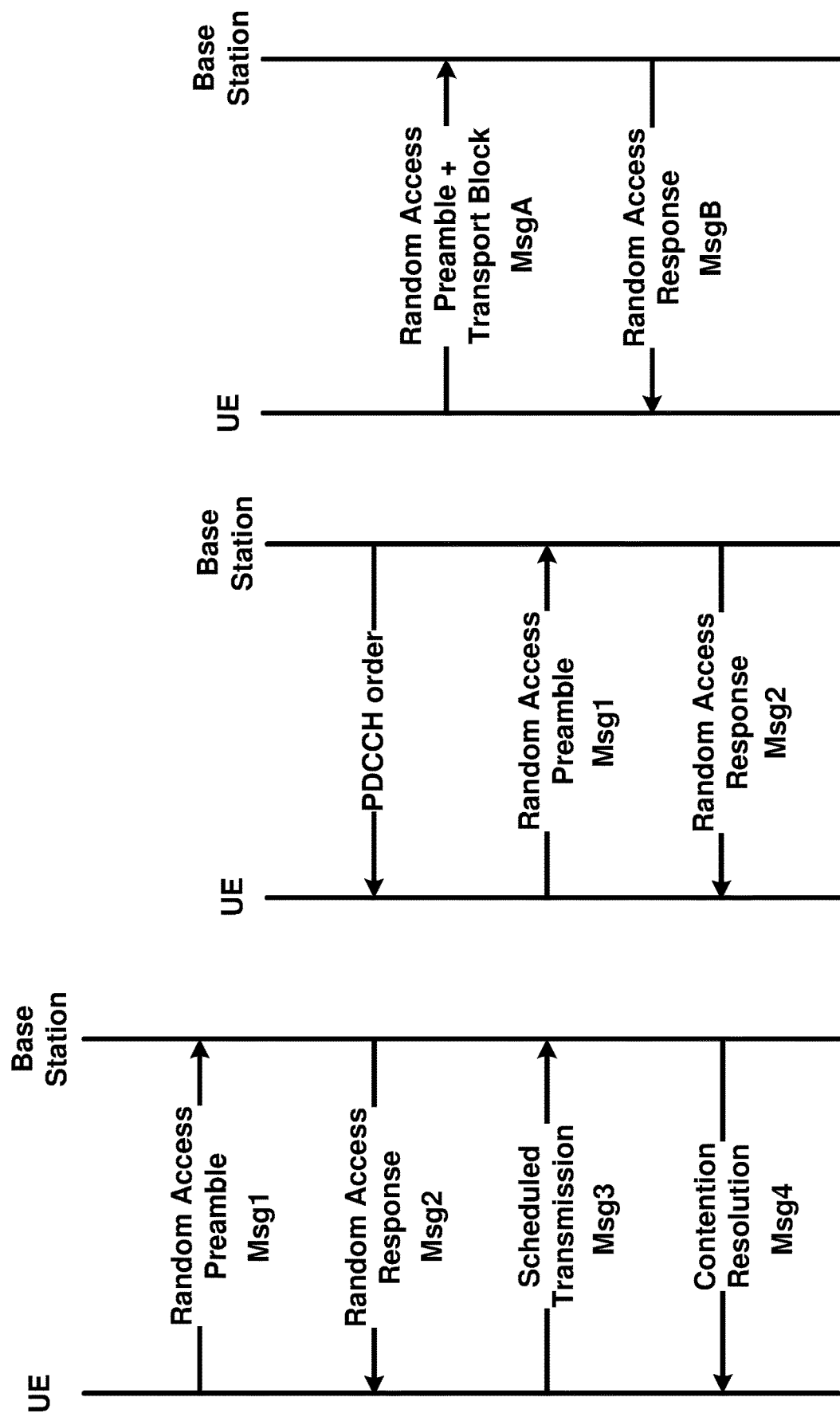

```
ul-SpecificParameters            SEQUENCE {
    ...
    configuredGrantType1Allowed         ENUMERATED {true}
    RRCInactiveAllowed                  ENUMERATED {true}
    ...
}
```

FIG. 39A

```
LogicalChannelConfig ::=        SEQUENCE {
    ul-SpecificParameters           SEQUENCE {
        ...
        configuredGrantType1Allowed             ENUMERATED {true}
        configuredGrantType1RRCInactiveAllowed  ENUMERATED {true}
        ...
    }
    ...
}
```

FIG. 39B

Receive, in an RRC inactive state, paging information via a paging channel, wherein the paging information is associated with a TA value

5510

Transmit, while in the RRC inactive state, a TB based on the TA value

Receive, in an RRC connected state, a 1st TA command MAC CE, with a 1st MAC CE format, indicating a first TA command

5610

Transmit a 1st UL TB, in the RRC connected state, based on the 1st TA command

5620

Receive in an RRC inactive state, a 2nd TA command MAC CE, with a 2nd MAC CE format, indicating a 2nd TA command

5630

Transmit a 2nd UL TB, in the RRC inactive state, based on the 2nd TA command

Receive, configuration parameters of a logical channel, the configuration parameters comprising a 1st parameter indicating that the logical channel is allowed to be transmitted in an RRC inactive state

5810

Transmit a TB, comprising data of the logical channel, while the wireless device is in the RRC inactive state

5820

Transmit, in an RRC connected state, a 1st TB based on a 1st UL grant using a 1st multiplexing process

6110

Transmit, in an RRC inactive state, a 2nd TB based on a 2nd UL grant and using on a 2nd multiplexing process

- based on the 1st multiplexing process, the 1st TB comprises MAC CE(s)

- based on the 2nd multiplexing process, the 2nd TB does not comprise the MAC CE(s)

6120

Transmit, in an RRC connected state, a 1st TB comprising a 1st MAC CE of a 1st type

6210

Transmit, in an RRC inactive state, a 2nd TB comprising a 2nd MAC CE of the 1st type

- the 1st MAC CE of the 1st type is of a 1st format

- the 2nd MAC CE of the 2nd type is of a 2nd format

Transmit, in an RRC connected state, a 1st TB comprising a 1st MAC CE of a 1st type

6310

Transmit, in an RRC inactive state, a 2nd TB comprising the 2nd MAC CE of the 1st type

- the 1st MAC CE of the 1st type is triggered based on 1st trigger condition(s)

- the 2nd MAC CE of the 1st type is triggered based on 2nd trigger condition(s)

DATA TRANSMISSION IN INACTIVE STATE

CROSS-REFERENCE TO RELATED APPLICATIONS

This application is a continuation of U.S. patent application Ser. No. 17/843,981, filed Jun. 18, 2022, which is a continuation of U.S. patent application Ser. No. 17/175,652, filed Feb. 13, 2021, which claims the benefit of U.S. Provisional Application No. 62/976,271, filed Feb. 13, 2020, which is hereby incorporated by reference in its entirety.

BRIEF DESCRIPTION OF THE DRAWINGS

FIG. 12A, FIG. 12B and FIG. 12C show example random access processes in accordance with several of various embodiments of the present disclosure.

FIG. 39A and FIG. 39B show example logical channel configuration parameters in accordance with several of various embodiments of the present disclosure.

FIG. 55 shows an example flow diagram in accordance with several of various embodiments of the present disclosure.

FIG. 56 shows an example flow diagram in accordance with several of various embodiments of the present disclosure.

FIG. 62 shows an example flow diagram in accordance with several of various embodiments of the present disclosure.

FIG. 63 shows an example flow diagram in accordance with several of various embodiments of the present disclosure.

DETAILED DESCRIPTION

The exemplary embodiments of the disclosed technology enable operation of a wireless device and/or one or more base stations in inactive state. The exemplary disclosed embodiments may be implemented in the technical field of wireless communication systems. More particularly, the embodiment of the disclosed technology may enable wireless device and wireless network processes for data transmission in inactive state.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
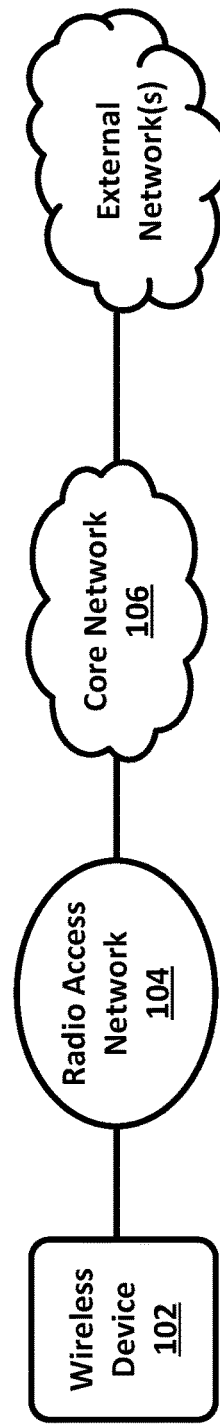
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some example, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
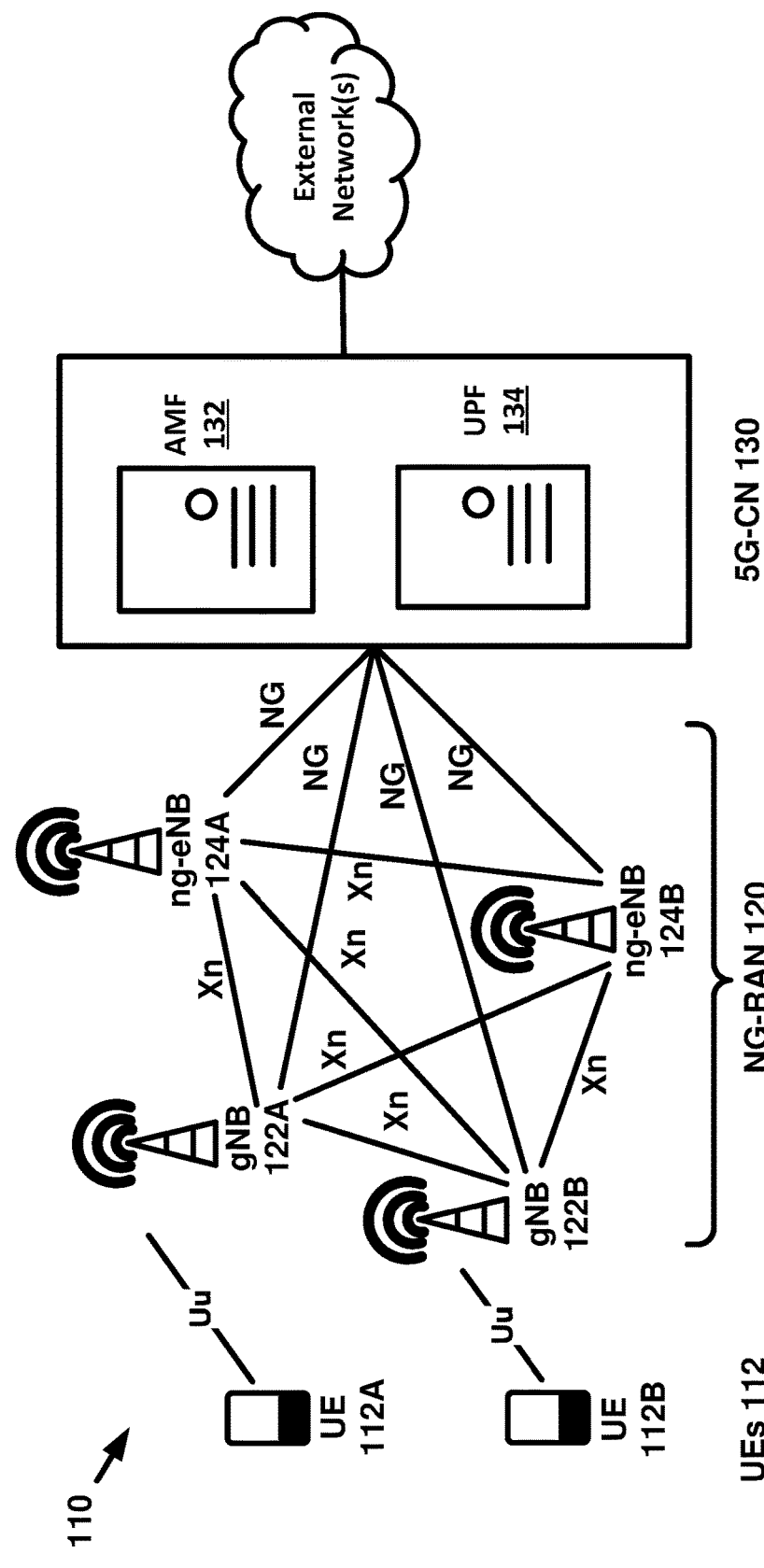

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNBs 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone mode of operation, the 5G NR gNB is connected to a 5G-CN and the user plane and the control plane functionalities are provided by the 5G NR gNB.

Figure 2A:
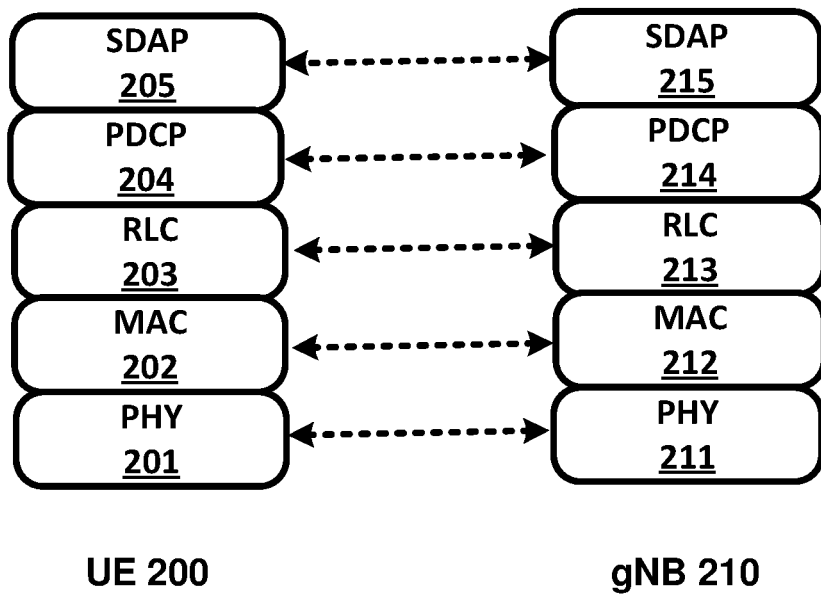
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
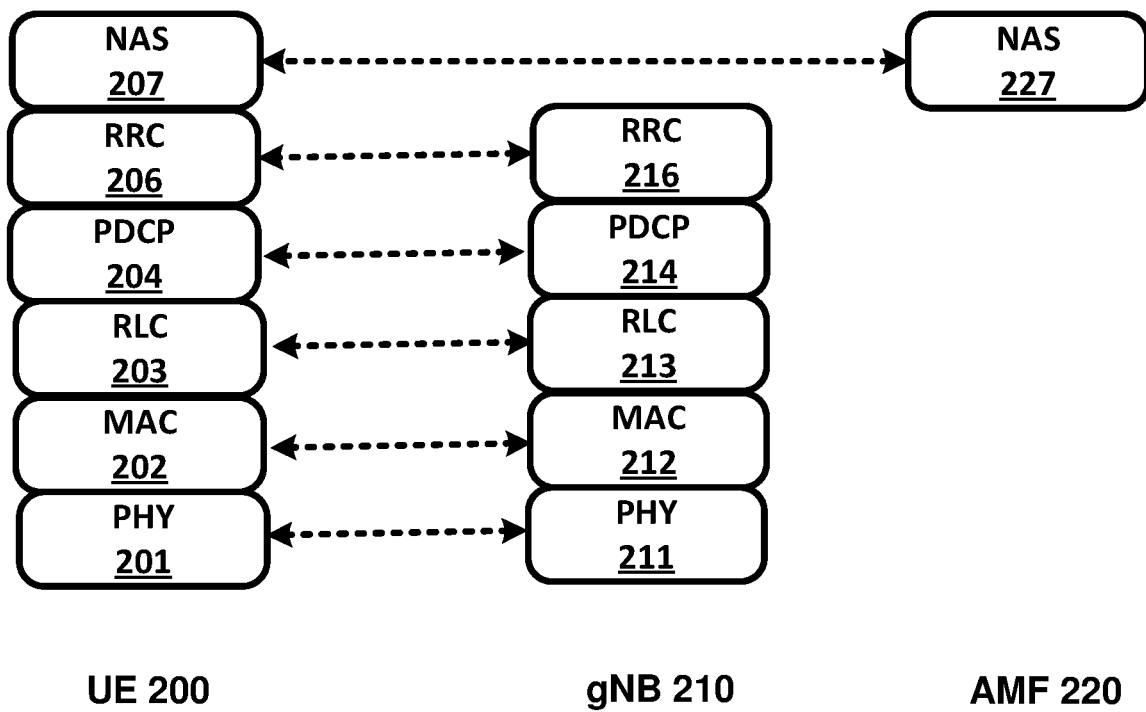

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
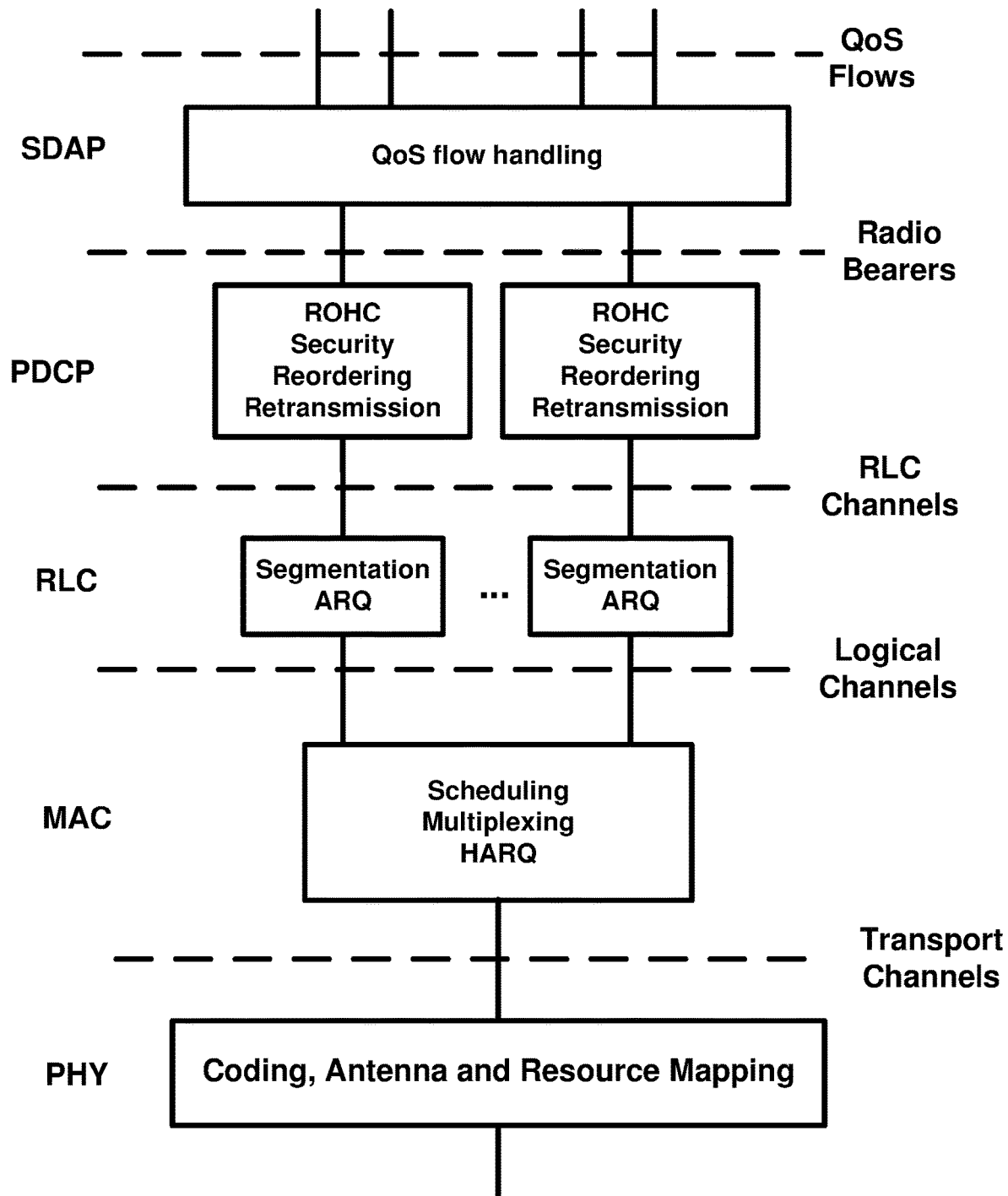
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
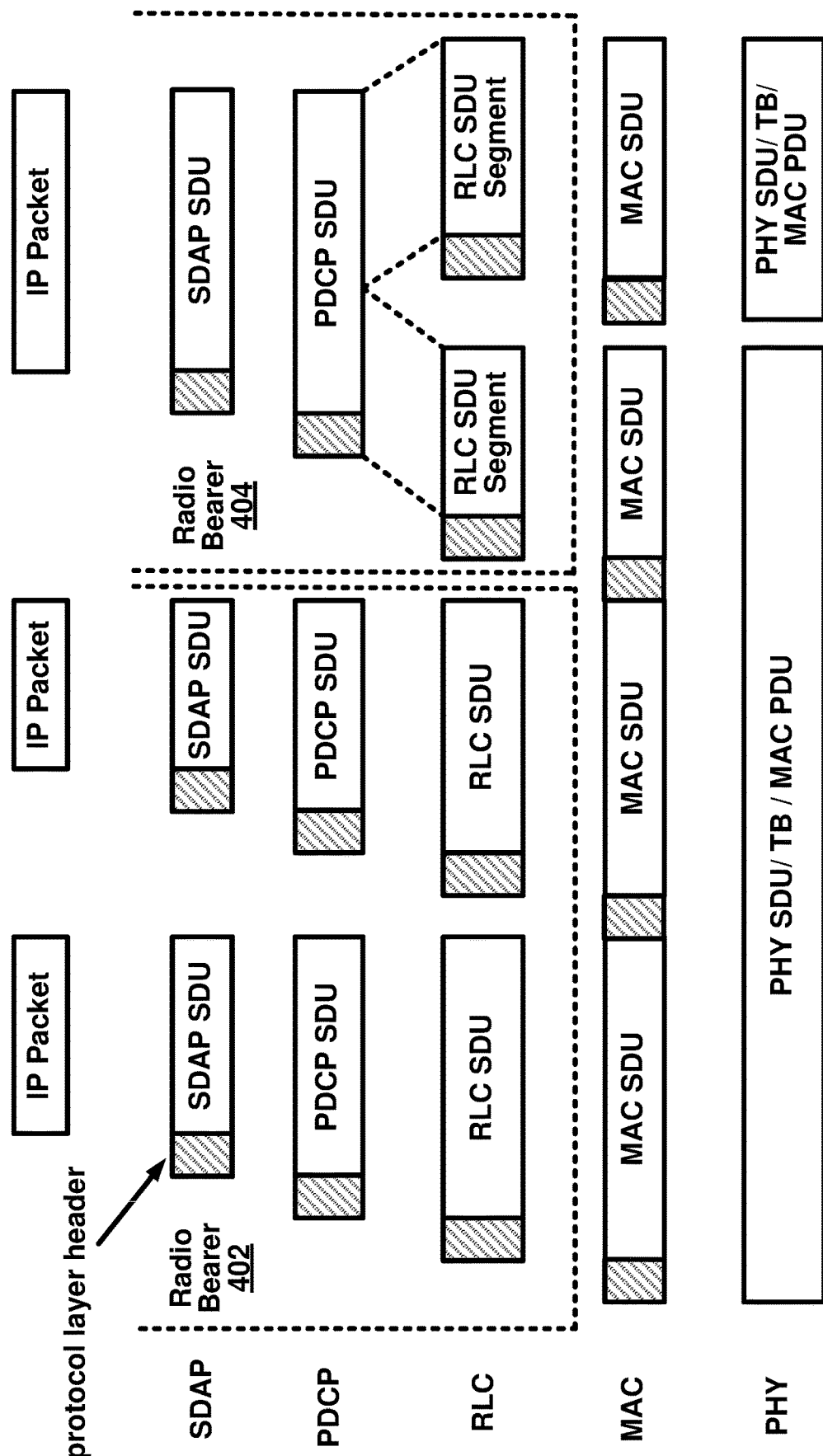
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
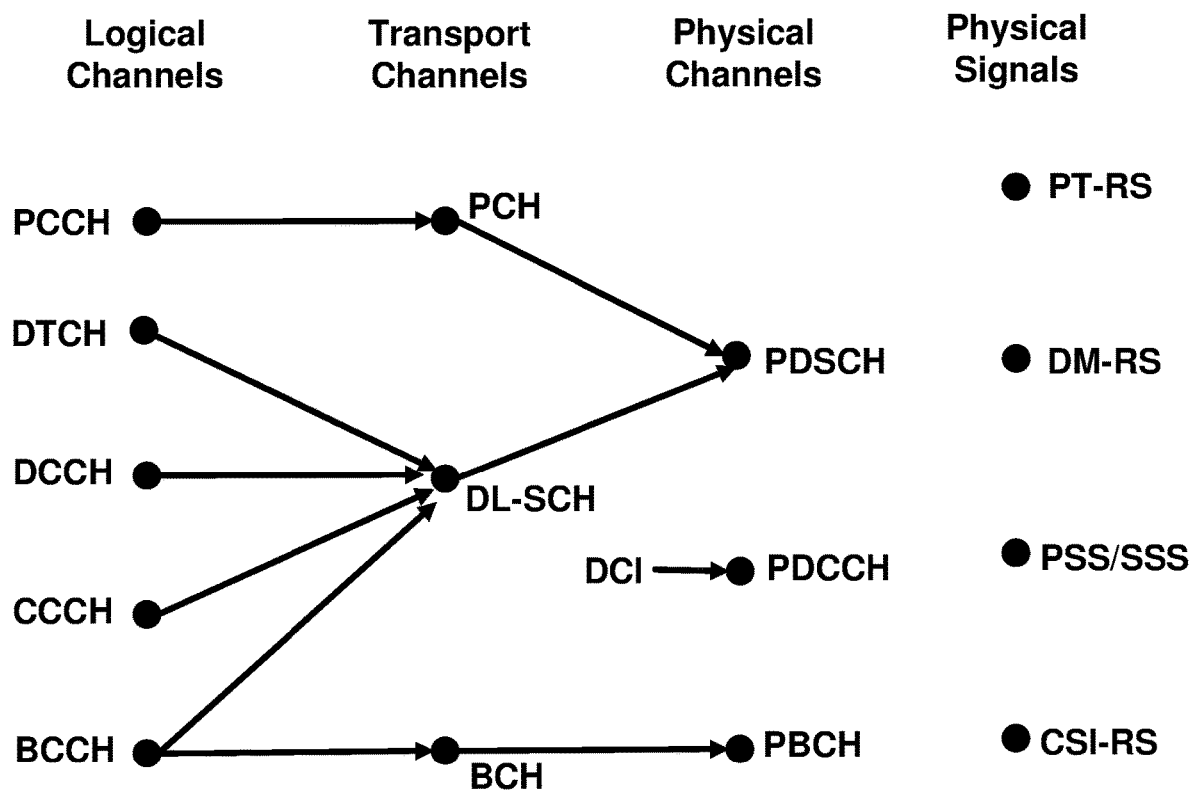
FIG. 5A shows example mapping of channels between layers of the protocol stack and different physical signals in downlink in accordance with several of various embodiments of the present disclosure.
Figure 5B:
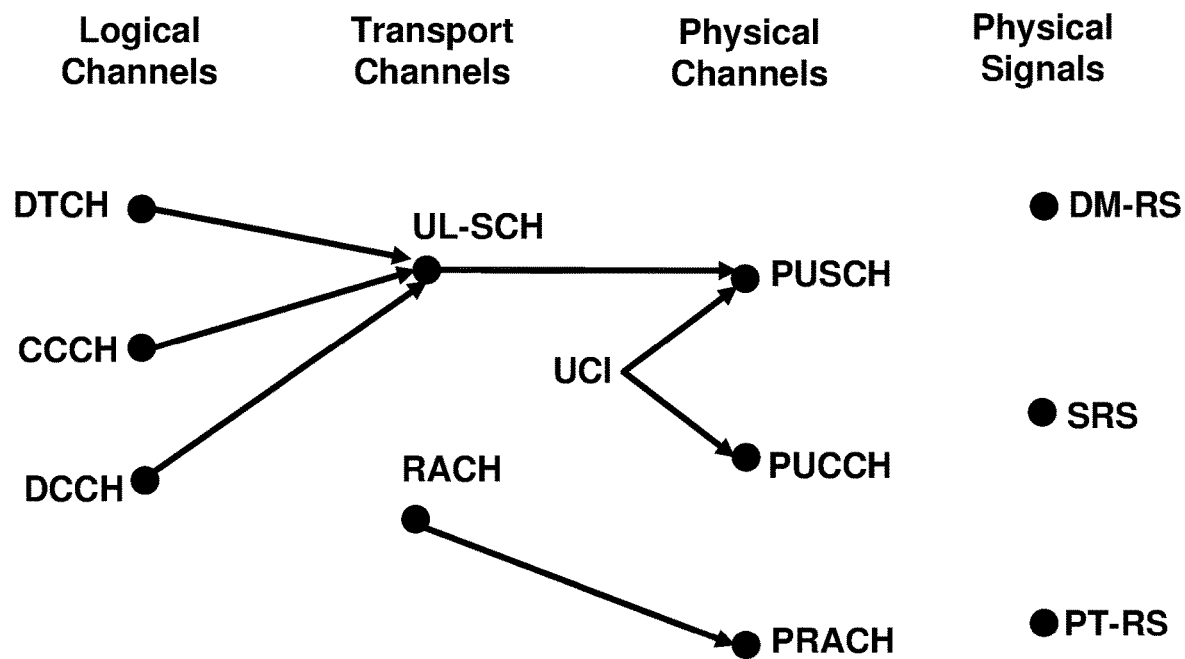
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
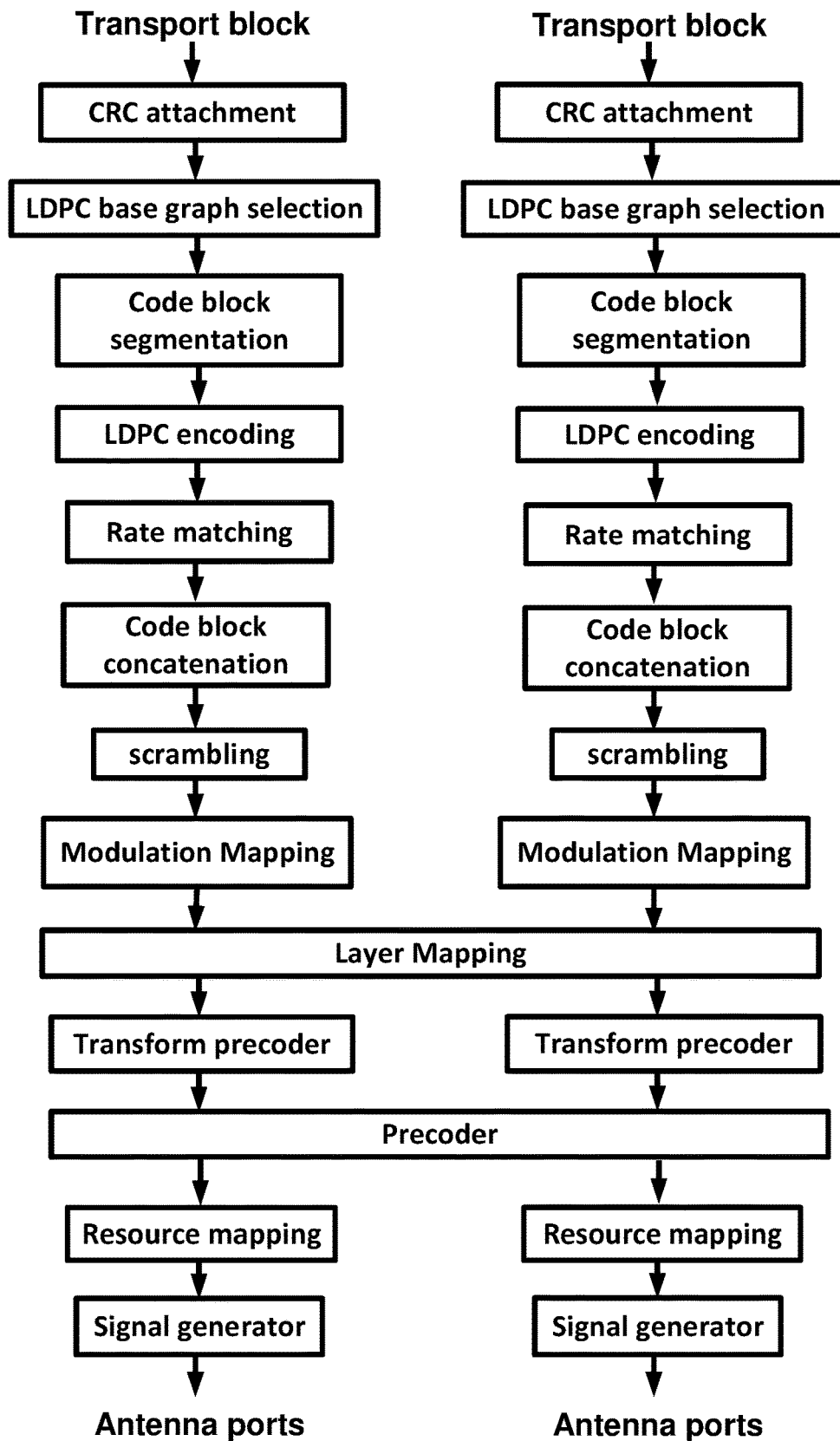
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6)

transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
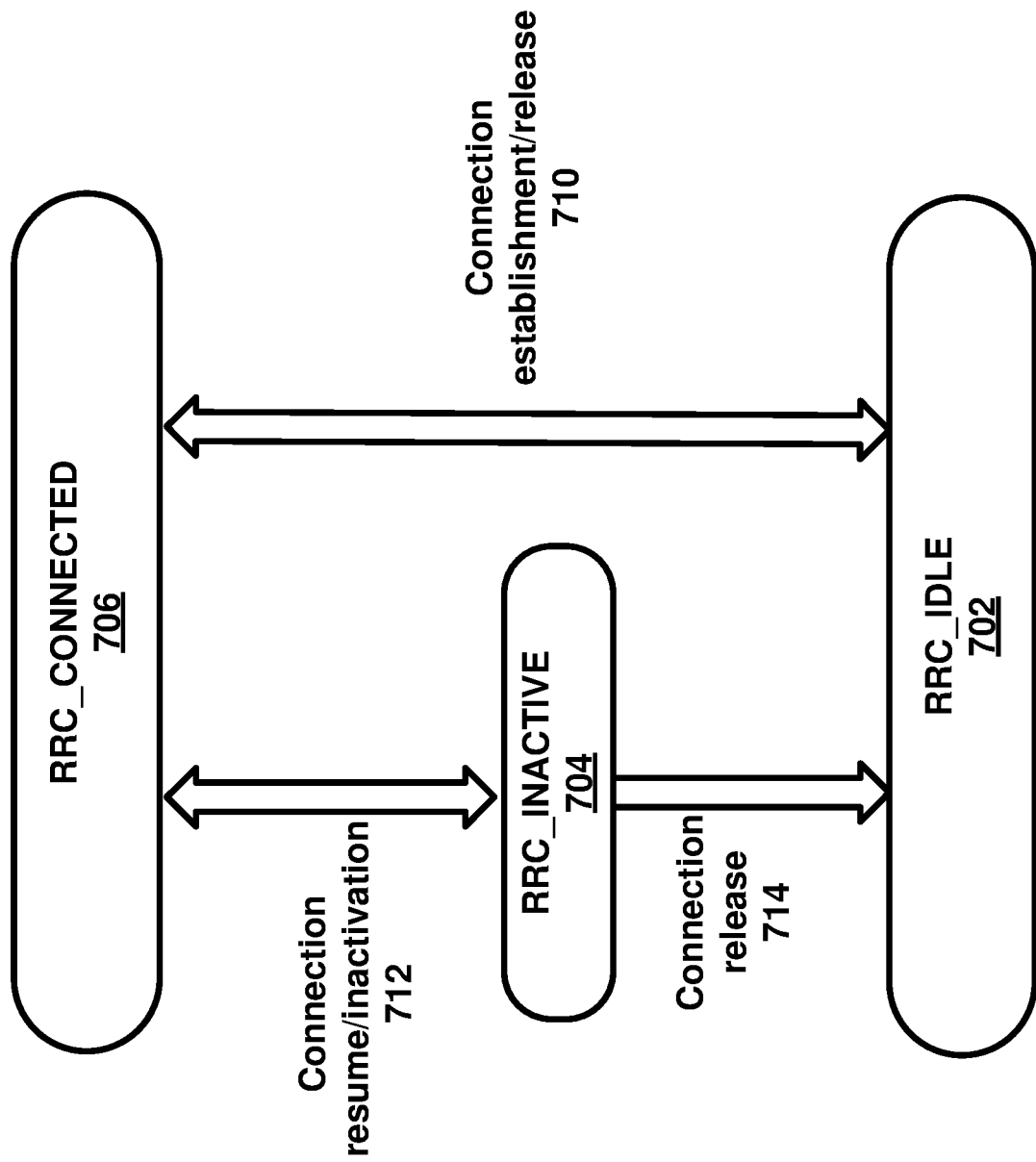
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), $\pi/2$-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 µs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as βf=$2^\mu$. 15 KHz (μ=0, 1, 2, ... ). Example subcarrier spacings used in NR include 15 KHz (μ=0), 30 KHz (μ=1), 60 KHz (μ=2), 120 KHz (μ=3) and 240 KHz (μ=4). As discussed before, a duration of OFDM symbol is inversely proportional to the subcarrier spacing and therefor OFDM symbol duration may depend on the numerology (e.g. the μ value).

Figure 8:
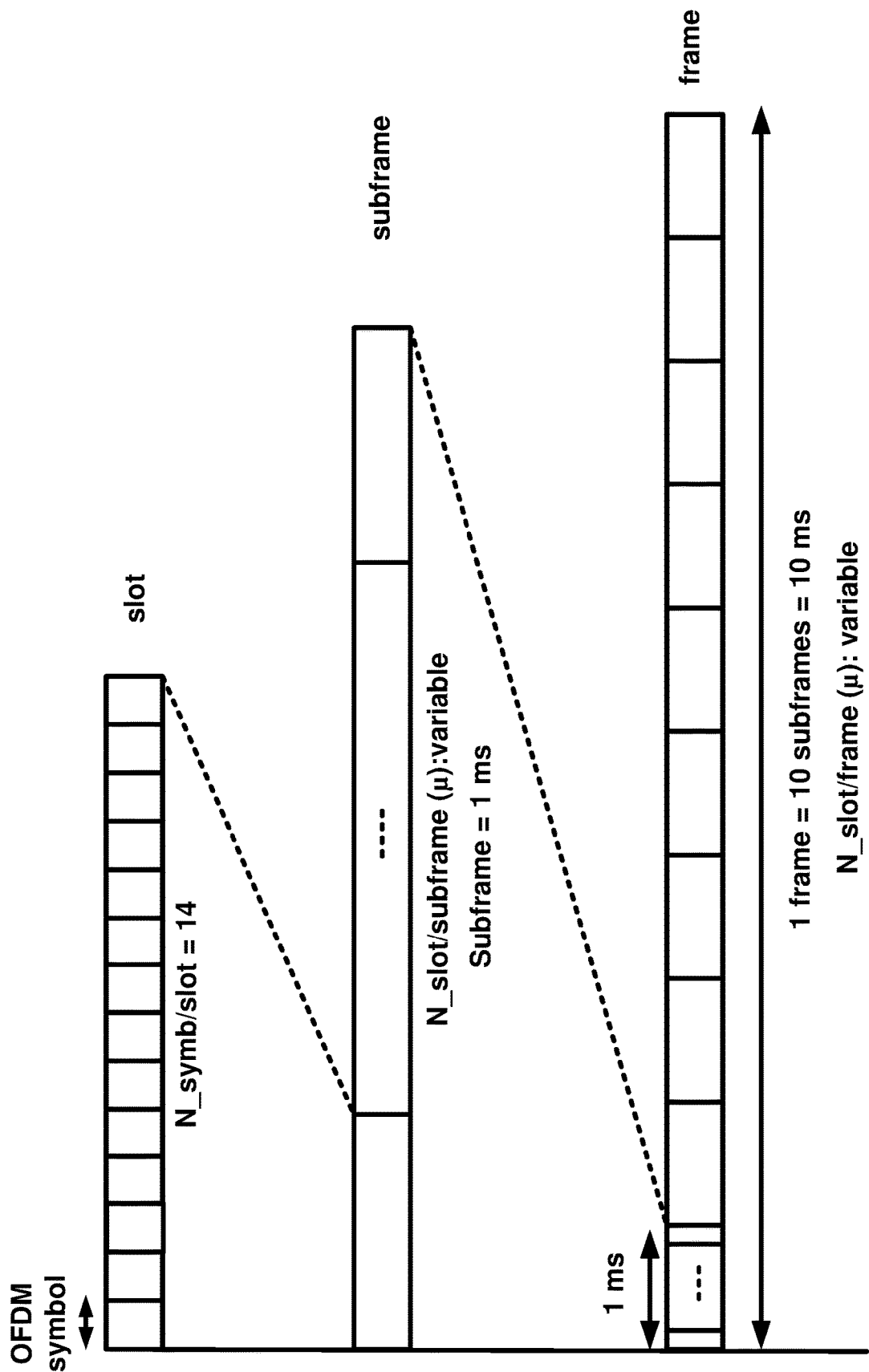
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of μ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
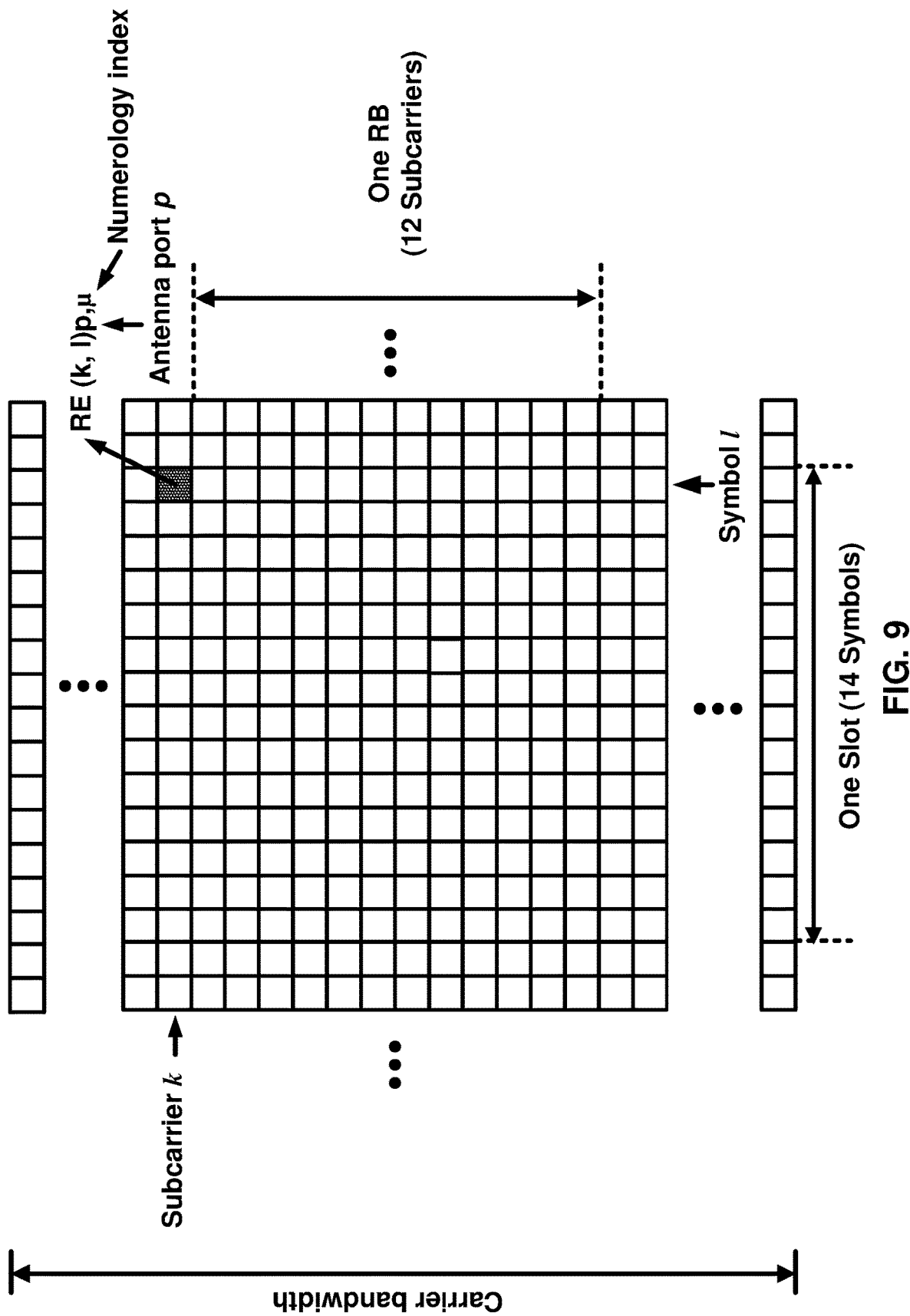
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}$=12 subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
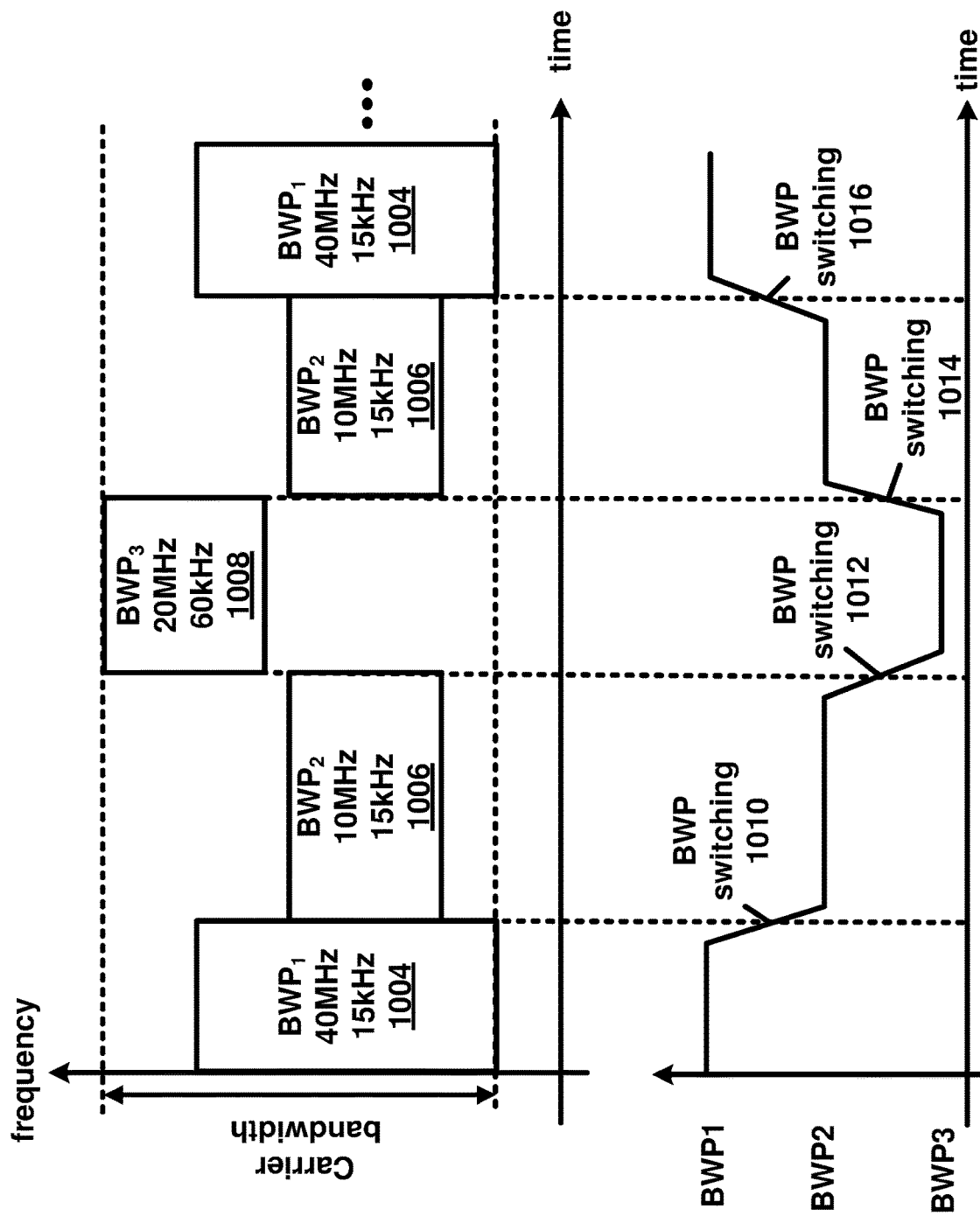
FIG. 10 shows example adaptation and switching of bandwidth parts in accordance with several of various embodiments of the present disclosure.

FIG. 10 shows an example of bandwidth part adaptation and switching. In this example, three BWPs (BWP₁ 1004, BWP₂ 1006 and BWP₃ 1008) are configured for a UE on a carrier bandwidth. The BWP₁ is configured with a bandwidth of 40 MHz and a numerology with subcarrier spacing of 15 KHz, the BWP₂ is configured with a bandwidth of 10 MHz and a numerology with subcarrier spacing of 15 KHz and the BWP₃ is configured with a bandwidth of 20 MHz and a subcarrier spacing of 60 KHz. The wireless device may switch from a first BWP (e.g., BWP₁) to a second BWP (e.g., BWP₂). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
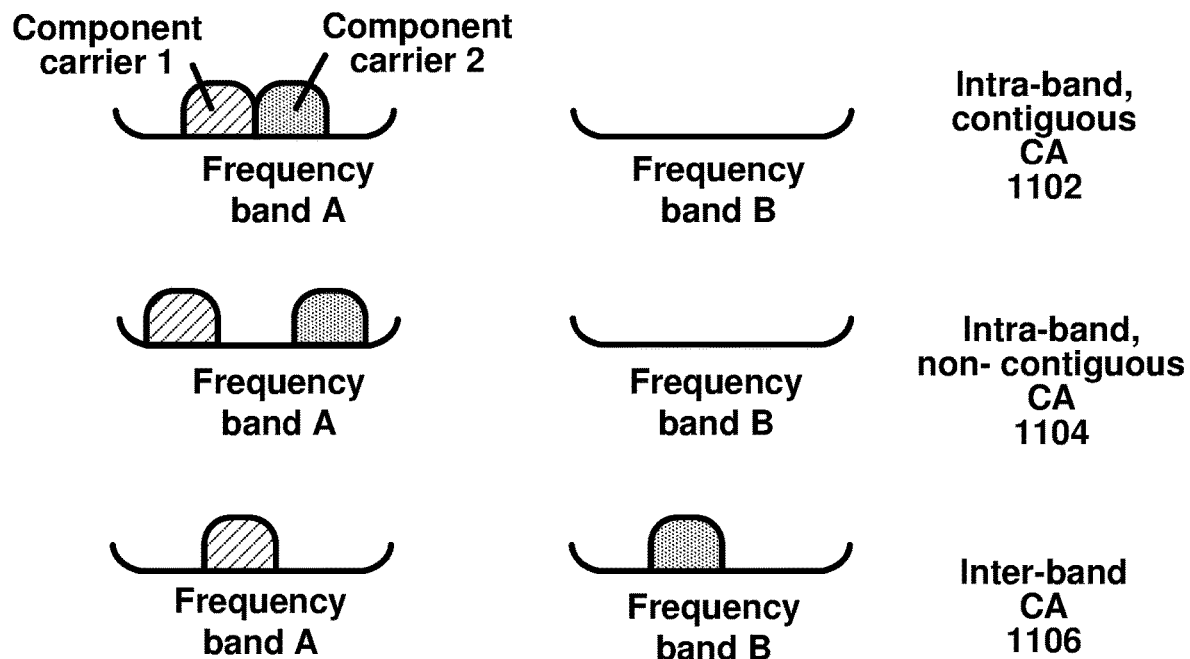
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
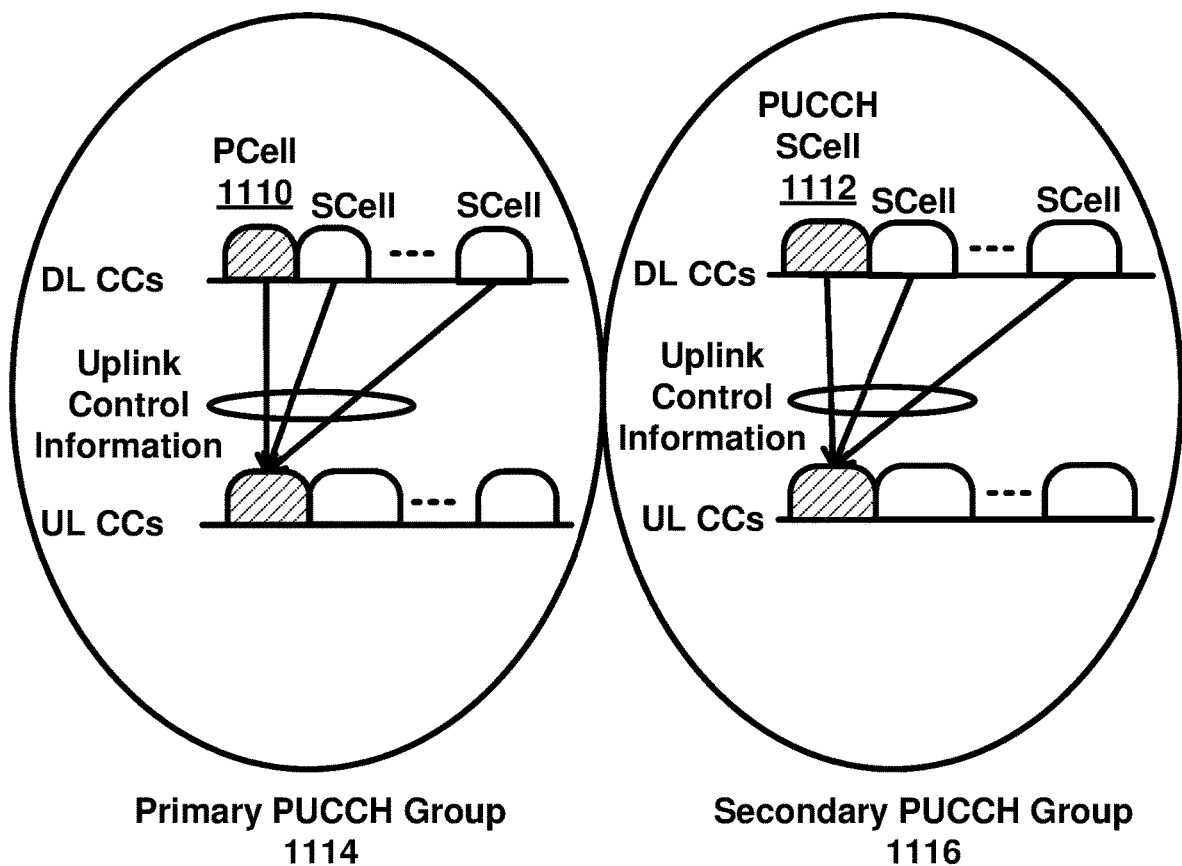
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
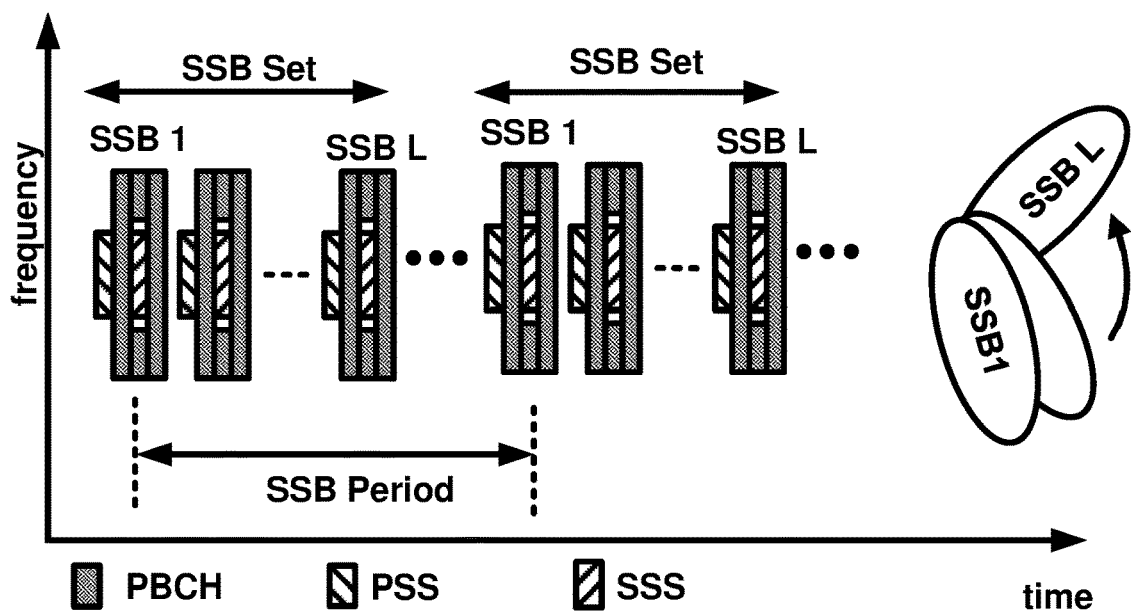
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
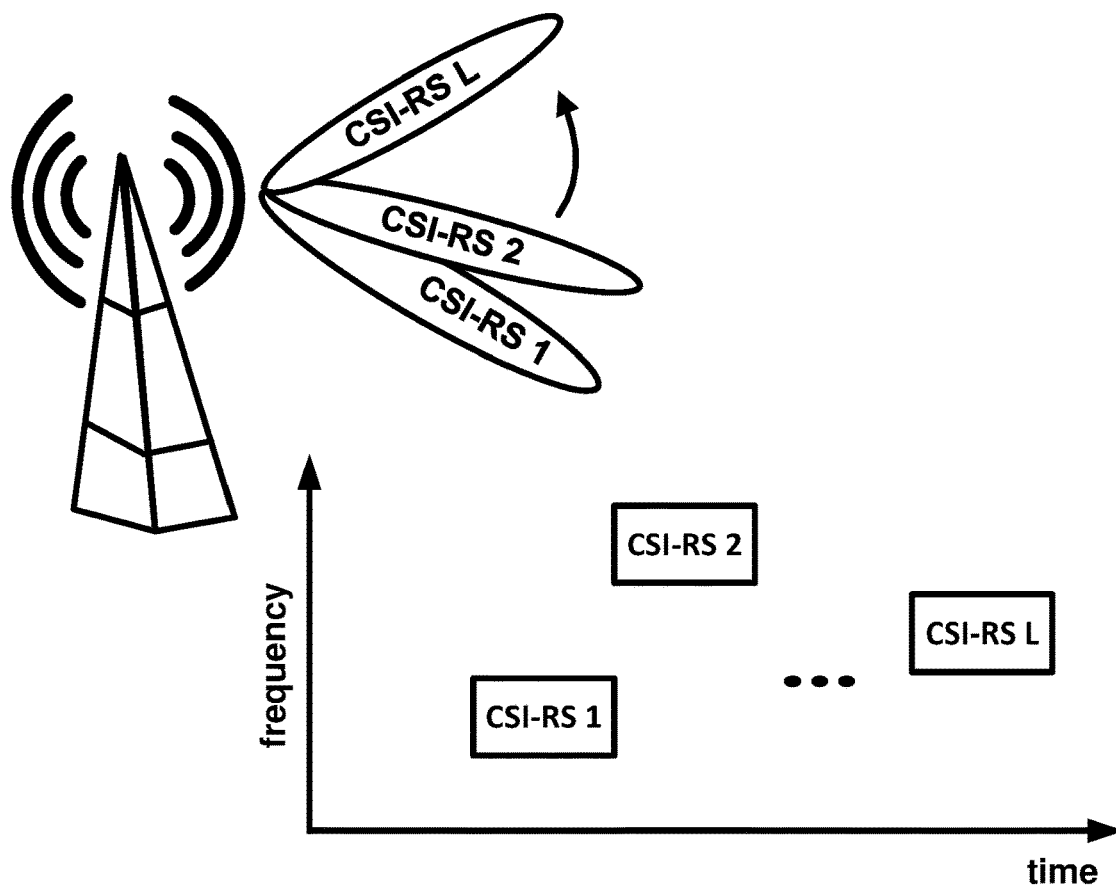
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
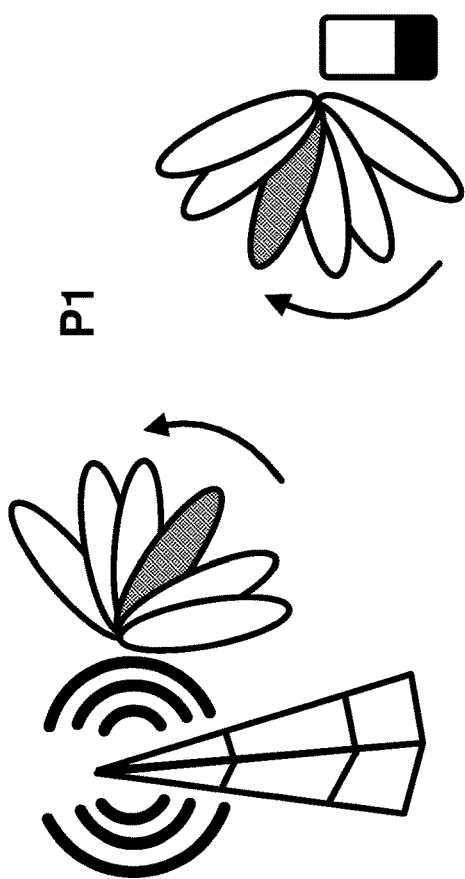
FIG. 14A, FIG. 14B and FIG. 14C show example beam management processes in accordance with several of various embodiments of the present disclosure.
Figure 14C:
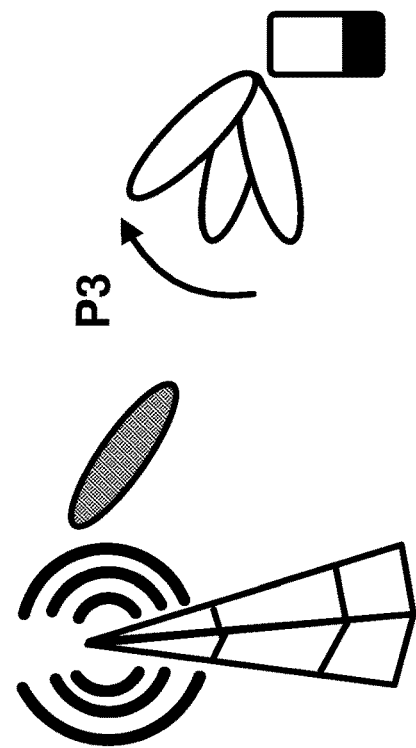
Figure 14B:
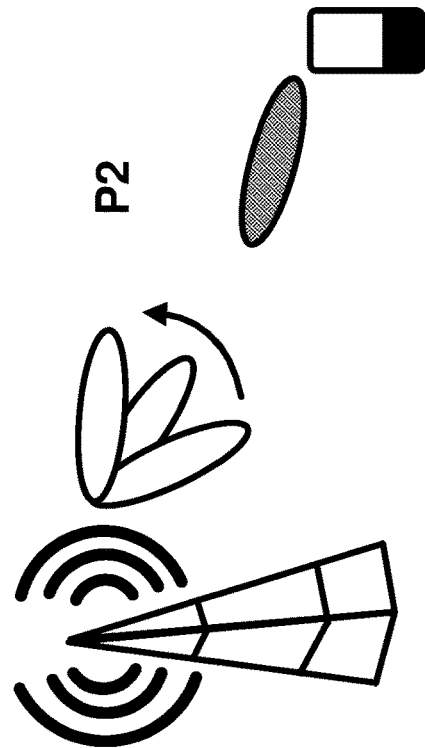

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
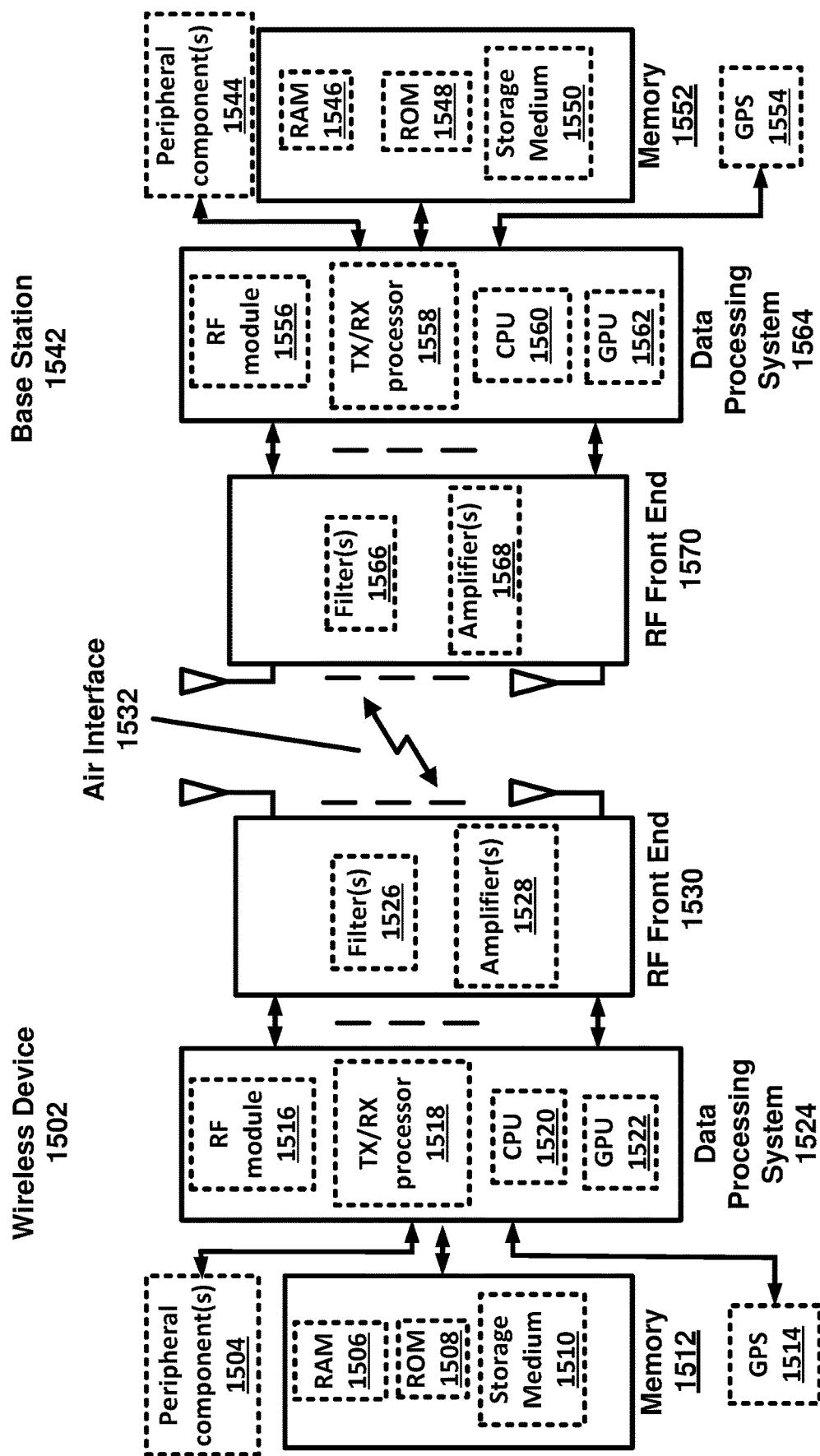
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System

1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, wireless device with infrequent data transmission may be maintained in an RRC_INACTIVE state. The data transmission in RRC_INACTIVE state may be periodic and/or non-periodic. For small and infrequent the data packets for UL (e.g., mobile originated (MO)) data and/or DL (e.g., mobile terminated (MT)) data, resuming RRC connection (e.g., moving to RRC_CONNECTED state) and subsequently releasing the RRC connection to INACTIVE state may result in unnecessary power consumption and signaling overhead.

Examples of small and infrequent data traffic may include: smartphone applications (e.g., traffic from Instant Messaging services, heart-beat/keep-alive traffic from IM/email clients and other apps, push notifications from various applications, etc.); non-smartphone applications (e.g., traffic from wearables (periodic positioning information, etc.); sensors (e.g., Industrial Wireless Sensor Networks transmitting temperature, pressure readings periodically or in an event-triggered manner, etc.); smart meters and smart meter networks sending periodic meter readings, etc.

Signaling overhead from inactive state UEs for small data packets may degrade network performance and efficiency and may degrade UE battery performance. Example embodiments enhance wireless devices processes in INACTIVE state. Example embodiments may enhance the wireless device processes in INACTIVE state for small data transmission. Example embodiments may employ RACH-based processes (e.g., two-step RACH and/or four-step RACH) or configured/pre-configured grants (e.g., configured grants based on a Type 1 configured grant configuration) and/or periodic resources for uplink data transmission during inactive state.

In an example, for mobile originated case, four-step RACH based transmission, two-step RACH based transmission and Pre-configured/configured grant-based solution may be considered.

In an example, a wireless device in an RRC_INACTIVE state may remain in CM-CONNECTED (connection management connected) and may move within an area (e.g., the RAN notification area (RNA)) configured by base station without notifying the base station. In RRC_INACTIVE, the last serving gNB node may keep the UE context and the UE-associated NG connection with the serving AMF and UPF.

In an example, the last serving gNB may receive DL data from the UPF or DL UE-associated signaling from the AMF (except the UE Context Release Command message) while the UE is in RRC_INACTIVE. The last serving gNB may page in the cells corresponding to the RNA and may send XnAP RAN Paging to neighbor gNB(s) if the RNA includes cells of neighbor gNB(s).

In an example, upon receiving a UE Context Release Command message while the UE is in RRC_INACTIVE, the last serving gNB may page in the cells corresponding to the RNA and may send XnAP RAN Paging to neighbor gNB(s) if the RNA includes cells of neighbor gNB(s), in order to release UE explicitly.

In an example, upon receiving an NG RESET message while the UE is in RRC_INACTIVE, the last serving gNB may page involved UEs in the cells corresponding to the RNA and may send XnAP RAN Paging to neighbor gNB(s) if the RNA includes cells of neighbor gNB(s) in order to explicitly release involved UEs.

In an example, an AMF may provide to the base station node the Core Network Assistance Information to assist the base station decision whether the UE may be sent to RRC_INACTIVE. The Core Network Assistance Information may include the registration area configured for the UE, the Periodic Registration Update timer, and the UE Identity Index value, and may include the UE specific discontinuous reception (DRX), an indication if the UE is configured with Mobile Initiated Connection Only (MICO) mode by the AMF, and the Expected UE Behavior. The UE registration area may be taken into account by the base station node when configuring the RNA. The UE specific DRX and UE Identity Index value may be used by the base station for RAN paging. The Periodic Registration Update timer may be taken into account by the base station to configure Periodic RNA Update timer. The base station may take into account the Expected UE Behavior to assist the UE RRC state transition decision.

In an example, at transition to RRC_INACTIVE, the base station may configure the UE with a periodic RNA Update timer value.

In an example, if the UE accesses a gNB other than the last serving gNB, the receiving gNB may trigger the XnAP Retrieve UE Context procedure to get the UE context from the last serving gNB and may trigger an Xn-U Address Indication procedure including tunnel information for potential recovery of data from the last serving gNB. Upon successful UE context retrieval, the receiving gNB may perform the slice-aware admission control in case of receiving slice information and may become the serving gNB and may further trigger the NGAP Path Switch Request and applicable RRC procedures. After the path switch procedure, the serving gNB may trigger release of the UE context at the last serving gNB by means of the XnAP UE Context Release procedure.

In an example, in case the wireless device is not reachable at the last serving gNB, the gNB may: fail an AMF initiated UE-associated class 1 procedure which may allow the signaling of unsuccessful operation in the respective response message; and may trigger the NAS Non Delivery Indication procedure to report the non-delivery of any NAS PDU received from the AMF for the UE.

In an example, if the UE accesses a gNB other than the last serving gNB and the receiving gNB does not find a valid UE Context, the receiving gNB may perform establishment of a new RRC connection instead of resumption of the previous RRC connection. UE context retrieval may fail and hence a new RRC connection may need to be established if the serving AMF changes.

In an example, a UE in the RRC_INACTIVE state may be required to initiate RNA update procedure when the UE moves out of the configured RNA. When receiving RNA update request from the UE, the receiving gNB may trigger the XnAP Retrieve UE Context procedure to get the UE context from the last serving gNB and may decide to send the UE back to RRC_INACTIVE state, move the UE into RRC_CONNECTED state, or send the UE to RRC_IDLE. In case of periodic RNA update, if the last serving gNB decides not to relocate the UE context, the last serving gNB may fail the Retrieve UE Context procedure and may send the UE back to RRC_INACTIVE, or to RRC_IDLE directly by an encapsulated RRCRelease message.

In an example, a UE in RRC_INACTIVE may perform cell reselection.

In an example, a UE in the RRC_INACTIVE state may be configured with an RNA by the last serving base station. The RNA may cover a single cell or multiple cells. In an example, the RNA may be contained within the CN registration area. In an example, Xn connectivity may be available within the RNA. In an example, a RAN-based notification area update (RNAU) may be periodically sent by the UE and may be sent when the cell reselection procedure of the UE selects a cell that does not belong to the configured RNA.

In an example, the RNA may be configured as a list of cells: a UE may be provided an explicit list of cells (one or more) that constitute the RNA. In an example, the RNA may be configured as list of RAN areas. A UE may be provided (at least one) RAN area ID, where a RAN area may be a subset of a CN Tracking Area or equal to a CN Tracking Area. A RAN area may be specified by one RAN area ID, which may comprise of a TAC and optionally a RAN area Code. In an example, a cell may broadcast one or more RAN area IDs in the system information.

In an example, base station may provide different RNA definitions to different UEs but not mix different definitions to the same UE at the same time. UE may support RNA configuration options indicated above.

Figure 16:
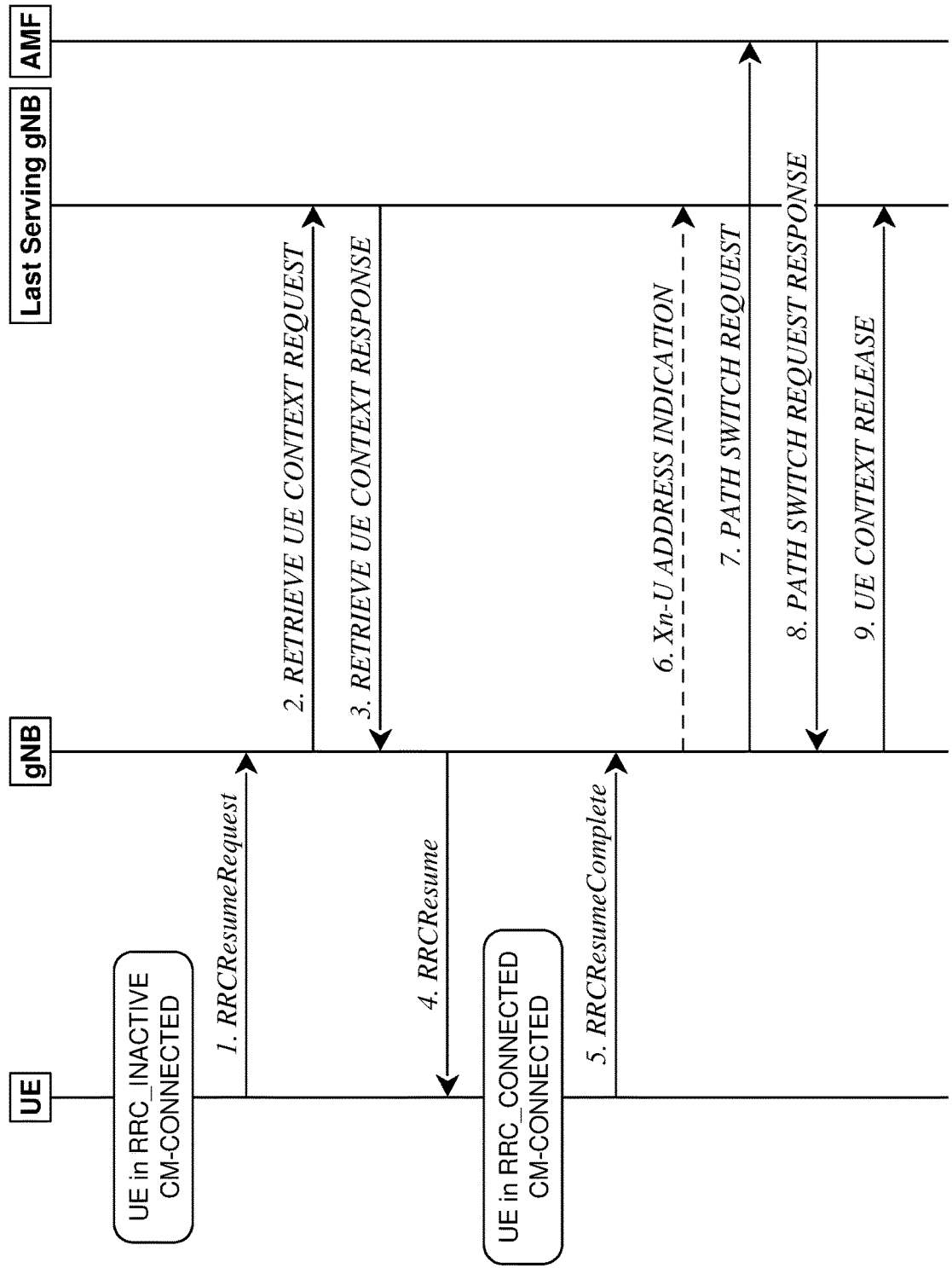
FIG. 16 shows an example UE triggered transition from RRC_INACTIVE to RRC_CONNECTED in accordance with several of various embodiments of the present disclosure.

An example UE triggered transition from RRC_INACTIVE to RRC_CONNECTED in case of UE context retrieval success is shown in FIG. 16. Example actions for this process may be as follows:

The UE may resume from RRC_INACTIVE, providing the I-RNTI, allocated by the last serving gNB.

The gNB, if able to resolve the gNB identity contained in the I-RNTI, may request the last serving gNB to provide UE Context data.

The last serving gNB may provide UE context data.

The gNB and UE completes the resumption of the RRC connection. User Data may be sent if the grant allows.

If loss of DL user data buffered in the last serving gNB may be prevented, the gNB may provide forwarding addresses.

The gNB may perform path switch.

The gNB may trigger the release of the UE resources at the last serving gNB.

In an example, after the first action indicated above, when the gNB decides to reject the Resume Request and keep the UE in RRC_INACTIVE without any reconfiguration or when the gNB decides to setup a new RRC connection, SRB0 (without security) may be used. When the gNB decides to reconfigure the UE (e.g., with a new DRX cycle or RNA) or when the gNB decides to push the UE to RRC_IDLE, SRB1 (with at least integrity protection) may be used.

Figure 17:
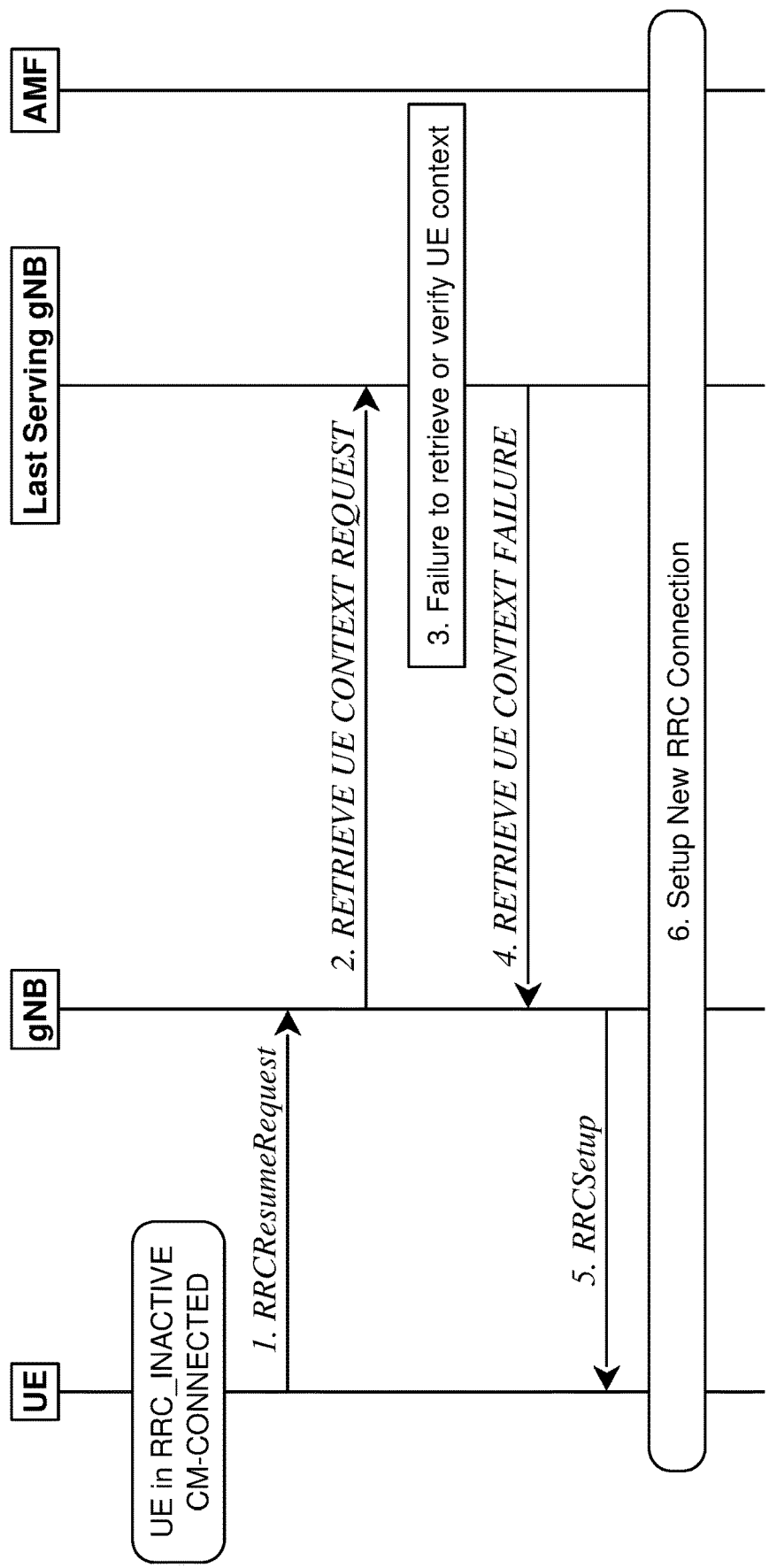
FIG. 17 shows an example UE triggered transition from RRC_INACTIVE to RRC_CONNECTED in accordance with several of various embodiments of the present disclosure.

An example UE triggered transition from RRC_INACTIVE to RRC_CONNECTED in case of UE context retrieval failure is shown in FIG. 17. Example actions for this process may be as follows:

The UE resumes from RRC_INACTIVE, providing the I-RNTI, allocated by the last serving gNB.

The gNB, if able to resolve the gNB identity contained in the I-RNTI, may request the last serving gNB to provide UE Context data.

The last serving gNB may not retrieve or verify the UE context data.

The last serving gNB may indicate the failure to the gNB. The gNB may perform a fallback to establish a new RRC connection by sending RRCSetup.

A new connection may be set up.

Figure 18:
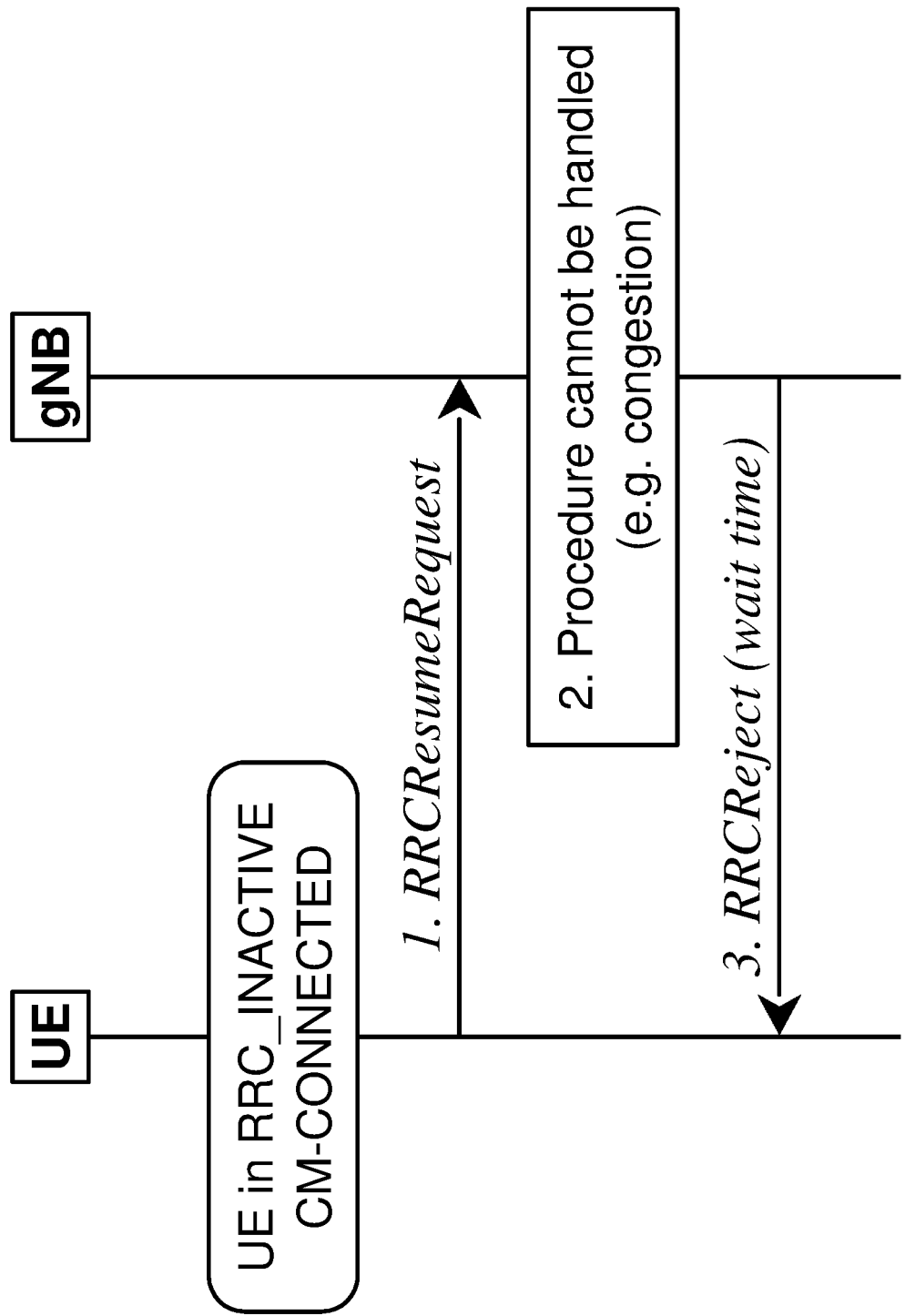
FIG. 18 shows an example RRC resume request with network rejection in accordance with several of various embodiments of the present disclosure.

An example rejection from the network when the UE attempts to resume a connection from RRC_INACTIVE is shown in FIG. 18. Example actions for this process may be as follows:

UE may attempt to resume the connection from RRC_I-NACTIVE.

The gNB may not be able to handle the procedure, for instance due to congestion.

The gNB may send RRCReject (with a wait time) to keep the UE in RRC_INACTIVE.

Figure 19:
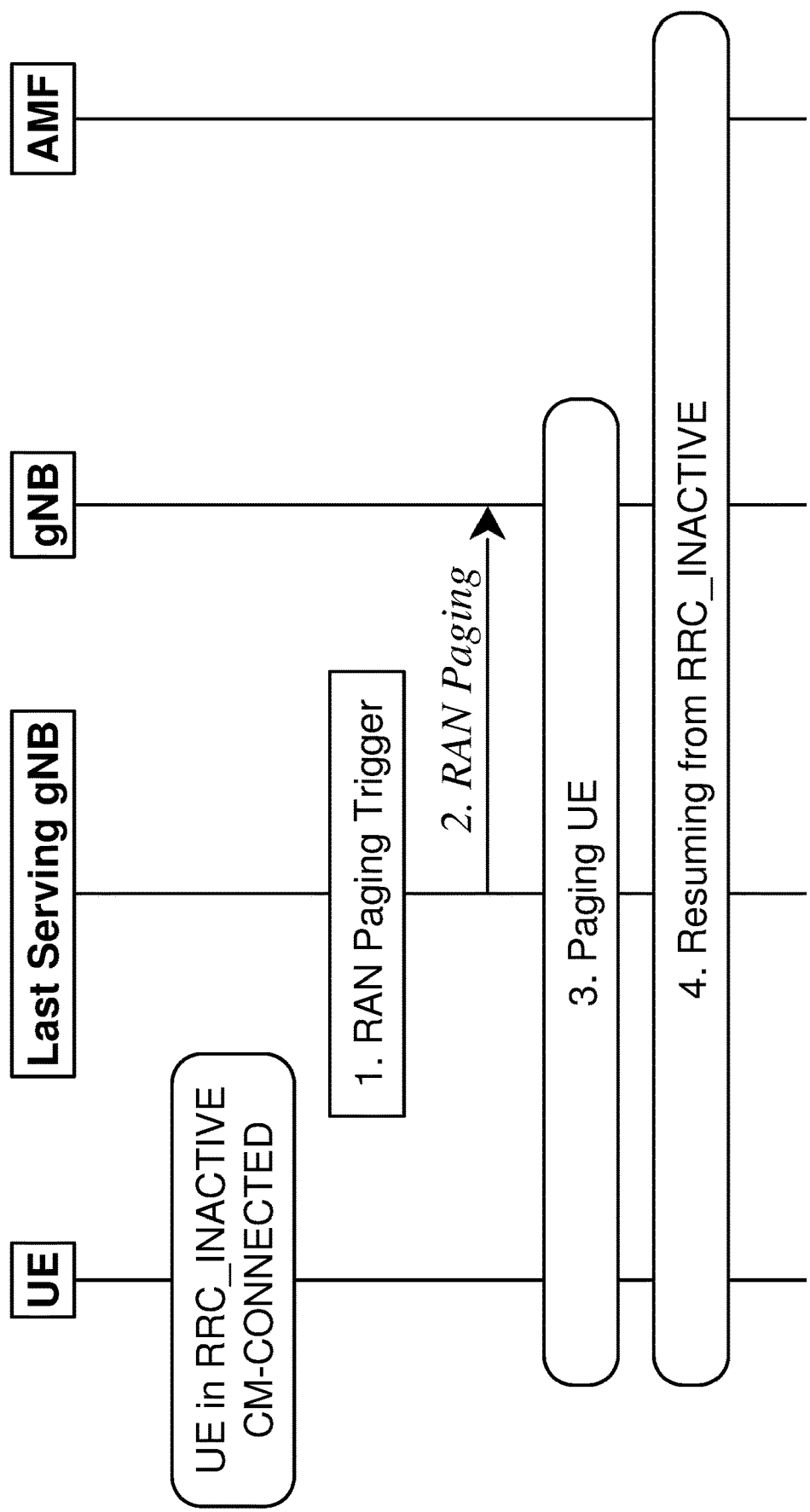
FIG. 19 shows an example network triggered transition from RRC_INACTIVE to RRC_CONNECTED in accordance with several of various embodiments of the present disclosure.

An example network-triggered transition from RRC_I-NACTIVE to RRC_CONNECTED is shown in FIG. 19. Example actions for this process may be as follows:

A RAN paging trigger event may occur (e.g., incoming DL user plane, DL signaling from 5GC, etc.).

RAN paging may be triggered; either only in the cells controlled by the last serving gNB or also by means of Xn RAN Paging in cells controlled by other gNB s, configured to the UE in the RAN-based Notification Area (RNA).

The UE may be paged with the I-RNTI.

If the UE has been successfully reached, the UE may attempt to resume from RRC_INACTIVE.

Figure 20:
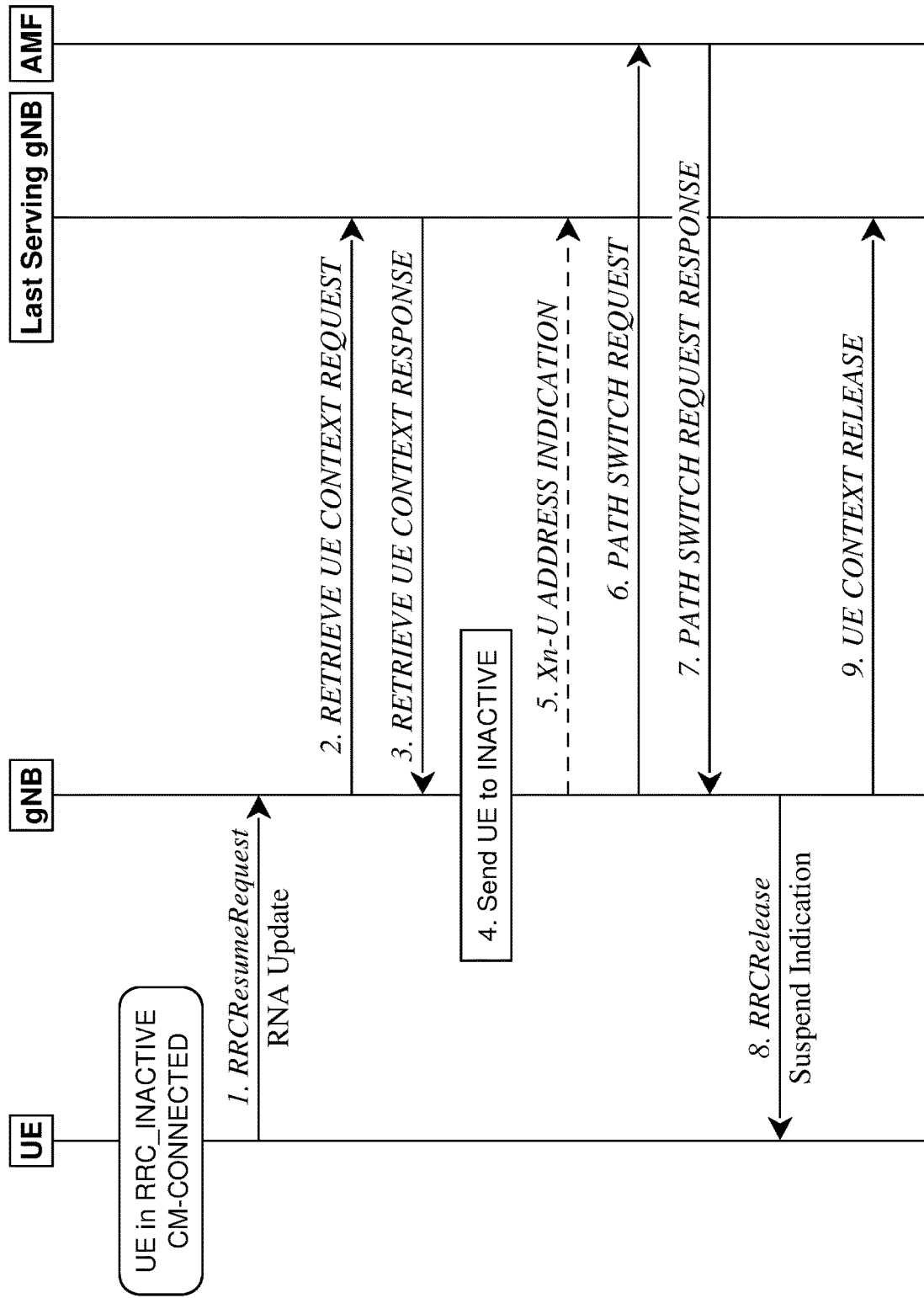
FIG. 20 shows an example RAN notification area (RNA) update procedure in accordance with several of various embodiments of the present disclosure.

An example UE-triggered RNA update procedure involving context retrieval over Xn is shown in FIG. 20. The procedure may be triggered when the UE moves out of the configured RNA, or periodically. Example actions for this process may be as follows:

The UE may resume from RRC_INACTIVE, providing the I-RNTI allocated by the last serving gNB and appropriate cause value, e.g., RAN notification area update.

The gNB, if able to resolve the gNB identity contained in the I-RNTI, may request the last serving gNB to provide UE Context, providing the cause value received in the first action.

The last serving gNB may provide the UE context. Alternatively, the last serving gNB may decide to move the UE to RRC_IDLE or, if the UE is still within the previously configured RNA, to keep the UE context in the last serving gNB and to keep the UE in RRC_INACTIVE.

The gNB may move the UE to RRC_CONNECTED or may send the UE back to RRC_IDLE (in which case an RRCRelease message may be sent by the gNB), or send the UE back to RRC_INACTIVE.

If loss of DL user data buffered in the last serving gNB may be prevented, the gNB may provide forwarding addresses.

The gNB performs path switch.

The gNB may keep the UE in RRC_INACTIVE state by sending RRCRelease with suspend indication.

The gNB may trigger the release of the UE resources at the last serving gNB.

Figure 21:
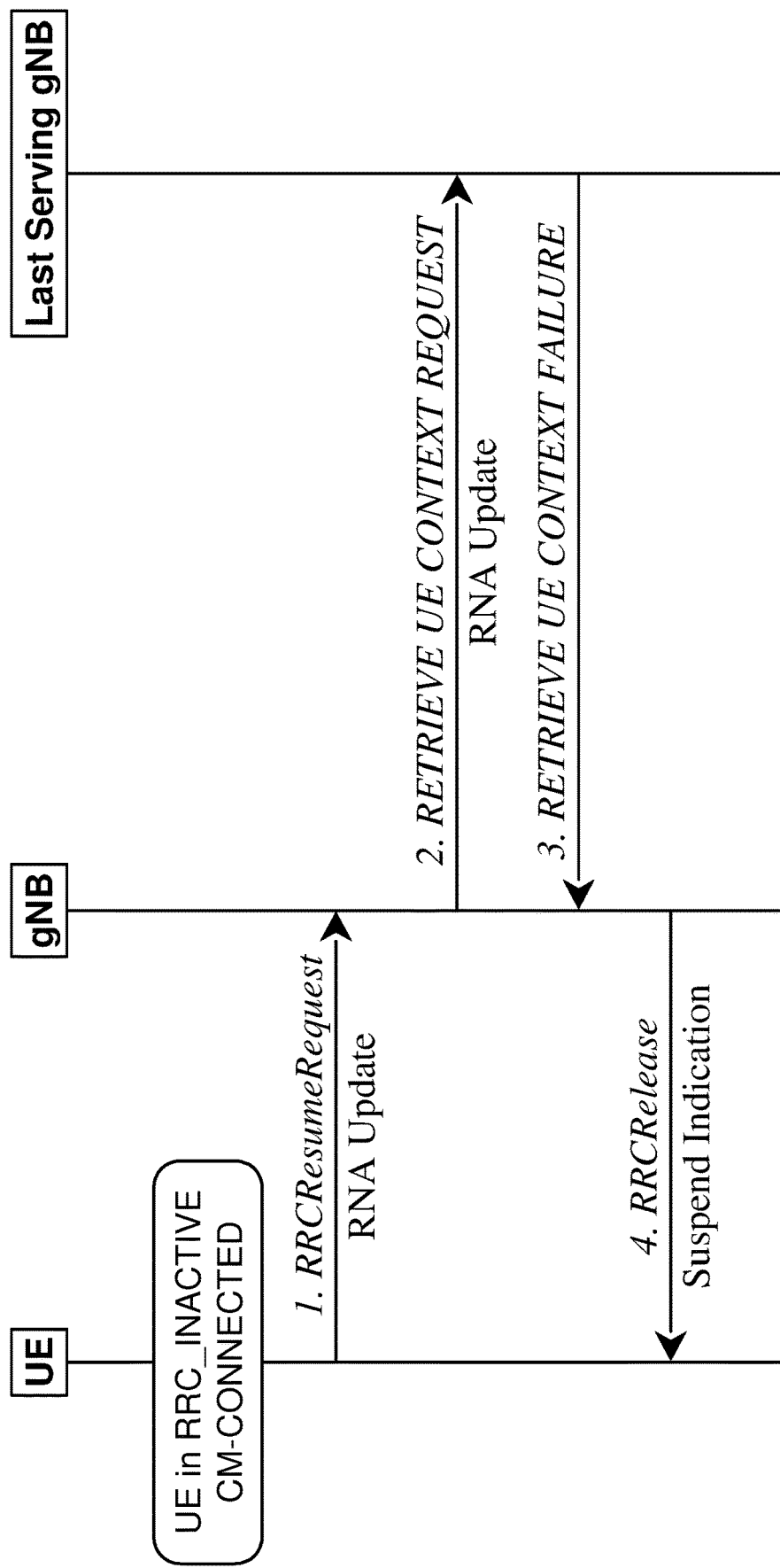
FIG. 21 shows an example periodic RNA update procedure in accordance with several of various embodiments of the present disclosure.

An example RNA update procedure for the case when the UE is still within the configured RNA and the last serving gNB decides not to relocate the UE context and to keep the UE in RRC_INACTIVE is shown in FIG. 21. Example actions for this process may be as follows:

The UE may resume from RRC_INACTIVE, providing the I-RNTI allocated by the last serving gNB and appropriate cause value, e.g., RAN notification area update.

The gNB, if able to resolve the gNB identity contained in the I-RNTI, may request the last serving gNB to provide UE Context, providing the cause value received in the first action.

The last serving gNB may store received information to be used in the next resume attempt (e.g., C-RNTI and PCI related to the resumption cell) and may respond to the gNB with the RETRIEVE UE CONTEXT FAILURE message including an encapsulated RRCRelease message. The RRCRelease message may include Suspend Indication.

The gNB may forward the RRCRelease message to the UE.

Figure 22:
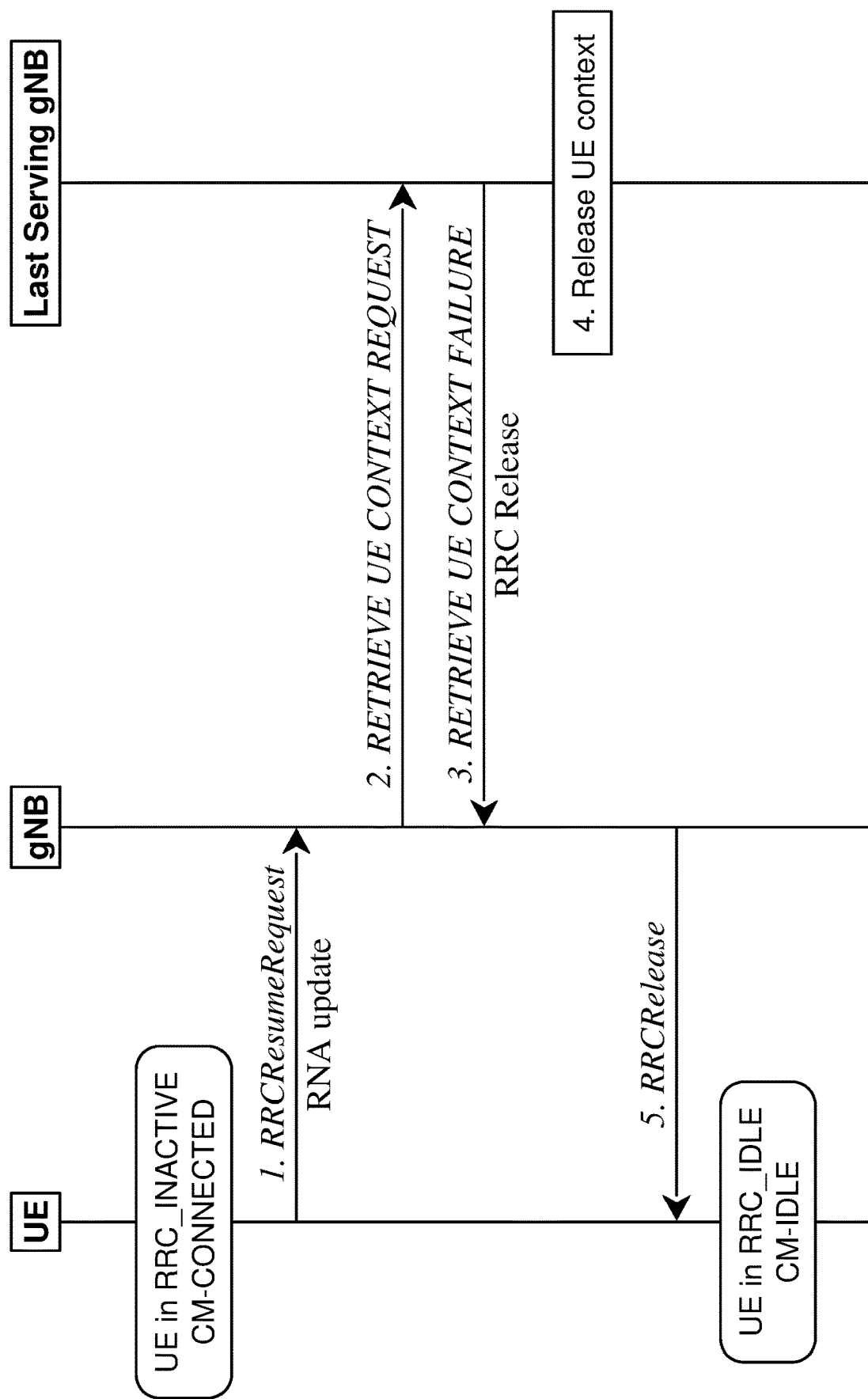
FIG. 22 shows an example RNA update procedure in accordance with several of various embodiments of the present disclosure.

An example RNA update procedure for the case when the last serving gNB decides to move the UE to RRC_IDLE is shown in FIG. 22. Example actions for this process may be as follows: The UE may resume from RRC_INACTIVE, providing the I-RNTI allocated by the last serving gNB and appropriate cause value, e.g., RAN notification area update.

The gNB, if able to resolve the gNB identity contained in the I-RNTI, may request the last serving gNB to provide UE Context, providing the cause value received in the first action.

Instead of providing the UE context, the last serving gNB may provide an RRCRelease message to move the UE to RRC_IDLE.

The last serving gNB may delete the UE context.

The gNB may send the RRCRelease which may trigger the UE to move to RRC_IDLE.

In an example, the suspension of the RRC connection may be initiated by the network. When the RRC connection is suspended, the UE may store the UE Inactive AS context and configuration received from the network and may transit to RRC_INACTIVE state. If the UE is configured with secondary cell group (SCG), the UE may release the SCG configuration upon initiating an RRC Connection Resume procedure.

The resumption of a suspended RRC connection may be initiated by upper layers when the UE needs to transit from RRC_INACTIVE state to RRC_CONNECTED state or by RRC layer to perform an RNA update or by RAN paging from BASE STATION. When the RRC connection is resumed, network may configure the UE according to the RRC connection resume procedure based on the stored UE Inactive AS context and RRC configuration received from the network. The RRC connection resume procedure may re-activate AS security and re-establish SRB(s) and DRB(s).

In an example, in response to a request to resume the RRC connection, the network may resume the suspended RRC connection and may send UE to RRC_CONNECTED, or may reject the request to resume and send UE to RRC_INACTIVE (with a wait timer), or directly re-suspend the RRC connection and may send UE to RRC_INACTIVE, or may directly release the RRC connection and send UE to RRC_IDLE, or may instruct the UE to initiate NAS level recovery (in this case the network may send an RRC setup message).

In an example, purpose of an RRC Connection release procedure may be to release the RRC connection, which may include the release of the established radio bearers and radio resources; or to suspend the RRC connection only if SRB2 and at least one DRB are setup, which may include the suspension of the established radio bearers.

In an example, the network may initiate the RRC connection release procedure to transit a UE in RRC_CONNECTED to RRC_IDLE; or to transit a UE in RRC_CONNECTED to RRC_INACTIVE only if SRB2 and at least one DRB is setup in RRC_CONNECTED; or to transit a UE in RRC_INACTIVE back to RRC_INACTIVE when the UE tries to resume; or to transit a UE in RRC_INACTIVE to RRC_IDLE when the UE tries to resume. The procedure may be used to release and redirect a UE to another frequency.

In an example, an RRCRelease message may be used to command the release of an RRC connection or the suspension of the RRC connection. A suspendConfig information element may Indicate configuration for the RRC_INACTIVE state.

In an example, an RRCResume message may be used to resume the suspended RRC connection.

In an example, an RRCResumeComplete message may be used to confirm the successful completion of an RRC connection resumption.

In an example, an RRCResumeRequest message may be used to request the resumption of a suspended RRC connection or to perform an RNA update. A resumeCause IE in the RRCResumeRequest message may provide the resume cause for the RRC connection resume request as provided by the upper layers or RRC. The network may not be expected to reject an RRCResumeRequest due to unknown cause value being used by the UE. In an example, a resumeIdentity IE may indicate a UE identity to facilitate UE context retrieval at gNB.

In an example, a RRCResumeRequest1 message may be used to request the resumption of a suspended RRC connection or perform an RNA update. A resumeCause IE may provide the resume cause for the RRCResumeRequest1 as provided by the upper layers or RRC. A gNB may not be expected to reject an RRCResumeRequest1 due to unknown cause value being used by the UE. A resumeIdentity IE may indicate a UE identity to facilitate UE context retrieval at gNB.

In an example, an IE I-RNTI-Value may be used to identify the suspended UE context of a UE in RRC_INACTIVE. In an example, the IE ShortI-RNTI-Value may be used to identify the suspended UE context of a UE in RRC_INACTIVE using fewer bits compared to I-RNTI-Value.

In an example, Semi-Persistent Scheduling (SPS) may be configured by RRC per Serving Cell and per BWP. Activation and deactivation of the DL SPS may be independent among the Serving Cells.

In an example, for the DL SPS, a DL assignment may be provided by PDCCH, and may be stored or cleared based on L1 signaling indicating SPS activation or deactivation.

In an example, RRC may configure the following parameters when SPS is configured: cs-RNTI: CS-RNTI for activation, deactivation, and retransmission; nrofHARQ-Processes: the number of configured HARQ processes for SPS; periodicity: periodicity of configured downlink assignment for SPS.

In an example, when SPS is released by upper layers, the corresponding configurations may be released.

In an example, after a downlink assignment is configured for SPS, the MAC entity may consider sequentially that the Nth downlink assignment occurs in the slot for which:

$$(numberOfSlotsPerFrame \times SFN + \text{slot number in the frame}) = [(numberOfSlotsPerFrame \times SFNstart\ time + slotstart\ time) + N \times periodicity \times numberOfSlotsPerFrame/10] modulo (1024 \times numberOfSlotsPerFrame)$$

where SFNstart time and slotstart time are the SFN and slot, respectively, of the first transmission of PDSCH where the configured downlink assignment was (re-)initialized.

In an example, for a configured grant Type 1, an uplink grant may be provided by RRC, and may be stored as configured uplink grant.

In an example, for configured grant Type 2, an uplink grant may be provided by PDCCH, and stored or cleared as configured uplink grant based on L1 signalling indicating configured uplink grant activation or deactivation.

In an example, Type 1 and Type 2 configured grants may be configured by RRC per Serving Cell and per BWP. Multiple configurations may be active simultaneously. For Type 2, activation and deactivation may be independent among the Serving Cells. For the same Serving Cell, the MAC entity may be configured with either Type 1 or Type 2.

In an example, RRC may configure the following parameters when the configured grant Type 1 is configured: cs-RNTI: CS-RNTI for retransmission; periodicity: periodicity of the configured grant Type 1; timeDomainOffset: Offset of a resource with respect to SFN=0 in time domain; timeDomainAllocation: Allocation of configured uplink grant in time domain which may contain startSymbolAndLength; nrofHARQ-Processes: the number of HARQ processes for configured grant.

In an example, RRC may configure the following parameters when the configured grant Type 2 is configured: cs-RNTI: CS-RNTI for activation, deactivation, and retransmission; periodicity: periodicity of the configured grant Type 2; nrofHARQ-Processes: the number of HARQ processes for configured grant.

In an example, upon configuration of a configured grant Type 1 for a Serving Cell by upper layers, the MAC entity may: store the uplink grant provided by upper layers as a configured uplink grant for the indicated Serving Cell; initialize or re-initialize the configured uplink grant to start in the symbol according to timeDomainOffset and S (derived from SLIV), and to reoccur with periodicity.

In an example, after an uplink grant is configured for a configured grant Type 1, the MAC entity may consider that the uplink grant recurs associated with each symbol for which:

$$[(SFN \times numberOfSlotsPerFrame \times numberOfSymbolsPerSlot) + (\text{slot number in the frame} \times numberOfSymbolsPerSlot) + \text{symbol number in the slot}] = (timeDomainOffset \times numberOfSymbolsPerSlot + S + N \times periodicity) modulo (1024 \times numberOfSlotsPerFrame \times numberOfSymbolsPerSlot), \text{for all } N >= 0.$$

In an example, after an uplink grant is configured for a configured grant Type 2, the MAC entity may consider that the uplink grant recurs associated with each symbol for which:

$$[(SFN \times numberOfSlotsPerFrame \times numberOfSymbolsPerSlot) + (\text{slot number in the frame} \times numberOfSymbolsPerSlot) + \text{symbol number in the slot}] = [(SFNstart\ time \times numberOfSlotsPerFrame \times numberOfSymbolsPerSlot + slotstart\ time \times numberOfSymbolsPerSlot + symbolstart\ time) + N \times periodicity] modulo (1024 \times numberOfSlotsPerFrame \times numberOfSymbolsPerSlot), \text{for all } N >= 0.$$

where SFNstart time, slotstart time, and symbolstart time are the SFN, slot, and symbol, respectively, of the first transmission opportunity of PUSCH where the configured uplink grant was (re-)initialized.

In an example, when a configured uplink grant is released by upper layers, the corresponding configurations may be released, and corresponding uplink grants may be cleared.

In an example, HARQ process identifier for a configured grant may be based on the equation: HARQ Process ID= [floor(CURRENT_symbol/periodicity)] modulo nrofHARQ-Processes, where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot may refer to the number of consecutive slots per frame and the number of consecutive symbols per slot, respectively. In an example, CURRENT_symbol may refer to the symbol index of the first transmission occasion of a repetition bundle that takes place. In an example, a HARQ process may be configured for a configured uplink grant if the configured uplink grant is activated and the associated HARQ process ID is less than nrofHARQ-Processes.

In an example, the IE ConfiguredGrantConfig may be used to configure uplink transmission without dynamic grant according to two possible schemes. The actual uplink grant may either be configured via RRC (type1) or provided via the PDCCH (addressed to CS-RNTI) (type2).

In an example, the IE SPS-Config may be used to configure downlink semi-persistent transmission. Downlink SPS may be configured on the SpCell as well as on SCells. In an example, the network may configure SPS-Config for at most one cell in a cell group.

In an example, Paging may enable the network to reach UEs in RRC_IDLE and in RRC_INACTIVE state through Paging messages, and to notify UEs in RRC_IDLE, RRC_INACTIVE and RRC_CONNECTED state of system information change and ETWS/CMAS indications through Short Messages. Both Paging messages and Short Messages may be addressed with P-RNTI on PDCCH, but while the former is sent on PCCH, the latter may be sent over PDCCH directly.

In an example, while in RRC_IDLE, a UE may monitor the paging channels for CN-initiated paging; in RRC_INACTIVE the UE may also monitor paging channels for RAN-initiated paging. A UE may not monitor paging channels continuously. In an example, paging DRX may be defined and the UE in RRC_IDLE or RRC_INACTIVE may monitor paging channels during one Paging Occasion (PO) per DRX cycle. The Paging DRX cycles are configured by the network: for CN-initiated paging, a default cycle may be broadcast in system information; for CN-initiated paging, a UE specific cycle may be configured via NAS signaling; for RAN-initiated paging, a UE-specific cycle may be configured via RRC signaling.

In an example, the POs of a UE for CN-initiated and RAN-initiated paging may be based on the same UE ID, resulting in overlapping POs for both. The number of different POs in a DRX cycle may be configurable via system information and a network may distribute UEs to those POs based on their IDs.

In an example, when in RRC_CONNECTED, the UE may monitor the paging channels in a PO signaled in system information for SI change indication and PWS notification. In case of bandwidth adaptation (BA), a UE in RRC_CONNECTED may monitor paging channels on the active BWP with common search space configured.

In an example, for paging optimization for UEs in CM_IDLE: at UE context release, the BASE STATION node may provide the AMF with a list of recommended cells and BASE STATION nodes as assistance info for subsequent paging. The AMF may provide Paging Attempt Information comprising a Paging Attempt Count and the Intended Number of Paging Attempts and may include the Next Paging Area Scope. If Paging Attempt Information is included in the Paging message, a paged BASE STATION node may receive the same information during a paging attempt. The Paging Attempt Count may be increased by one at each new paging attempt. The Next Paging Area Scope, when present, may indicate whether the AMF plans to modify the paging area currently selected at next paging attempt. If the UE has changed its state to CM CONNECTED the Paging Attempt Count may be reset.

In an example, for paging optimization for UEs in RRC_INACTIVE: at RAN Paging, the serving BASE STATION node may provide RAN Paging area information. The serving BASE STATION node may provide RAN Paging attempt information. A paged BASE STATION node may receive the same RAN Paging attempt information during a paging attempt with the following content: Paging Attempt Count, the intended number of paging attempts and the Next Paging Area Scope. The Paging Attempt Count may be increased by one at each new paging attempt. The Next Paging Area Scope, when present, may indicate whether the serving NG_RAN node plans to modify the RAN Paging Area currently selected at next paging attempt. If the UE leaves RRC_INACTIVE state, the Paging Attempt Count may be reset.

In an example, the network may initiate the paging procedure by transmitting the Paging message at the UE's paging occasion. The network may address multiple UEs within a Paging message by including one PagingRecord for each UE.

In an example, the PCCH-Message class may be the set of RRC messages that may be sent from the Network to the UE on the PCCH logical channel.

In an example, the Paging message may be used for the notification of one or more UEs.

In an example, the RRCRelease message may be used to command the release of an RRC connection or the suspension of the RRC connection. A suspendconfig IE in the RRCRelease message may indicate configuration for the RRC_INACTIVE state. The suspendconfig may comprise a plurality of parameters comprising a full-RNTI, a short-RNTI, a ran-PagingCycle, a ran-NotificationAreaInfo and a t380. The ran-PagingCycle may indicate a UE specific cycle for RAN-initiated paging. The ran-NotoficationAreaInfo may indicate information about a RAN notification area (RNA) (e.g., the cell list). The t380 timer may indicate a timer that triggers the periodic RNAU procedure in UE.

In an example, an IE SearchSpace may define how/where to search for PDCCH candidates. A search space may be associated with a ControlResourceSet. In an example, a parameter common may indicate that a search space is common search space (CSS) and may indicate DCI formats to monitor. A parameter controlResourceSetId may indicate the CORESET applicable for the SearchSpace. A parameter duration may indicate a number of consecutive slots that a SearchSpace may last in an occasion, e.g., upon a period as given in the periodicityAndOffset. If the field is absent, the wireless device may apply the value 1 slot, except for DCI format 2_0. The wireless device may ignore this field for DCI format 2_0. The maximum valid duration may be periodicity-1 (periodicity as given in the monitoringSlotPeriodicityAndOffset). The parameter monitoringSlotPeriodicityAndOffset may indicate slots for PDCCH Monitoring configured as periodicity and offset. The parameter monitoringSymbolsWithinSlot may indicate the first symbol(s) for PDCCH monitoring in the slots configured for PDCCH monitoring. The most significant (left) bit may represent the first OFDM in a slot, and the second most significant (left) bit represents the second OFDM symbol in a slot and so on. The bit(s) set to one may identify the first OFDM symbol(s) of the control resource set within a slot. If the cyclic prefix of the BWP is set to extended CP, the last two bits within the bit string may be ignored by the wireless device. The parameter nrofCandidates-SFI may indicate the number of PDCCH candidates specifically for format 2-0 for the configured aggregation level. The parameter searchSpaceId may identify the search space. SearchSpaceId=0 may identify a searchSpaceZero configured via PBCH (MIB) or Serving-CellConfigCommon and may not be used in the SearchSpace IE. The searchSpaceId may be unique among the BWPs of a Serving Cell. In case of cross carrier scheduling, search spaces with the same searchSpaceId in scheduled cell and scheduling cell may be linked to each other. The wireless device may apply the search space for the scheduled cell if the DL BWPs in which the linked search spaces are configured in scheduling cell and scheduled cell are both active. The parameter searchSpaceType may indicate whether this is a common search space (present) or a UE specific search space as well as DCI formats to monitor for. The parameter ue-Specific may configure this search space as UE specific search space (USS). The UE may monitor the DCI format with CRC scrambled by C-RNTI, CS-RNTI (if configured), and SP-CSI-RNTI (if configured).

In an example, an IE SearchSpaceId may be used to identify Search Spaces. The ID space may be used across the BWPs of a Serving Cell. The search space with the SearchSpaceId=0 may identify the search space configured via PBCH (MIB) and in ServingCellConfigCommon (searchSpaceZero).

In an example, an IE SearchSpaceZero may be used to configure SearchSpace #0 of the initial BWP. The IE PDCCH-Config may be used to configure UE specific PDCCH parameters such as control resource sets (CORESET), search spaces and additional parameters for acquiring the PDCCH. In an example, a parameter controlResourceSetToAddModList may indicate a list of UE specifically configured Control Resource Sets (CORESETs) to be used by the wireless device. In an example, an IE PDCCH-ConfigCommon may be used to configure cell specific PDCCH parameters provided in SIB as well as in dedicated signaling. In an example, an IE ControlResourceSet may be used to configure a time/frequency control resource set (CORESET) in which to search for downlink control information. In an example, a ControlResourceSetId IE may indicate a short identity, used to identify a control resource set within a serving cell. The IE ControlResourceSetZero may be used to configure CORESET #0 of the initial BWP.

In an example, in RRC_CONNECTED, a gNB may be responsible for maintaining the timing advance to keep the L1 synchronized. Serving cells having UL to which the same timing advance applies and using the same timing reference cell may be grouped in a TAG. A TAG may contain at least one serving cell with configured uplink, and the mapping of a serving cell to a TAG may be configured by RRC. For the primary TAG the UE may use the PCell as timing reference. In a secondary TAG, the UE may use any of the activated SCells of the TAG as a timing reference cell and may not change it unless necessary. Timing advance updates may be signaled by the gNB to the UE via MAC CE commands. Such commands may restart a TAG-specific timer which may indicate whether the L1 can be synchronized or not: when the timer is running, the L1 is considered synchronized, otherwise, the L1 is considered non-synchronized (in which case uplink transmission may only take place on PRACH).

In an example, RRC may configure the following parameters for the maintenance of UL time alignment: timeAlignmentTimer (per TAG) which may control how long the MAC entity may consider the Serving Cells belonging to the associated TAG to be uplink time aligned.

In an example, when a Timing Advance Command MAC CE is received, and if an NTA has been maintained with the indicated TAG: The MAC entity may apply the Timing Advance Command for the indicated TAG and may start or restart the timeAlignmentTimer associated with the indicated TAG.

In an example, when a Timing Advance Command is received in a Random Access Response message for a Serving Cell belonging to a TAG: if the Random Access Preamble was not selected by the MAC entity among the contention-based Random Access Preamble: the MAC entity may apply the Timing Advance Command for this TAG; and may start or restart the timeAlignmentTimer associated with this TAG.

In an example, when a Timing Advance Command is received in a Random Access Response message for a Serving Cell belonging to a TAG: if the timeAlignmentTimer associated with this TAG is not running: the MAC entity may apply the Timing Advance Command for this TAG; start the timeAlignmentTimer associated with this TAG; and may stop timeAlignmentTimer associated with this TAG when the Contention Resolution is considered not successful or when the Contention Resolution is considered successful for SI request, after transmitting HARQ feedback for MAC PDU including UE Contention Resolution Identity MAC CE.

In an example, when a Timing Advance Command is received in a Random Access Response message for a Serving Cell belonging to a TAG: if the timeAlignmentTimer associated with this TAG is running: the wireless device may ignore the received Timing Advance Command.

In an example, when a timeAlignmentTimer expires: if the timeAlignmentTimer is associated with the PTAG: the wireless device may flush HARQ buffers for Serving Cells; notify RRC to release PUCCH for Serving Cells, if configured; notify RRC to release SRS for Serving Cells, if configured; clear configured downlink assignments and configured uplink grants; clear PUSCH resource for semi-persistent CSI reporting; consider running timeAlignmentTimers as expired; maintain NTA of all TAGs.

In an example, when a timeAlignmentTimer expires: if the timeAlignmentTimer is associated with an STAG, then for all Serving Cells belonging to this TAG: the wireless device may flush HARQ buffers; notify RRC to release PUCCH, if configured; notify RRC to release SRS, if configured; clear configured downlink assignments and configured uplink grants; clear PUSCH resource for semi-persistent CSI reporting; and maintain NTA of this TAG.

In an example, when the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity may consider the timeAlignmentTimer associated with the SCell as expired.

In an example, the MAC entity may not perform an uplink transmission on a Serving Cell except the Random Access Preamble transmission when the timeAlignmentTimer associated with the TAG to which this Serving Cell belongs is not running. Furthermore, when the timeAlignmentTimer associated with the PTAG is not running, the MAC entity may not perform an uplink transmission on a Serving Cell except the Random Access Preamble transmission on the SpCell.

In an example, a Timing Advance Command MAC CE may be identified by MAC subheader with a corresponding LCID. The Timing Advance Command MAC CE may have a fixed size and may comprise of an octet comprising a TAG ID field and a Timing Advance Command field. The TAG Identity (TAG ID) may indicate the TAG Identity of the addressed TAG. The TAG containing the SpCell may have a TAG Identity 0. The length of the TAG ID field may be 2 bits. The Timing Advance Command field may indicate the index value TA (0, 1, 2 . . . 63) used to control the amount of timing adjustment that MAC entity has to apply. The length of the Timing Advance Command field may be 6 bits.

In an example, a Logical Channel Prioritization (LCP) procedure may be applied when a new transmission is performed. The RRC may control the scheduling of uplink data by signaling for each logical channel per MAC entity: priority where an increasing priority value indicates a lower priority level; prioritisedBitRate which may set the Prioritized Bit Rate (PBR); bucketSizeDuration which may set the Bucket Size Duration (BSD).

In an example, RRC may additionally control the LCP procedure by configuring mapping restrictions for each logical channel: allowedSCS-List which may set the allowed Subcarrier Spacing(s) for transmission; maxPUSCH-Duration which may set the maximum PUSCH duration allowed for transmission; configuredGrantType1 Allowed which may set whether a configured grant Type 1 may be used for transmission; and allowedServingCells which may set the allowed cell(s) for transmission.

In an example, the following UE variable may be used for the Logical channel prioritization procedure: Bj which may be maintained for each logical channel j. The MAC entity may initialize Bj of the logical channel to zero when the logical channel is established.

In an example, for a logical channel j, the MAC entity may: increment Bj by the product PBR×T before every instance of the LCP procedure, where T is the time elapsed since Bj was last incremented; if the value of Bj is greater than the bucket size (e.g., PBR×BSD): the MAC entity may set Bj to the bucket size.

In an example, the MAC entity, when a new transmission is performed, may select the logical channels for each UL grant that satisfy the following conditions: the set of allowed Subcarrier Spacing index values in allowedSCS-List, if configured, includes the Subcarrier Spacing index associated to the UL grant; and maxPUSCH-Duration, if configured, is larger than or equal to the PUSCH transmission duration associated to the UL grant; and configuredGrantType1 Allowed, if configured, is set to true in case the UL grant is a Configured Grant Type 1; and allowedServingCells, if configured, includes the Cell information associated to the UL grant.

In an example, the Subcarrier Spacing index, PUSCH transmission duration and Cell information may be included in Uplink transmission information received from lower layers for the corresponding scheduled uplink transmission.

In an example, when a new transmission is performed, the MAC entity may allocate resources to the logical channels as follows: logical channels selected for the UL grant with Bj>0 may be allocated resources in a decreasing priority order. If the PBR of a logical channel is set to infinity, the MAC entity may allocate resources for the data that is available for transmission on the logical channel before meeting the PBR of the lower priority logical channel(s); decrement Bj by the total size of MAC SDUs served to logical channel j; if any resources remain, the logical channels selected are served in a strict decreasing priority order (regardless of the value of Bj) until either the data for that logical channel or the UL grant is exhausted, whichever comes first. Logical channels configured with equal priority may be served equally.

In an example, if the MAC entity is requested to simultaneously transmit multiple MAC PDUs, or if the MAC entity receives the multiple UL grants within one or more coinciding PDCCH occasions (e.g., on different Serving Cells), it may be up to UE implementation in which order the grants are processed.

In an example, logical channels may be prioritized in accordance with an order. An example priority (e.g., when the UE is in RRC connected state) is shown below (highest priority listed first):
 C-RNTI MAC CE or data from UL-CCCH; Configured Grant Confirmation MAC CE;
 MAC CE for BSR, with exception of BSR included for padding;
 Single Entry PHR MAC CE or Multiple Entry PHR MAC CE;
 data from any Logical Channel, except data from UL-CCCH;
 MAC CE for Recommended bit rate query;
 MAC CE for BSR included for padding.

In an example, the MAC entity may multiplex MAC CEs and MAC SDUs in a MAC PDU according to logical channel prioritization rules.

In an example, an IE LogicalChannelConfig may be used to configure the logical channel parameters.

In an example, an IE LogicalChannelIdentity may be used to identify one logical channel (LogicalChannelConfig) and the corresponding RLC bearer (RLC-BearerConfig).

In an example in case of transparent MAC, a MAC PDU may comprise solely of a MAC SDU whose size is aligned to a TB. This MAC PDU may be used for transmissions on PCH, BCH, and DL-SCH including BCCH.

In an example, a UE may be configured with one or more Sounding Reference Signal (SRS) resource sets as configured by the higher layer parameter SRS-ResourceSet. For an SRS resource set, a UE may be configured with $K \geq 1$ SRS resources (e.g., higher layer parameter SRS-Resource), where the maximum value of K may be indicated by UE capability. The SRS resource set applicability may be configured by the higher layer parameter usage in SRS-ResourceSet. When the higher layer parameter usage is set to 'beamManagement', one SRS resource in each of multiple SRS sets may be transmitted at a given time instant, but the SRS resources in different SRS resource sets with the same time domain behavior in the same BWP may be transmitted simultaneously.

In an example, for aperiodic SRS at least one state of the DCI field may be used to select at least one out of the configured SRS resource set(s).

In an example, SRS parameters may be semi-statically configurable by higher layer parameter (e.g., SRS-Resource). srs-ResourceId may determines SRS resource configuration identity. Number of SRS ports may be defined by the higher layer parameter nrofSRS-Ports. Time domain behavior of SRS resource configuration may be indicated by the higher layer parameter resourceType, and may be periodic, semi-persistent, aperiodic SRS transmission. Slot level periodicity and slot level offset may be defined by the higher layer parameters periodicityAndOffset-p or periodicityAndOffset-sp for an SRS resource of type periodic or semi-persistent. The UE may not be expected to be configured with SRS resources in the same SRS resource set SRS-ResourceSet with different slot level periodicities. For an SRS-ResourceSet configured with higher layer parameter resourceType set to 'aperiodic', a slot level offset may be defined by the higher layer parameter slotOffset. Number of OFDM symbols in the SRS resource, starting OFDM symbol of the SRS resource within a slot including repetition factor R may be defined by the higher layer parameter resourceMapping. SRS bandwidth $B_{SRS}$ and $C_{SRS}$, may be defined by the higher layer parameter freqHopping. Frequency hopping bandwidth, $b_{hop}$, may be defined by the higher layer parameter freqHopping. Frequency domain position and configurable shift may be defined by the higher layer parameters freqDomainPosition and freqDomainShift, respectively. Cyclic shift may be defined by the higher layer parameter cyclicShift-n2 or cyclicShift-n4 for transmission comb value 2 and 4, respectively. Transmission comb value amay be defined by the higher layer parameter transmissionComb. Transmission comb offset may be defined by the higher layer parameter combOffset-n2 or combOffset-n4 for transmission comb value 2 or 4, respectively. SRS sequence ID may be defined by the higher layer parameter sequenceId.

In an example, the configuration of the spatial relation between a reference RS and the target SRS, where the higher layer parameter spatialRelationInfo, if configured, may contain the ID of the reference RS. The reference RS may be an SS/PBCH block, CSI-RS configured on serving cell indicated by higher layer parameter servingCellId if present, same serving cell as the target SRS otherwise, or an SRS configured on uplink BWP indicated by the higher layer parameter uplinkBWP, and serving cell indicated by the higher layer parameter servingCellId if present, same serving cell as the target SRS otherwise.

In an example, the UE may be configured by the higher layer parameter resourceMapping in SRS-Resource with an SRS resource occupying $N_S \in \{1,2,4\}$ adjacent symbols within the last 6 symbols of the slot, where antenna ports of the SRS resources may be mapped to each symbol of the resource.

In an example, when PUSCH and SRS are transmitted in the same slot, the UE may be configured to transmit SRS after the transmission of the PUSCH and the corresponding DM-RS.

In an example, for a UE configured with one or more SRS resource configuration(s), and when the higher layer parameter resourceType in SRS-Resource is set to 'periodic': if the UE is configured with the higher layer parameter spatialRelationInfo containing the ID of a reference 'ssb-Index', the UE may transmit the target SRS resource with the same spatial domain transmission filter used for the reception of the reference SS/PBCH block, if the higher layer parameter spatialRelationInfo contains the ID of a reference 'csi-RS-Index', the UE shall transmit the target SRS resource with the same spatial domain transmission filter used for the reception of the reference periodic CSI-RS or of the reference semi-persistent CSI-RS, if the higher layer parameter spatialRelationInfo containing the ID of a reference 'srs', the UE shall transmit the target SRS resource with the same spatial domain transmission filter used for the transmission of the reference periodic SRS.

In an example, RRC_INACTIVE state may be used to reduce network signaling load and to reduce latency involved in transitioning to RRC_CONNECTED state. In RRC_INACTIVE state, the AS context may be stored by both UE and gNB and the state transition from inactive state to connected state may be faster and the core network connection may be maintained (e.g., UE may remain in CM-CONNECTED). In an example, network may reach UEs in RRC_INACTIVE state through Paging messages, and may notify UEs in RRC_INACTIVE, change of system information and ETWS/CMAS indications through Short Messages. The Paging messages and/or Short Messages may be addressed with P-RNTI on PDCCH. The paging messages may be sent on PCCH and Short Messages may be sent over PDCCH.

In an example, the UE may monitor a Paging channel for CN paging using 5G-S-TMSI and RAN paging using full I-RNTI (Inactive RNTI). The I-RNTI may be used to identify the suspended UE context of a UE in RRC_INACTIVE state. The network may assign I-RNTI to the UE when moving from RRC_CONNECTED to RRC_INACTIVE state in RRC Release message within SuspendConfig.

In an RRC_INACTIVE state, a wireless device may transmit data using random access processes and/or using pre-configured/configured resources. The existing uplink transmission processes for RRC_INACTIVE state may lead to inefficient uplink transmissions for example due to lack of uplink synchronization and degraded network performance. There is a need to enhance the existing processes for uplink transmission during the RRC_INACTIVE state. Example embodiments enhance the wireless device and network processes during an RRC_INACTIVE state.

Figure 23:
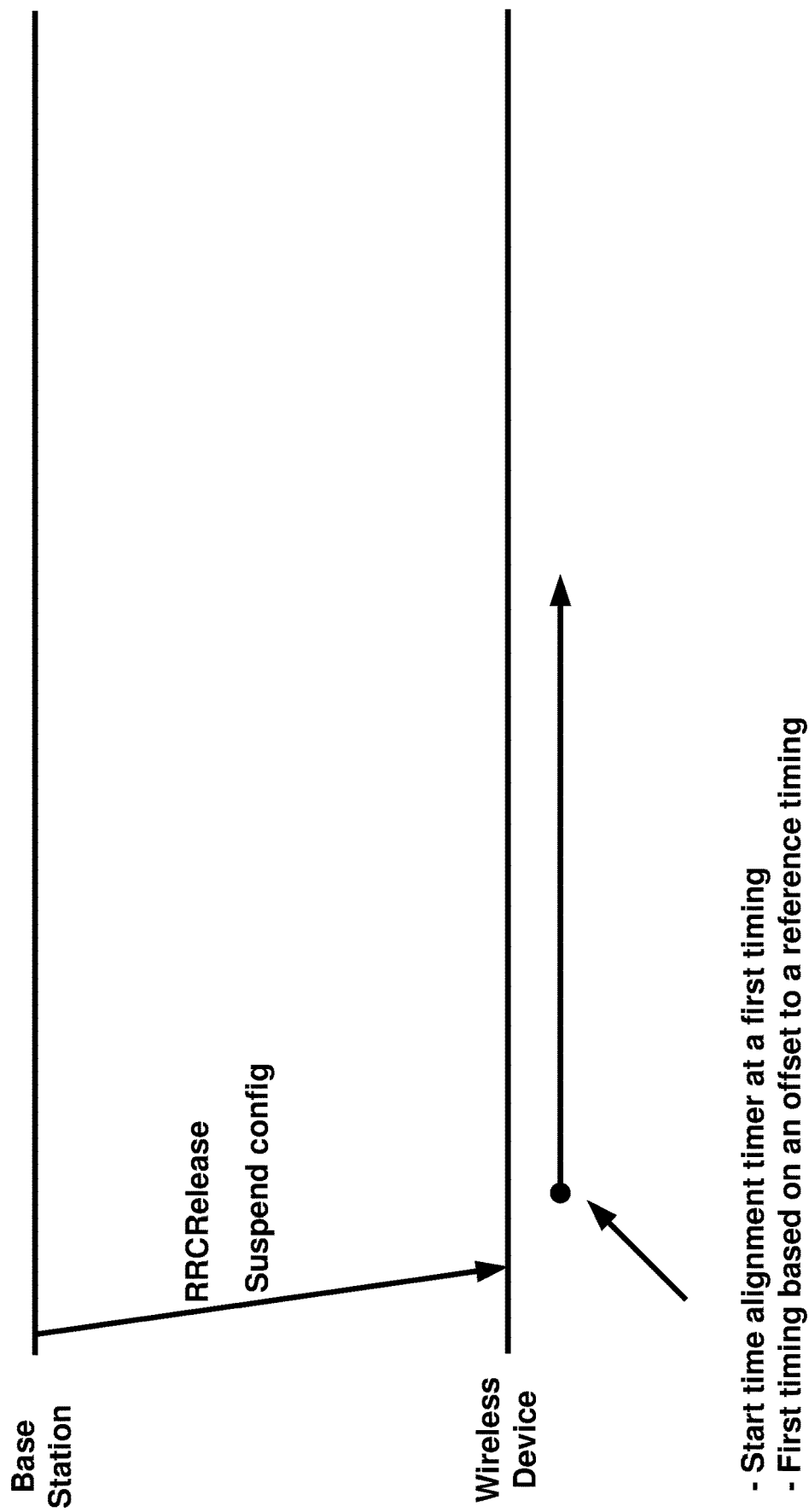
FIG. 23 shows an example process in accordance with several of various embodiments of the present disclosure.

In an example as shown in FIG. 23, a wireless device may receive, from a base station, an RRC release message. The RRC release message may indicate transitioning of a wireless device from an RRC_CONNECTED state to an RRC_INACTIVE state. The RRC release message may comprise a suspend config information element indicating transitioning from the RRC_CONNECTED state to the RRC_INACTIVE state and/or suspending an RRC connection with the wireless device. For example, the suspend config information element may comprise configuration parameters (e.g., one or more wireless device identifiers/RNTIs, parameters for one or more processes during the RRC_INACTIVE state) for the wireless device operation in the RRC_INACTIVE state.

The wireless device may be in an RRC_CONNECTED state when receiving the RRC release message. The wireless device may have a running time alignment timer when receiving the RRC release message. For example, a primary timing advance group (TAG) of the wireless device may have an associated time alignment timer that may be running when receiving the RRC release message. In an example embodiment, the wireless device may start a timer based on the receiving the RRC release message. The wireless device may start the timer based on the receiving the RRC release message and/or based on the transitioning from the RRC_CONNECTED state to the RRC_INACTIVE state and/or based on the suspending the RRC connection. The timer may be used by the wireless device to determine whether the wireless device is uplink time aligned or not. In an example, the timer may be an RRC timer and/or may be started/maintained by the RRC layer. In an example, the timer may be a MAC timer and/or may be started/maintained by the MAC later. In an example, the timer may be a time alignment timer. In an example, the wireless device may start the timer based on the RRC release message (e.g., the suspend config information element in the RRC release message) comprising a time alignment timer value and/or a timing advance value for the wireless device during the RRC_INACTIVE state.

The wireless device may start the timer (e.g., time alignment timer) at a first timing. In an example, the first timing may be based on a reference timing and/or a timing offset. In an example, the first timing may be a timing offset to a reference timing. For example, the processing time of the RRC release message by the wireless device may not be deterministic and the wireless device may start the timer (e.g., time alignment timer) at the first timing wherein the first timing is determined by the wireless device and the base station as the timing offset to the reference timing. The wireless device and the base station may start the timer (e.g., time alignment timer) at the first timing. For example, the reference timing may be a reference system frame number (e.g., system frame number zero). For example, the reference timing may be a first slot/subframe of a system frame number (e.g., system frame number zero). The timing offset may be a first number of a time unit. The time unit may be a symbol (e.g., OFDM) symbol duration or a slot duration. For example, the timing offset may be a first number of symbol durations or a first number of slot durations. The timing offset and/or the number of the time unit may be pre-configured or may be configurable. For example, the configuration parameters may indicate the timing offset and/or the number of the time unit. For example, the RRC release message may comprise a parameter indicating the timing offset value and/or the number of the time unit. For example, the suspend config IE in the RRC release message may comprise a parameter indicating the timing offset value and/or the number of the time unit.

The wireless device, during the RRC_INACTIVE state, may determine that its uplink transmissions are time aligned while the timer (e.g., the time alignment timer) is running. For example, the RRC release message (e.g., the suspend config IE in the RRC release message) may comprise/indicate the timer (e.g., time alignment timer) value and/or the timing advance value and the wireless device may start the timer (e.g., the time alignment timer) with the timer value indicated by the RRC release message based on the receiving the RRC release message. One or more uplink transmissions in the RRC_INACTIVE state may be based on the timing advance value (indicated by the RRC release message) while the timer is running.

Figure 24:
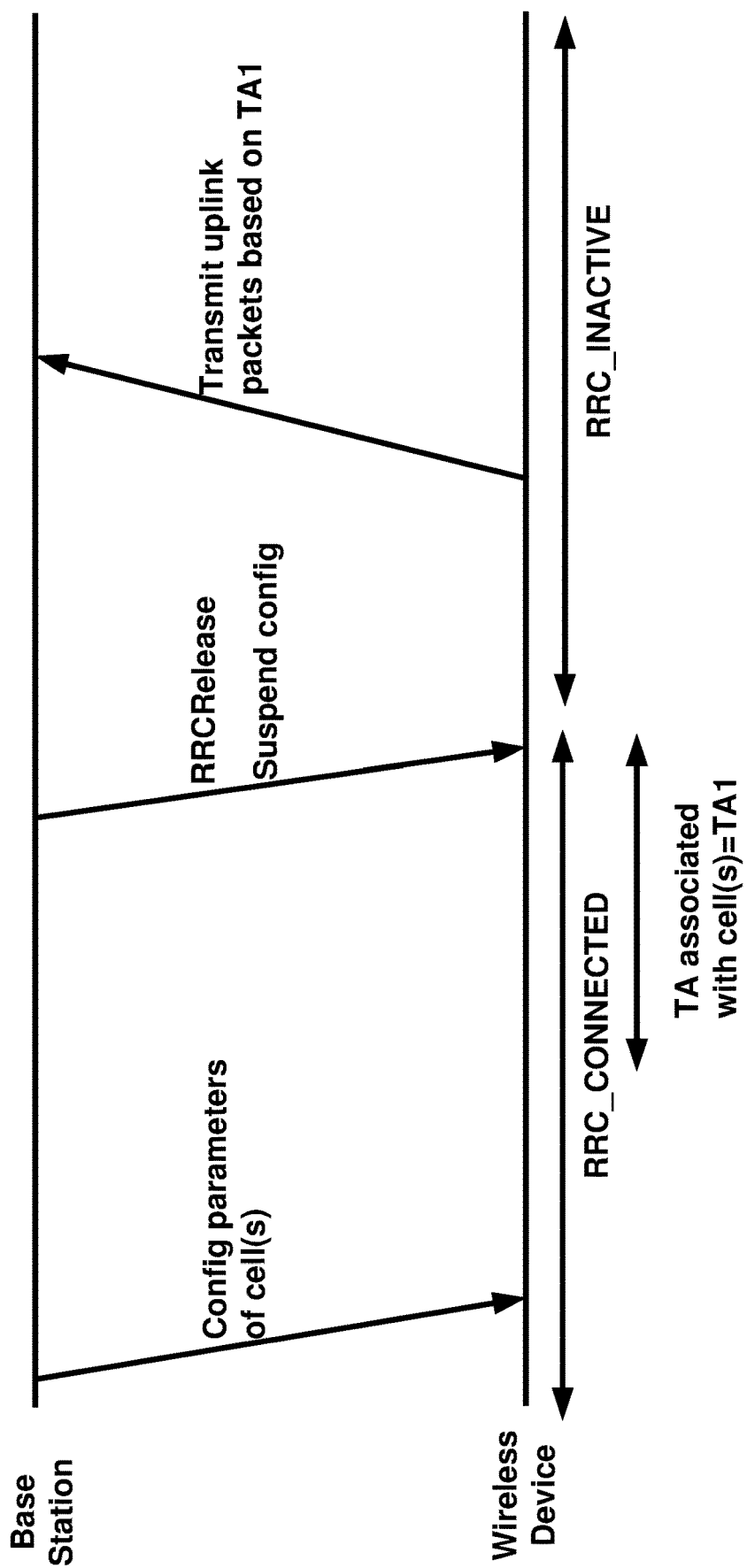
FIG. 24 shows an example process in accordance with several of various embodiments of the present disclosure.

In an example as shown in FIG. 24, a wireless device may receive configuration parameters of one or more cells. The one or more cells may comprise a first cell. In an example, the first cell may be a primary cell. In an example, the one or more cells may be grouped into a timing advance group (e.g., a primary timing advance group (PTAG)). The wireless device may receive an RRC release message indicating transitioning from an RRC_CONNECTED state to an RRC_INACTIVE state and/or suspending an RRC connection. The wireless device may have a timing advance for uplink transmissions via the one or more cells before receiving the RRC release message and/or before transitioning from the RRC_CONNECTED state to the RRC_INACTIVE state and/or before suspending the RRC connection. For example, the timing advance associated with the one or more cells, when receiving the RRC release message may be TA1. A time alignment timer associated with the one or more cells may be running when receiving the RRC release message. The wireless device may determine the timing advance value that is associated with the one or more cells before receiving the RRC release message (e.g., before transitioning from the RRC CONNECTED state to the RRC_INACTIVE state and/or before suspending the RRC connection) and while the wireless device is in the RRC_CONNECTED state (e.g., TA1 in FIG. 24). In an example embodiment, the wireless device may transmit one or more uplink packets during the RRC_INACTIVE state and using the determined timing advance value. In an example, the wireless device may transmit the one or more uplink packets during the RRC_INACTIVE state and using the timing advance value while a timer (e.g., a time alignment timer) is running. In an example, the timer may be a MAC layer timer (e.g., a time alignment timer) and may be started and/or maintained by the MAC layer. In an example, the timer may be an RRC layer timer and may be started and/or maintained by the RRC layer.

In an example, the wireless device may start a timer with a timer value based on the receiving the RRC release message and/or based on the transitioning from the RRC_CONNECTED state to the RRC_INACTIVE state and/or based on the suspending the RRC connection. The wireless device may receive configuration parameters comprising/indicating the timer value. For example, the RRC release message and/or the suspend config IE in the RRC release message may comprise the configuration parameters comprising/indicating the timer value.

Figure 25:
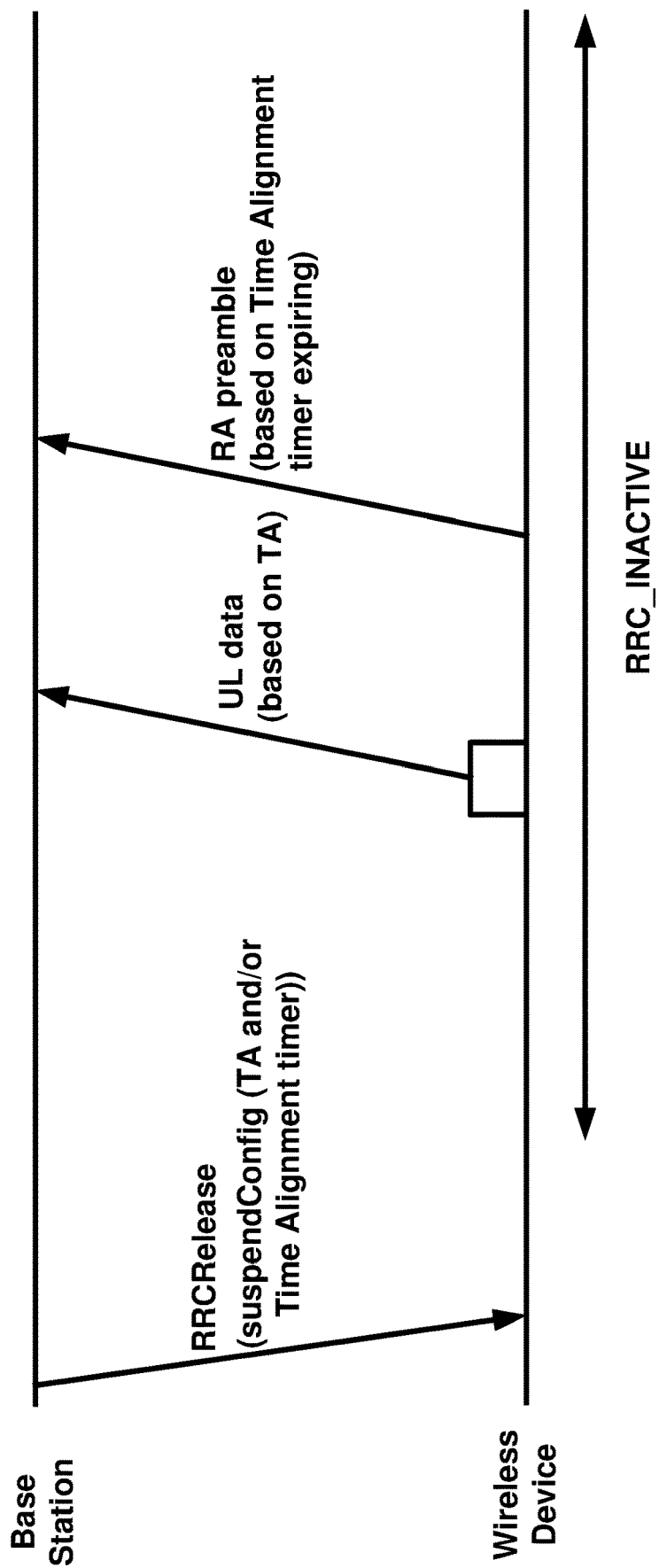
FIG. 25 shows an example process in accordance with several of various embodiments of the present disclosure.

In an example as shown in FIG. 25, a wireless device in an RRC_CONNECTED state may receive an RRC release message. The RRC release message may indicate transitioning of the wireless device from the RRC_CONNECTED state to an RRC_INACTIVE state and/or suspending an RRC connection for the wireless device. The RRC release message may comprise a suspend config information element that indicates the transitioning of the wireless device from the RRC_CONNECTED state to the RRC_INACTIVE state and/or the suspending the RRC connection for the wireless device. In an example embodiment, the suspend config information element may comprise parameters for the wireless device operation during the RRC_INACTIVE state, for example one or more parameters for determining uplink timing for uplink transmissions during the RRC_NACTIVE state. The wireless device may determine uplink timing based on the one or more parameters. The wireless device may transmit uplink packets based on the determined uplink timing.

In an example, the one or more parameters, indicated by the RRC release message and/or the suspend config IE and used for determining the uplink timing during the RRC_INACTIVE state, may comprise a timing advance value. One or more uplink transmissions during the RRC_INACTIVE state may be based on the timing advance value. For example, the one or more uplink transmissions during the RRC_INACTIVE state may be based on the timing advance value and based on a timer (e.g., a time alignment timer) running.

In an example, the one or more parameters, indicated by the RRC release message and/or the suspend config IE and used for determining the uplink timing during the RRC_INACTIVE state, may comprise a time alignment timer value for a time alignment timer. The wireless device may transmit random access preambles during the RRC_INACTIVE state based on the time alignment timer.

In an example, the wireless device may start a time alignment timer with the time alignment timer value indicated by the suspend config IE based on the receiving the RRC release message and/or based on the transitioning from the RRC_CONNECTED state to the RRC_INACTIVE state and/or based on the suspending the RRC connection for the wireless device. The wireless device may start the time alignment timer at a first timing. The first timing may be based on a reference timing and/or a timing offset. For example, the first timing may be a timing offset to a reference timing. For example, the reference timing may be a reference system frame number (e.g., system frame number zero) and/or a first subframe/slot in a reference system frame number. The timing offset may be in terms of a first number of time unit. The time unit may be symbol duration or slot. In an example, the RRC release message and/or the suspend config IE of the RRC release message may indicate the timing offset and/or the first number and/or the time unit (e.g., symbol, slot, etc.).

Figure 26:
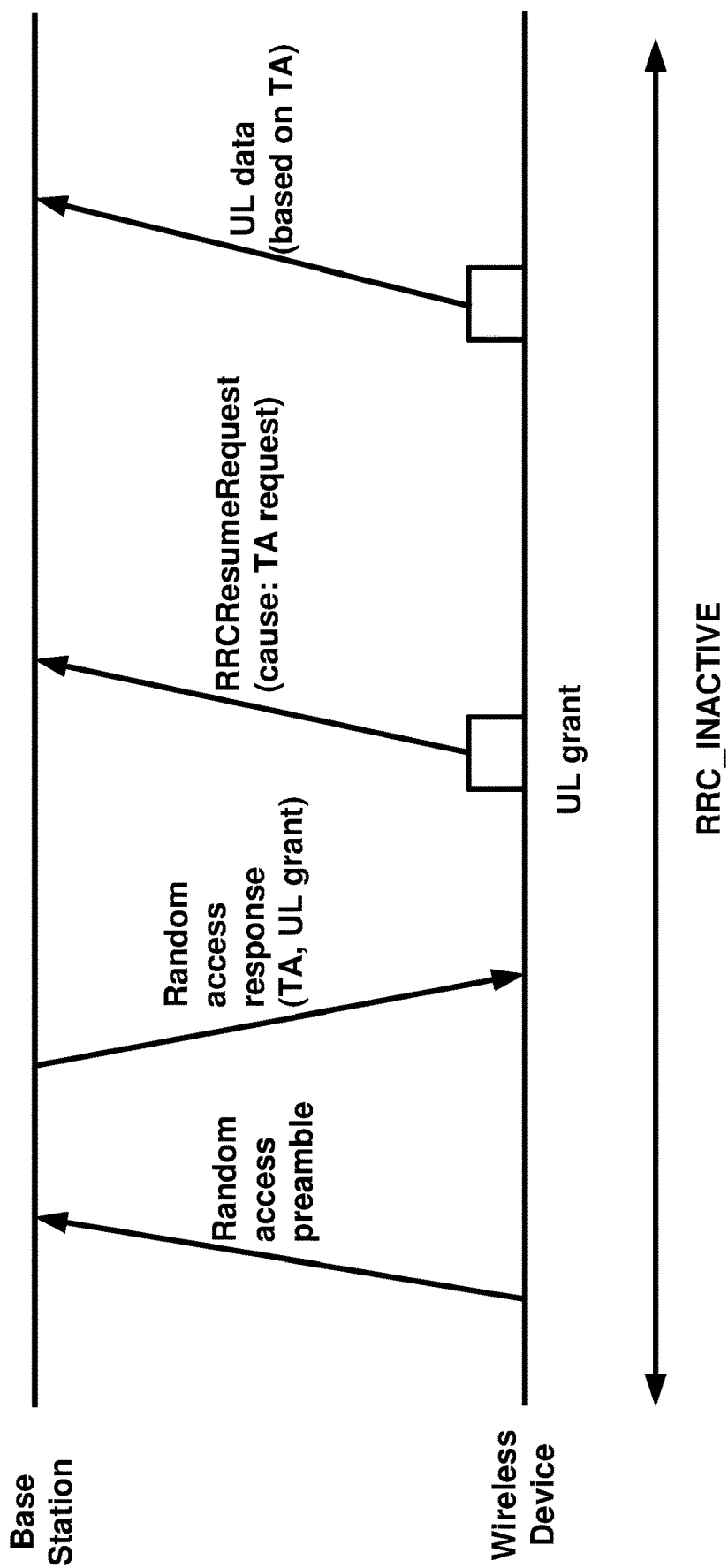
FIG. 26 shows an example process in accordance with several of various embodiments of the present disclosure.
Figure 27:
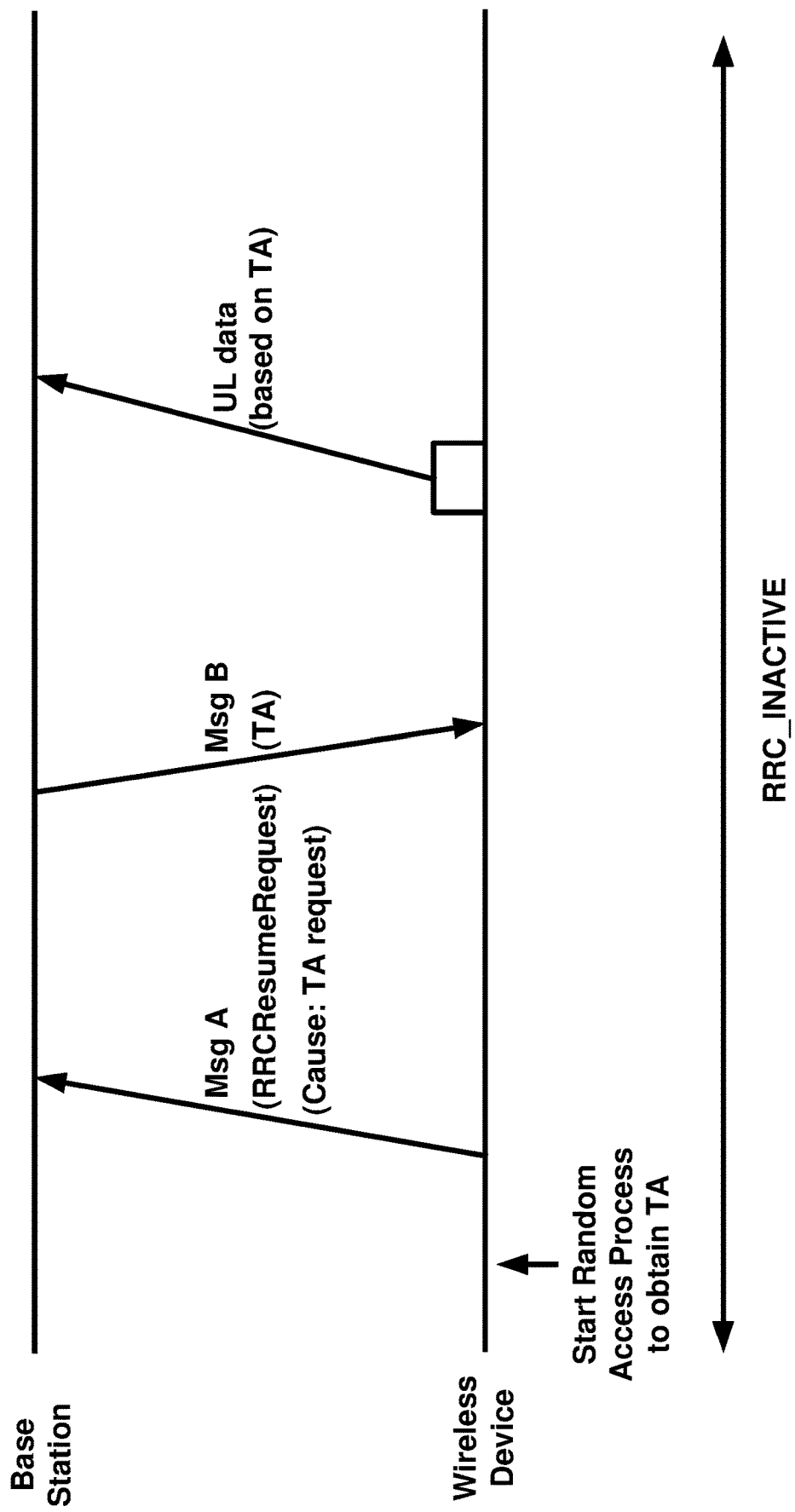
FIG. 27 shows an example process in accordance with several of various embodiments of the present disclosure.

In an example, as shown in FIG. 26 and FIG. 27, a wireless device may start a random access process in an RRC_INACTIVE state for obtaining a timing advance value. In an example, the wireless device may start the random access process and/or transmit a random access preamble based on an expiry of a time alignment timer. In an example, the wireless device may transmit the random access preamble based on a periodicity. In an example, the wireless device may receive an RRC release message indicating transitioning of the wireless device form an RRC_CONNECTED state to the RRC_INACTIVE state and the RRC release message and/or a suspend config IE of the RRC release message may comprise one or more parameters indicating a time alignment timer value of the time alignment timer and/or the periodicity parameter. In an example, the time alignment timer value and/or the periodicity parameter may be indicated via broadcast system information (e.g., MIB or a SIB). In an example, the wireless device may receive paging information, via a paging channel, indicating the time alignment timer value and/or the periodicity parameter.

For example, as shown in FIG. 26, the random access process may be a four-step random access process and the wireless device may receive a random access response comprising timing advance value and an plink grant. The wireless device may transmit an RRC resume request based on and via the resources indicated by the uplink grant. The RRC resume request message may comprise a cause IE. In an example embodiment, a value of the cause IE may indicate that a cause for the RRC resume request message is a timing advance request. The value of the cause IE may indicate that the cause for the RRC resume request message is not a resumption of the RRC connection. The wireless device may transmit uplink data based on the timing advance value indicated by the random access response. The wireless device may transmit the uplink data based on pre-configured and/or configured resources (e.g., configured grant resources, e.g., Type 1 configured grant resources).

Figure 28:
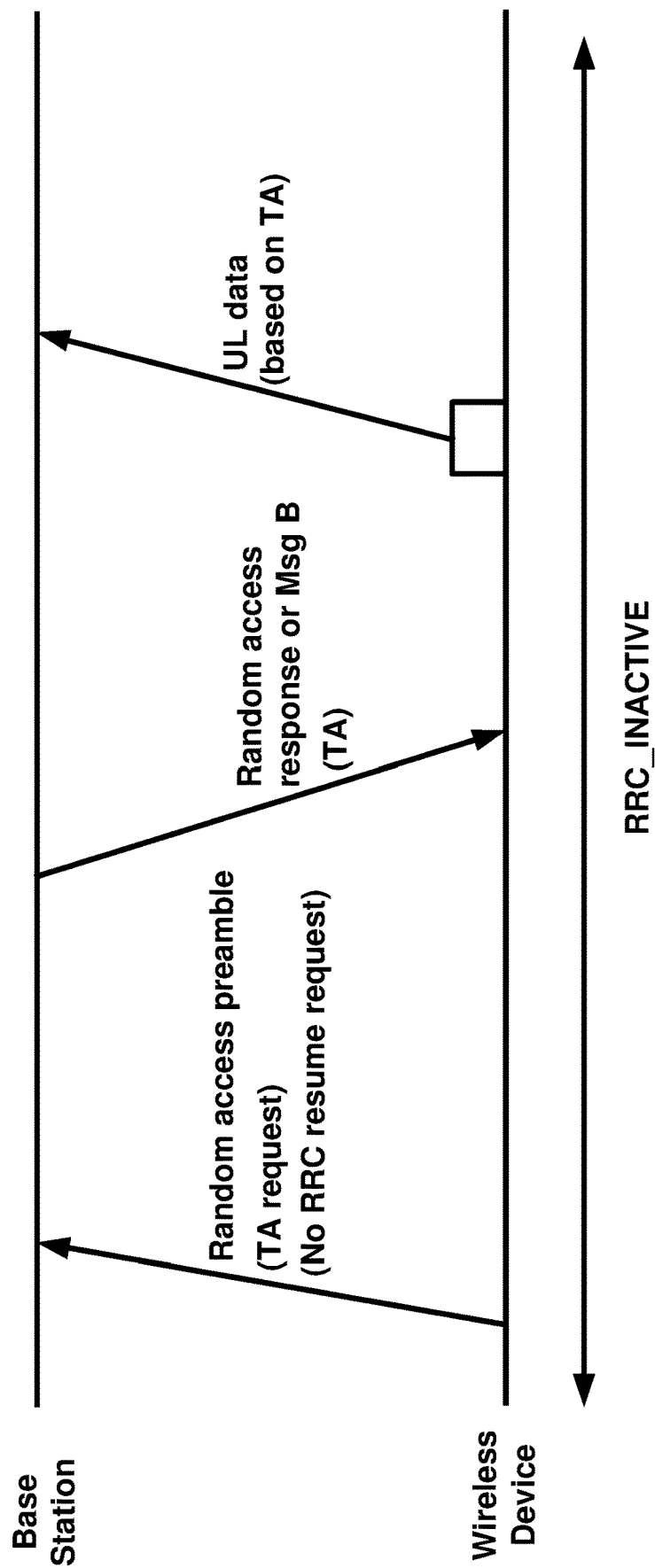
FIG. 28 shows an example process in accordance with several of various embodiments of the present disclosure.

For example, as shown in FIG. 27, the wireless device may transmit an RRC resume request message during a two-step random access process (e.g., via Msg A in a two-step random access process). The RRC resume request message may comprise a cause IE. The cause information element in the RRC resume request message may indicate that a cause for the RRC resume request message is a timing advance request. In an example embodiment, the value of the cause IE may indicate that the cause for the RRC resume request message is not a resumption of the RRC connection. The wireless device may receive a message (e.g., Msg B) comprising a timing advance value. The wireless device may transmit uplink data based on the timing advance value indicated by the message (e.g., Msg B). The wireless device may transmit the uplink data based on pre-configured and/or configured resources (e.g., configured grant resources, e.g., Type 1 configured grant resources). For example, In an example embodiment as shown in FIG. 28, the wireless device in an RRC_INACTIVE state may transmit a random access preamble. The random access preamble may indicate that the wireless device is requesting a timing advance without a request for resumption of the RRC connection. In an example, the wireless device may receive configuration parameters indicating that one or more random access preambles, comprising the random access preamble, is for requesting a timing advance without a request for resumption of the RRC connection (e.g., without a request for transitioning to an RRC_CONNECTED state).

The wireless device may transmit the random access preamble as part of a two-step random access process or a four-step random access process. For example, the wireless device may transmit the random access preamble based on an expiry of a time alignment timer and/or based on a periodicity parameter (e.g., transmitting random access preambles periodically with a period determined based on the periodicity parameter). The wireless device may receive configuration parameters indicating a time alignment timer value for the time alignment timer and/or the periodicity parameter. For example, the wireless device may receive the configuration parameters in the RRC release message (e.g., in a suspend config IE of the RRC release message). For example, the wireless device may receive the time alignment timer value for the time alignment timer and/or the periodicity parameter via broadcast system information (e.g., MIB or a SIB, e.g., SIB1). For example, the wireless device may receive paging information, via a paging channel, indicating the time alignment timer value and/or the periodicity parameter.

In response to the transmission of the random access preamble, the wireless device may receive a timing advance value. For example, the wireless device may receive the timing advance in a random access response of a four-step random access process or a Msg B in a two-step random access response. In an example, for a four-step random access process, the random access response may further comprise an uplink grant. The size of the uplink grant may be based on the random access preamble. For example, based on the random access preamble indicating that the wireless device is requesting timing advance without resumption of the RRC connection and/or transitioning to the RRC_CONNECTED state, the size of the uplink grant may be smaller than the case that the random access preamble indicates that the wireless device requests resumption of the RRC connection.

The wireless device may transmit one or more packets, while in the RRC_INACTIVE state, based on the timing advance value. The wireless device may transmit the one or more packets via pre-configured resources or configured grant resources (e.g., configured grant, e.g., configured grant Type 1 resources).

In an example embodiment, a wireless device in an RRC_INACTIVE state may transmit a random access preamble. The random access preamble may indicate whether the wireless device is requesting a resumption of an RRC connection and/or requesting an uplink grant for transmission of UL-CCCH (e.g., for transmission of RRC resume request) or whether the wireless device is not requesting resumption of the RRC connection and/or requesting an uplink grant for transmission of data without UL-CCCH. For example, the wireless device may receive configuration parameters indicating one or more first random access preambles for requesting an RRC resumption and/or for requesting uplink grant for transmission of UL-CCCH and one or more second random access preambles for requesting uplink grant for transmission of data without UL-CCCH. In response to the transmission of the random access preamble, the wireless device may receive uplink grant, wherein the uplink grant (e.g., a size of the uplink grant) may be based on the transmitted random access preamble. The wireless device may transmit an uplink packet based on the uplink grant.

In an example embodiment, a wireless device in an RRC_INACTIVE state may transmit a random access preamble. The random access preamble may indicate that the wireless device is requesting an uplink grant for transmitting UL-CCCH (e.g., for transmission of an RRC resume request message). For example, the wireless device may receive configuration parameters indicating one or more first random access preambles, comprising the random access preamble, for requesting an RRC resumption and/or for requesting uplink grant for transmission of UL-CCCH. The wireless device may receive, in response to the transmission of the random access preamble, an uplink grant. Based on the random access preamble indicating a request for an uplink grant for transmission of UL-CCCH, the uplink grant may be useful for transmission of UL-CCCH and/or an RRC resume request message. The wireless device may transmit a packet, comprising data from the UL-CCCH, based on the uplink grant and via the resources indicated by the uplink grant.

Figure 29:
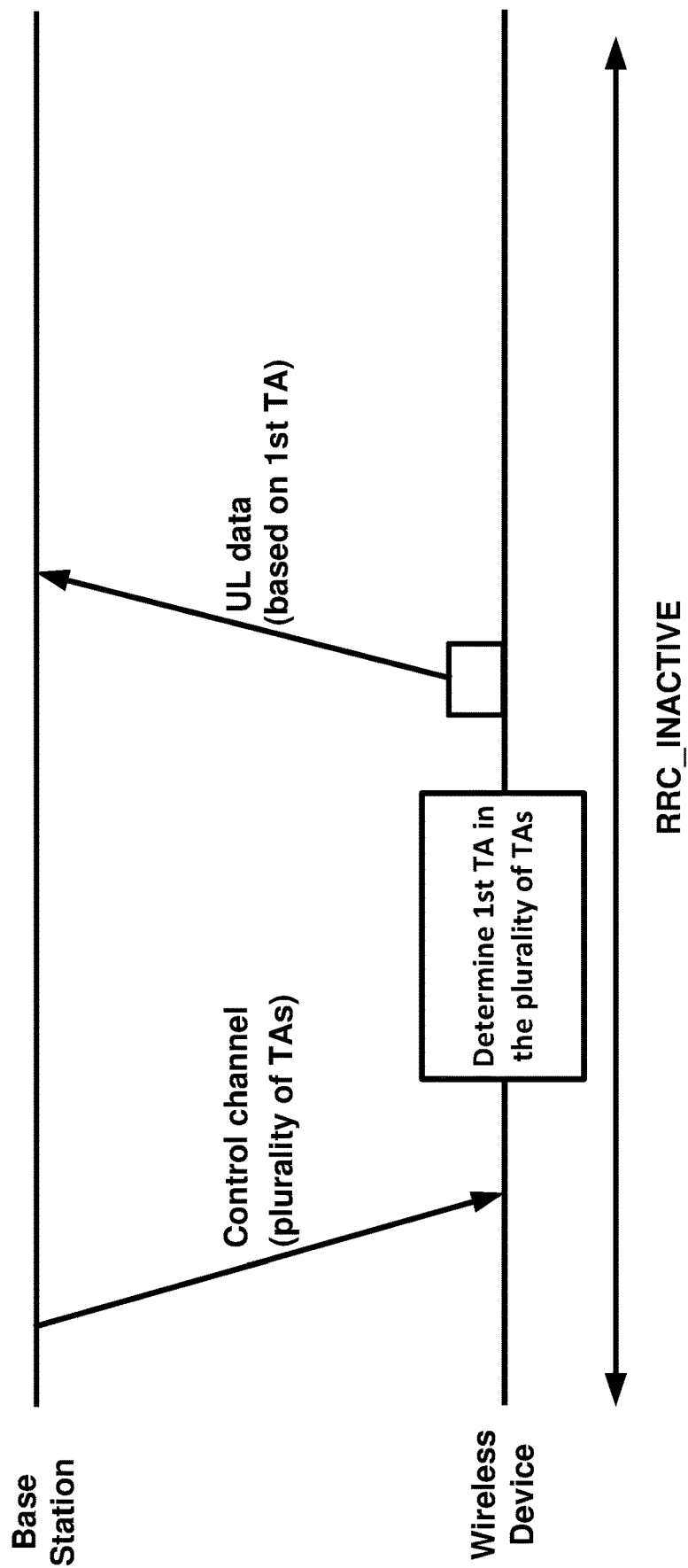
FIG. 29 shows an example process in accordance with several of various embodiments of the present disclosure.

In an example embodiment as shown in FIG. 29, a wireless device may be in an RRC_INACTIVE state. The wireless device may receive a plurality of timing advance values via a control channel (e.g., PDCCH). In an example, the wireless device may receive downlink control information comprising/indicating the plurality of timing advance values. In an example, the plurality of timing advance values may be for a plurality of wireless devices. The wireless device may receive the downlink control information via the downlink control channel. In an example, the downlink control information may be a common/group common downlink control information. The wireless device may receive the downlink control information via a common search space. The downlink control information comprising the plurality of timing advance values may be associated with a wireless device identifier/RNTI. For example, a CRC of the downlink control information comprising the plurality of timing advance values may be scrambled with the wireless device identifier/RNTI. The wireless device may receive configuration parameters comprising the wireless device identifier/RNTI. For example, the wireless device may receive an RRC release message indicating transitioning of the wireless device from RRC_CONNECTED to RRC_INACTIVE wherein the RRC release message or a suspend config IE of the RRC release message may indicate the wireless device identifier/RNTI. The suspend config IE may comprise configuration parameters for wireless device operation during the RRC_INACTIVE state.

The wireless device may determine a first timing advance value in the plurality of timing advance values. In an example, the wireless device may determine the first timing advance value, in the plurality of timing advance values, based on an index/identifier associated with the wireless device. For example, each timing advance value, in the plurality of timing advance values, may correspond to an index and/or identifier and the wireless device may determine the first timing advance value based on the index/identifier associated with the wireless device. The wireless device may receive configuration parameters comprising a first parameter indicating the index/identifier associated with the wireless device. For example, the wireless device may receive an RRC release message indicating the wireless device transition from an RRC_CONNECTED state to the RRC_INACTIVE state, wherein the RRC release message may comprise the configuration parameters indicating the wireless device index/identifier. For example, the RRC release message may comprise a suspend config IE comprising the configuration parameters indicating the wireless device index/identifier.

In an example, the wireless device may receive broadcast system information (e.g., MIB or a SIB e.g., SIB1) comprising/indicating the wireless device identifier/index. In an example, the wireless device may receive paging information via a paging channel, wherein the paging information may comprise/indicate the wireless device index/identifier.

The wireless device may transmit, while in RRC_INACTIVE state, an uplink packet based on the first timing advance determined form the plurality of timing advances. The wireless device may transmit the uplink packet based on the determined timing advance and via a pre-configured resource or a configured grant resource (e.g., a configured grant Type 1 resource).

In an example, the wireless device may receive configuration parameters of a control resource set and/or a search space. The wireless device may receive the plurality of timing advance values via the downlink control channel/downlink control information received via radio resources associated with the control resource set/search space.

In an example, the wireless device may receive the configuration parameters of the control resource set and/or the search space via one or more RRC messages. For example, the wireless device may receive an RRC release message, indicating transitioning of the wireless device form an RRC_CONNECTED state to an RRC_INACTIVE state, wherein the RRC release message may comprise the configuration parameters of the control resource set and/or the search space. For example, the RRC release message may comprise a suspend config IE comprising the configuration parameters of the control resource set/search space.

In an example, the wireless device may receive paging information via a paging channel. The paging information may indicate the control resource set and/or the search space or configuration parameters of the control resource set and/or the search space for receiving the plurality of timing advance values. For example, the paging information may comprise a paging record associated with the wireless device, wherein the paging record may indicate the control resource set and/or the search space or the configuration parameters of the control resource set and/or the search space. The wireless device may determine the paging record, associated with the wireless device, in the paging information based on a wireless device identifier/RNTI.

In an example, the wireless device may receive broadcast system information (e.g., via a MIB or a SIB e.g., SIB1) wherein the broadcast system information may indicate configuration parameters of the control resource set and/or the search space for receiving the plurality of timing advance values. The wireless device may determine the control resource set/search space for receiving the plurality of timing advance values based on the configuration parameters indicated by the broadcast system information and may receive the plurality of timing advance values via the control resource set and/or the search space.

Figure 30:
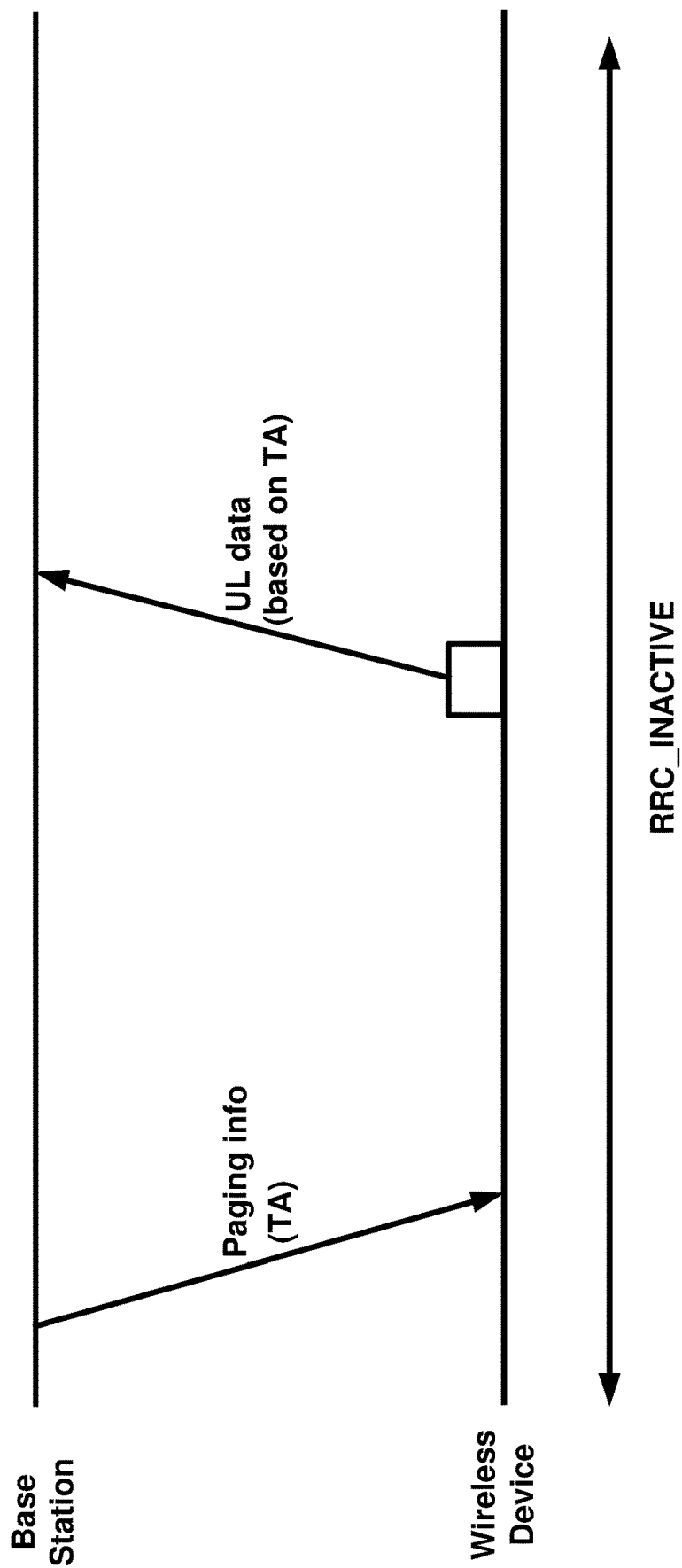
FIG. 30 shows an example process in accordance with several of various embodiments of the present disclosure.

In an example embodiment as shown in FIG. 30, a wireless device in a radio resource control (RRC) inactive state may receive paging information via a paging channel. The paging information may comprise/indicate the timing advance value. The wireless device may transmit a packet (e.g., via a pre-configured resource or a configured grant resource (e.g., a configured grant Type 1 resource)).

In an example, the wireless device may receive configuration parameters comprising a wireless device identity/RNTI for wireless device operation during the RRC_INACTIVE state. For example, an RRC release message indicating a transitioning from the RRC_CONNECTED to the RRC_INACTIVE (e.g., a suspend config IE in the RRC release message) may comprise configuration parameters comprising the wireless device identity/RNTI. The configuration parameters may comprise a plurality of wireless device identities/RNTIs (e.g., a full wireless device identity/RNTI and a short wireless device identity/RNTI). The wireless device may receive paging information comprising a paging record associated with the wireless device. The paging record may comprise the wireless device identity/RNTI (e.g., the short wireless device identity/RNTI or the long wireless device identity/RNTI). The wireless device may determine the paging record associated with the wireless device based on the wireless device identity/RNTI. For example, the paging record associated with the wireless device may comprise the timing advance value.

Figure 31:
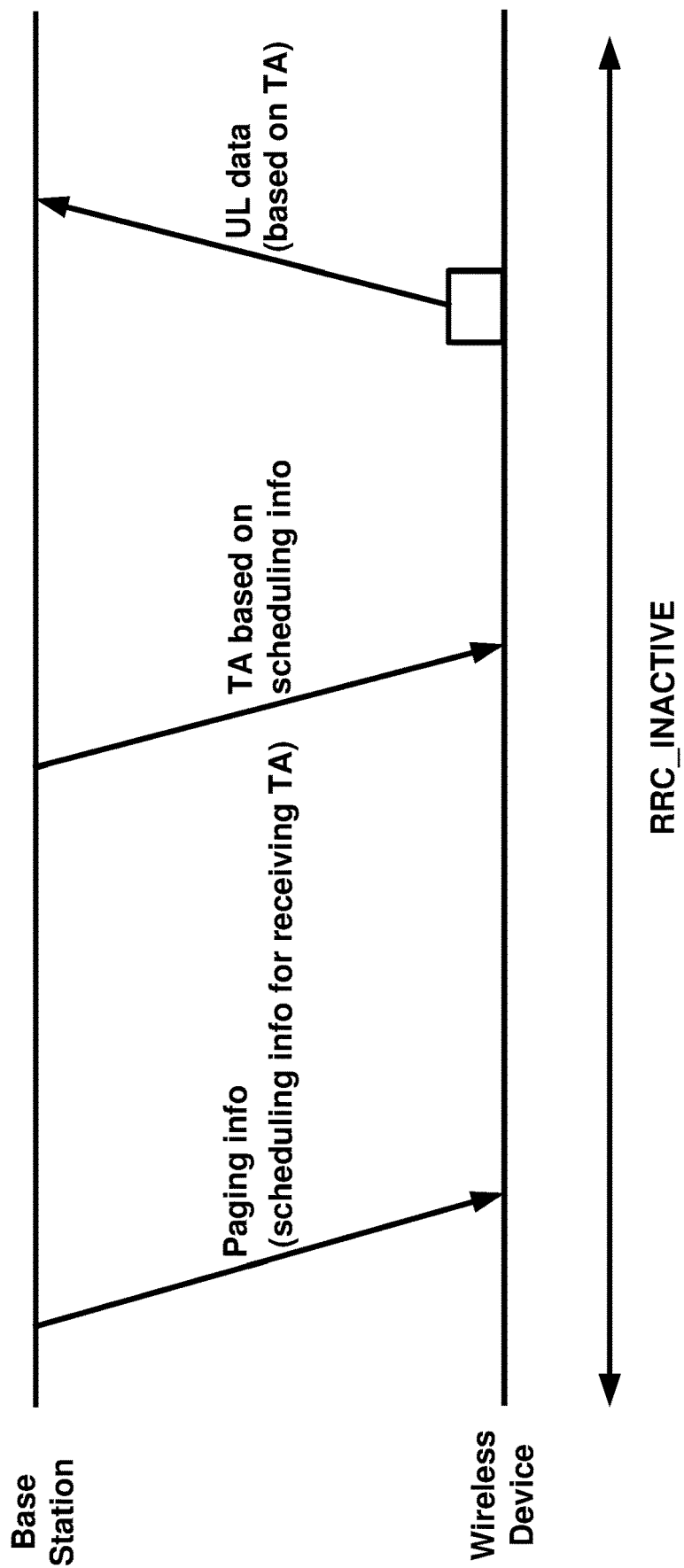
FIG. 31 shows an example process in accordance with several of various embodiments of the present disclosure.

In an example embodiment as shown in FIG. 31, a wireless device in a radio resource control (RRC) inactive state may receive paging information via a paging channel. The paging information may indicate scheduling information for receiving a timing advance value. For example, the paging information may comprise a field indicating the scheduling information. For example, the paging information may indicate a control resource set and/or search space for receiving a downlink assignment of a downlink packet, wherein the downlink packet may comprise the timing advance value. For example, the paging information may comprise the configuration parameters of the control resource set and/or the search space for receiving the scheduling information/downlink assignment for receiving a downlink packet comprising the timing advance value. The wireless device may receive the paging information via the paging channel and may determine the paging information and/or scheduling information associated with the wireless device and included in the received paging information based on a wireless device identifier/RNTI associated with the wireless device. For example, the paging information may comprise a paging record associated with the wireless device wherein the paging record may indicate and/or may comprise configuration parameters of the control resource set and/or the search space for receiving the scheduling information/downlink assignment. For example, the paging record may comprise the wireless device identifier/RNTI. The wireless device may receive configuration parameters comprising the wireless device identifier/RNTI. For example, the wireless device may receive an RRC release message indicating transitioning of the wireless device from an RRC_CONNECTED state to an RRC_INACTIVE state wherein the RRC release message, or a suspend config IE in the RRC release message, may comprise the wireless device identity/RNTI. The configuration parameters may comprise a short wireless device identity/RNTI and a long wireless device identity/RNTI. The one or more wireless device identities/RNTIs may be for the wireless device operation in the RRC_INACTIVE state. In an example, the downlink packet may comprise a timing advance command MAC CE comprising the timing advance value.

In an example, the wireless device may receive the paging information via the paging channel at a paging occasion. The wireless device may receive configuration parameters and may determine the paging occasions during the RRC_INACTIVE state based on the configuration parameters. For example, the wireless device may receive an RRC release message comprising the configuration parameters indicating the paging occasions. The configuration parameters may be received in an RRC release message or may be included in a suspend config IE in the RRC release message. For example, the wireless device may determine the paging occasions based on a periodicity parameter. The configuration parameters, indicating the paging occasions, may comprise the periodicity parameter.

The wireless device may receive the timing advance value based on the scheduling information. The wireless device may receive a downlink packet based on the scheduling information, wherein the downlink packet may comprise a timing advance command MAC CE indicating the timing advance value. The wireless device may transmit, while in the RRC_INACTIVE state, a packet based on the timing advance value. For example, the wireless device may transmit the packet via a pre-configured resource or a configured grant resource (e.g., a configured grant Type 1 resource).

In an example, a wireless device may receive configuration parameters of one or more cells comprising a first cell. The one or more cells may be grouped into a timing advance group. In an example, the first cell may be a primary cell. In an example, the timing advance group may be a primary timing advance group (e.g., PTAG).

Figure 32:
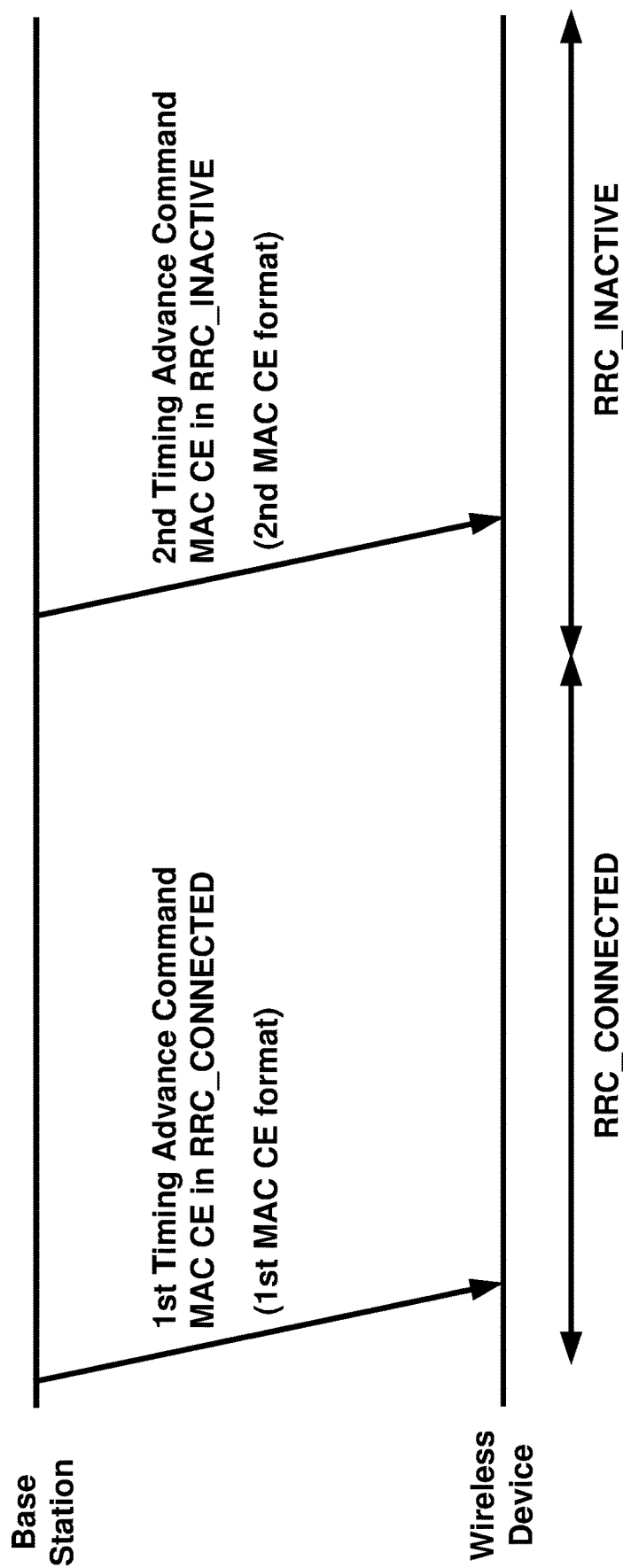
FIG. 32 shows an example process in accordance with several of various embodiments of the present disclosure.

In an example embodiment as shown in FIG. 32, the wireless device may receive a first timing advance command MAC CE in an RRC_CONNECTED state. The first timing advance command MAC CE may indicate a first timing advance value. The first timing advance command MAC CE for uplink time alignment in the RRC_CONNECTED state may have a first format. The wireless device may transmit a first uplink packet based on the first timing advance value indicated by the first timing advance command MAC CE. The wireless device may receive an RRC release message indicating transitioning from the RRC_CONNECTED state to the RRC_INACTIVE state. For example, a suspend config IE in the RRC release message may indicate the transitioning from the RRC_CONNECTED state to the RRC_INACTIVE state and/or suspending the RRC connection for the wireless device. The wireless device may receive a second timing advance command MAC CE while in the RRC_INACTIVE state. The second timing advance command MAC CE may indicate a second timing advance value. The second timing advance MAC CE for uplink time alignment in the RRC_INACTIVE state may have a second format. The wireless device may transmit a second uplink packet based on the second timing advance value indicated by the second timing advance command MAC CE.

Figure 33:
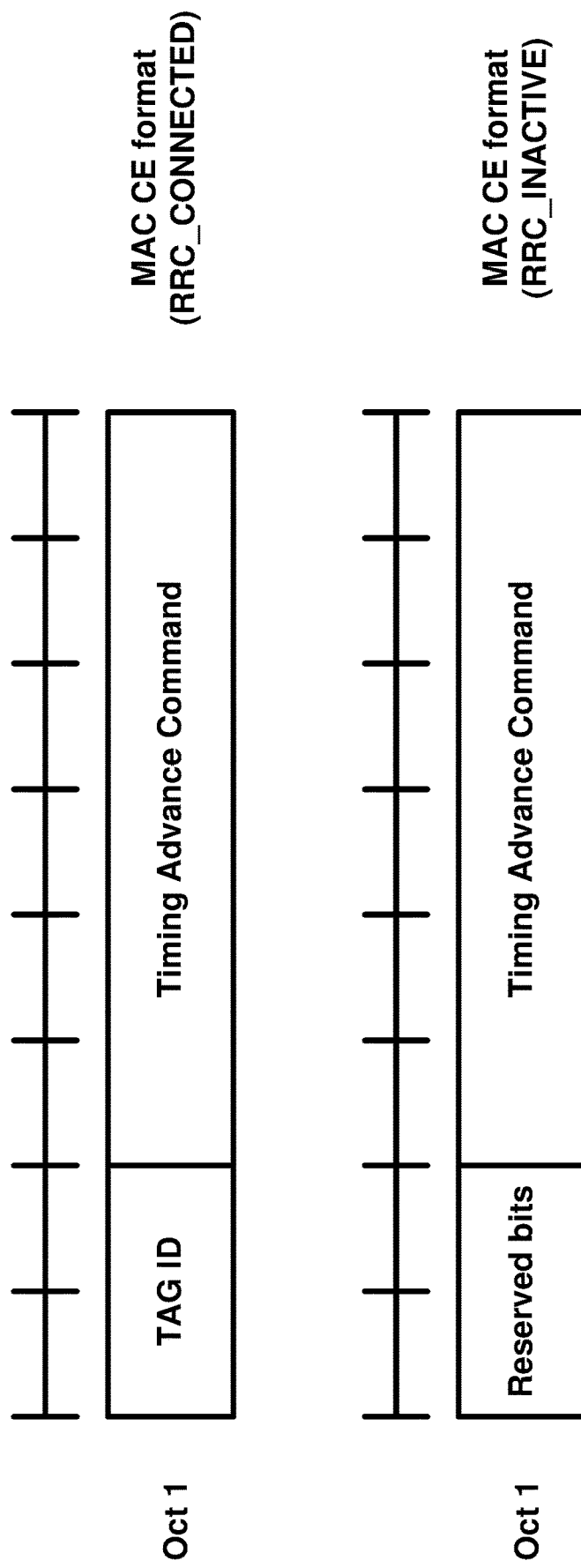
FIG. 33 shows example MAC CE formats in accordance with several of various embodiments of the present disclosure.

In an example, the first format of the first timing advance command MAC CE in the RRC_CONNECTED state may comprise a timing advance group (TAG) ID field and the second timing advance command MAC CE in the RRC_INACTIVE state may not comprise a TAG ID field. In an example as shown in FIG. 33, the first timing advance command MAC CE in the RRC_CONNECTED state may comprise a TAG ID field and the second timing advance command MAC CE in the RRC_INACTIVE state may comprise a field with reserved/pre-configured bits. For example, the reserved/pre-configured bits may be all zeros.

Figure 34:
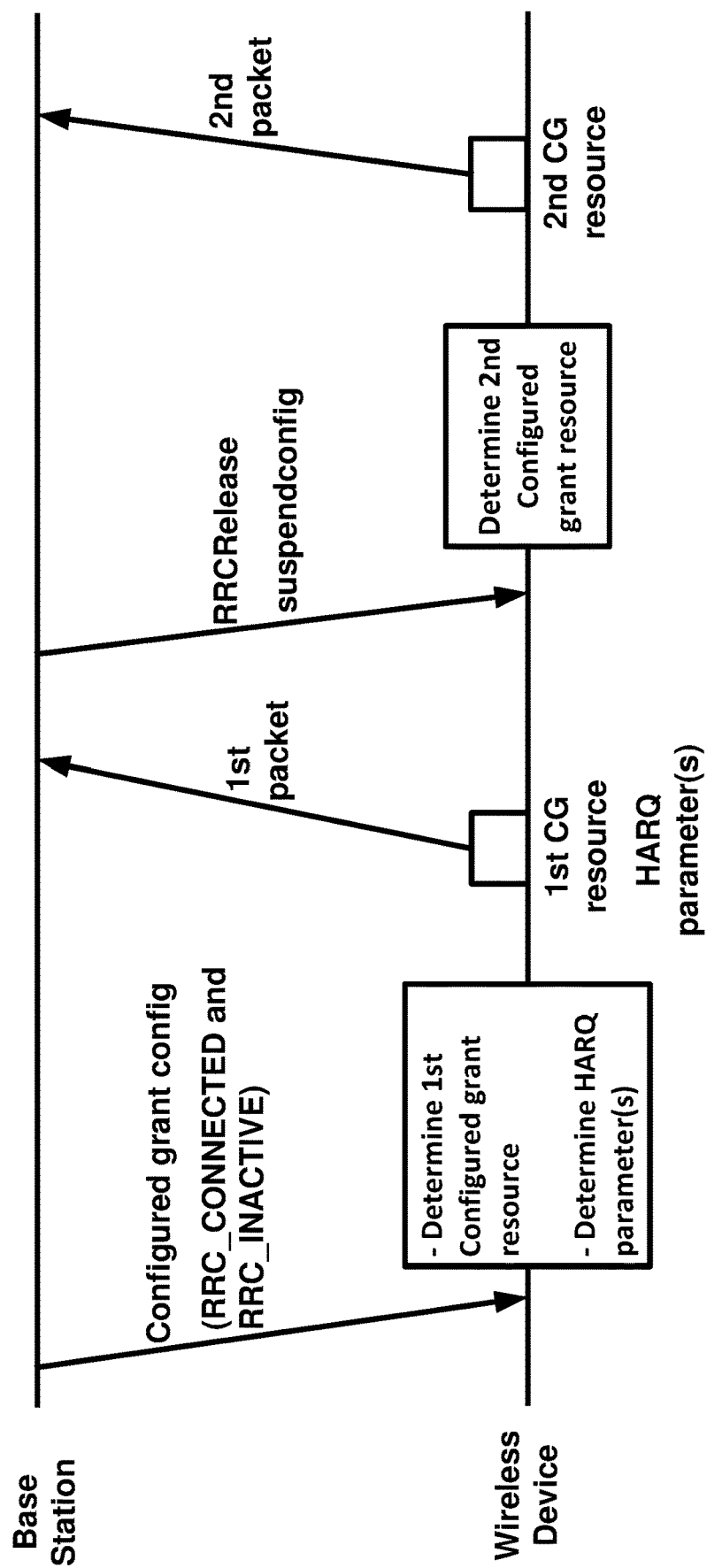
FIG. 34 shows an example process in accordance with several of various embodiments of the present disclosure.

In an example embodiment as shown in FIG. 34, a wireless device in an RRC_CONNECTED state may receive configuration parameters of a configured grant configuration. In an example, the configured grant configuration may be a type 1 configured grant configuration. The wireless device may activate a plurality of resources based on receiving the configuration parameters of the configured grant configuration. At least a portion of the configuration parameters of the configured grant configuration may be used for the RRC_CONNECTED state and an RRC_INACTIVE state.

The wireless device may determine a first resource, while in the RRC_CONNECTED state, based on the configured grant configuration parameters. For example, the configured grant configuration parameters may comprise a periodicity parameter and the wireless device may determine a first timing of the first resource based on the periodicity parameter. For example, the configured grant configuration parameters may comprise one or more parameters indicating frequency domain resources of the first resource. The wireless device may transmit a first packet via the first resource.

The wireless device may receive an RRC release message indicating transitioning from the RRC_CONNECTED state to the RRC_INACTIVE state and/or suspending an RRC connection for the wireless device. For example, the RRC release message may comprise a suspend config IE indicating the transition from the RRC_CONNECTED state to the RRC_INACTIVE state. The wireless device may transition from the RRC_CONNECTED state to the RRC_INACTIVE state based on the receiving the RRC release message.

The wireless device may determine a second resource, while in the RRC_INACTIVE state, based on the configured grant configuration parameters. For example, the configured grant configuration parameters may comprise a periodicity parameter and the wireless device may determine a second timing of the second resource based on the periodicity parameter. For example, the configured grant configuration parameters may comprise one or more parameters indicating frequency domain resources of the second resource. The wireless device may transmit a second packet via the second resource. The wireless device may transmit the second packet via the second resource.

The wireless device may determine one or more HARQ parameters for transmission of the first packet. The wireless device may transmit the first packet based on and/or with determining the one or more HARQ parameters. The wireless device may not determine the one or more HARQ parameters for transmission of the second packet. The wireless device may transmit the second packet without determining the one or more HARQ parameters.

In an example, the configuration parameters of the configured grant configuration may comprise first configuration parameters for the RRC_CONNECTED state and second configuration parameters for the RRC_INACTIVE state. For example, the first configuration parameters may comprise a first periodicity parameter and the second configuration parameters may comprise a second periodicity parameter. The wireless device may determine the first resource based on the first periodicity parameter and may determine the second resource based on the second periodicity parameter. For example, the first configuration parameters may comprise a parameter indicating a number of HARQ processes and the second configuration parameters may not comprise a parameter indicating a number of HARQ processes. For example, the first configuration parameters may comprise one or more first parameters for determining configured grant resources (e.g., time and frequency domain resources) during the RRC_CONNECTED state and the second configuration parameters may comprise one or more second parameters for determining configured grant resources (e.g., time and frequency domain resources) during the RRC_INACTIVE state.

Figure 35:
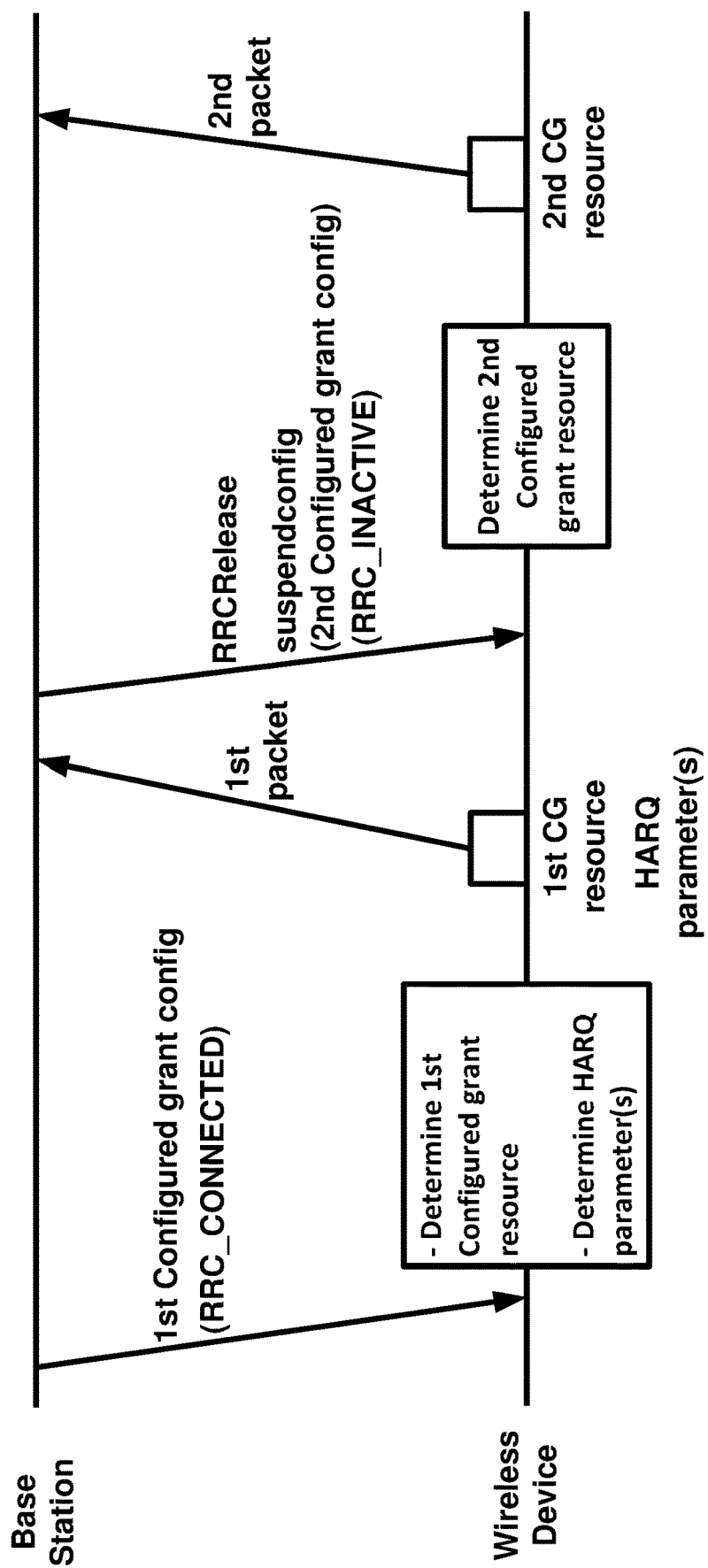
FIG. 35 shows an example process in accordance with several of various embodiments of the present disclosure.

In an example embodiment as shown in FIG. 35, a wireless device, in an RRC_CONNECTED state, may receive first configuration parameters of a first configured grant configuration parameters. In an example, the configured grant configuration may be a type 1 configured grant configuration. The wireless device may activate a plurality of resources based on receiving the configuration parameters of the configured grant configuration. The first configuration parameters may be for operation during the RRC_CONNECTED state and may not be used for operation during the RRC_INACTIVE state.

The wireless device may determine a first resource, while in the RRC_CONNECTED state, based on the first configured grant configuration parameters. For example, the first configured grant configuration parameters may comprise a first periodicity parameter and the wireless device may determine a first timing of the first resource based on the first periodicity parameter. For example, the first configured grant configuration parameters may comprise one or more first parameters indicating frequency domain resources of the first resource. The wireless device may transmit a first packet via the first resource.

The wireless device may receive an RRC release message indicating transitioning from the RRC_CONNECTED state to the RRC_INACTIVE state and/or suspending an RRC connection for the wireless device. For example, the RRC release message may comprise a suspend config IE indicating the transition from the RRC_CONNECTED state to the RRC_INACTIVE state. The wireless device may transition from the RRC_CONNECTED state to the RRC_INACTIVE state based on the receiving the RRC release message. The RRC release message may comprise second configuration parameters of a second configured grant configuration. The second configuration parameters may be for the wireless device during the RRC_INACTIVE state. For example, a suspend config IE of the RRC release message may comprise the second configuration parameters.

The wireless device may determine a second resource, while in the RRC_INACTIVE state, based on the second configured grant configuration parameters. For example, the second configured grant configuration parameters may comprise a second periodicity parameter and the wireless device may determine a second timing of the second resource based on the second periodicity parameter. For example, the second configured grant configuration parameters may comprise one or more second parameters indicating frequency domain resources of the second resource. The wireless device may transmit a second packet via the second resource. The wireless device may transmit the second packet via the second resource.

The wireless device may determine one or more HARQ parameters for transmission of the first packet. The wireless device may transmit the first packet based on and/or with determining the one or more HARQ parameters. The wireless device may not determine the one or more HARQ parameters for transmission of the second packet. The wireless device may transmit the second packet without determining the one or more HARQ parameters.

Figure 36:
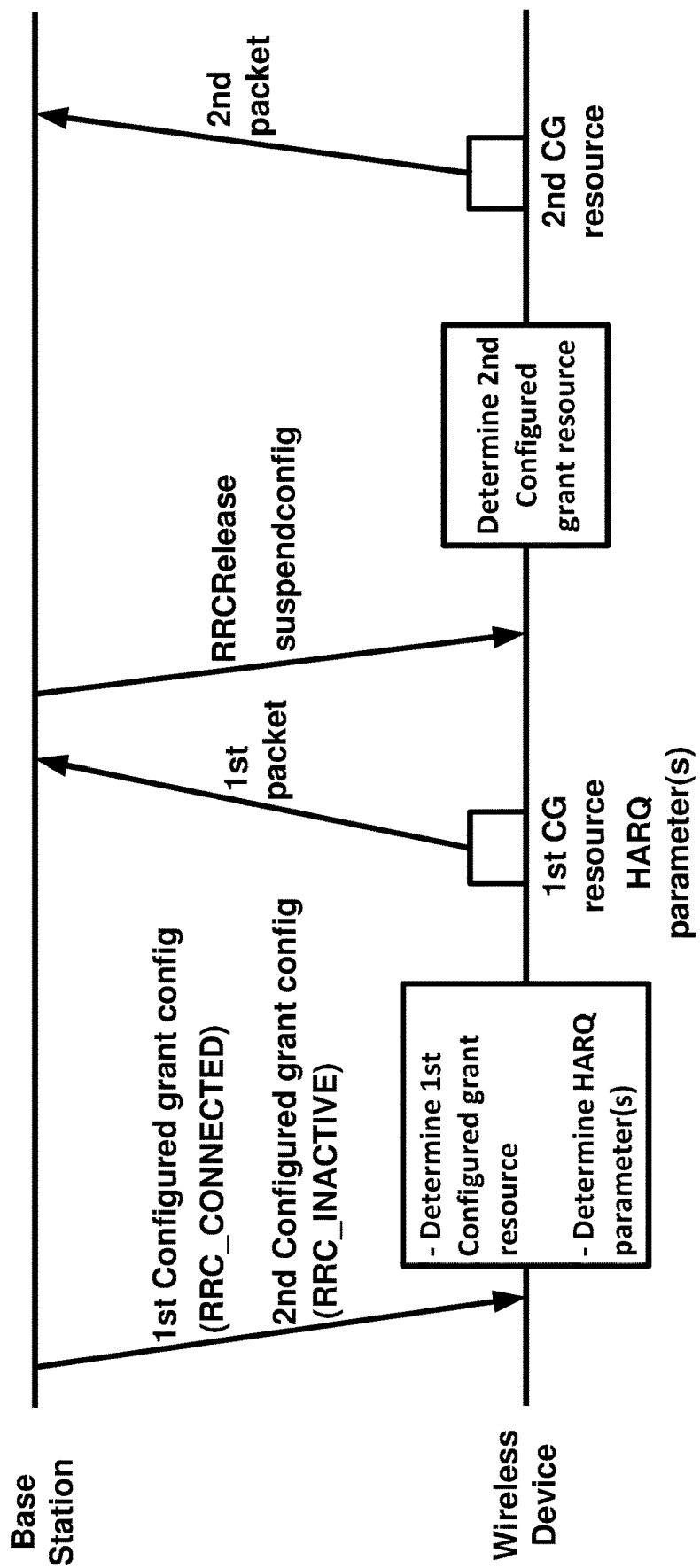
FIG. 36 shows an example process in accordance with several of various embodiments of the present disclosure.

In an example embodiment as shown in FIG. 36, a wireless device, while in the RRC_CONNECTED state, may receive first configuration parameters of a first configured grant configuration for the wireless device during the RRC_CONNECTED state and second configuration parameters of a second configured grant configuration for the wireless device during an RRC_INACTIVE state. For example, a first parameter in the first configuration parameters may indicate that the first configuration parameters are for the RRC_CONNECTED state and a second parameter in the second configuration parameters may indicate the second configuration parameters are for the RRC_INACTIVATE state.

The wireless device may determine a first resource, while in the RRC_CONNECTED state, based on the first configured grant configuration parameters. For example, the first configured grant configuration parameters may comprise a first periodicity parameter and the wireless device may determine a first timing of the first resource based on the first periodicity parameter. For example, the first configured grant configuration parameters may comprise one or more first parameters indicating frequency domain resources of the first resource. The wireless device may transmit a first packet via the first resource.

The wireless device may receive an RRC release message indicating transitioning from the RRC_CONNECTED state to the RRC_INACTIVE state and/or suspending an RRC connection for the wireless device. For example, the RRC release message may comprise a suspend config IE indicating the transition from the RRC_CONNECTED state to the RRC_INACTIVE state. The wireless device may transition from the RRC_CONNECTED state to the RRC_INACTIVE state based on the receiving the RRC release message.

The wireless device may determine a second resource, while in the RRC_INACTIVE state, based on the second configured grant configuration parameters. For example, the second configured grant configuration parameters may comprise a second periodicity parameter and the wireless device may determine a second timing of the second resource based on the second periodicity parameter. For example, the second configured grant configuration parameters may comprise one or more second parameters indicating frequency domain resources of the second resource. The wireless device may transmit a second packet via the second resource. The wireless device may transmit the second packet via the second resource.

The wireless device may determine one or more HARQ parameters for transmission of the first packet. The wireless device may transmit the first packet based on and/or with determining the one or more HARQ parameters. The wireless device may not determine the one or more HARQ parameters for transmission of the second packet. The wireless device may transmit the second packet without determining the one or more HARQ parameters.

In an example, the one or more HARQ parameters may comprise a HARQ process identifier. The wireless device may determine the HARQ process identifier for transmission of the first packet based on configured grant configuration parameters. In an example, the one or more HARQ parameters may comprise a redundancy version. In an example, the one or more HARQ parameters may comprise a redundancy version. The wireless device may store the first packet, for transmission during the RRC_CONNECTED state, in HARQ buffer associated with a HARQ process identifier. The wireless device may not store the second packet, for transmission during the RRC_INACTIVE state, in a HARQ buffer.

In an example, the RRC release message may comprise a suspend config IE indicating the transition from the RRC_CONNECTED state to the RRC_INACTIVE state. The suspend config may comprise configuration parameters for wireless device operation during the RRC_INACTIVE state. The suspend config IE may comprise one or more wireless device identifiers/RNTIs, for example, a full RNTI and a short RNTI. The transmitting the second packet during the RRC_INACTIVE state may be based on a wireless device identifier/RNTI of the one or more wireless device identifiers/RNTIs.

In an example embodiment, a wireless device may receive sounding reference signal (SRS) configuration parameters. The SRS configuration parameters may comprise first configuration parameters for SRS transmission while the wireless device is in an RRC_CONENCTED state and second configuration parameters for SRS transmission during an RRC_INACTIVE state. The wireless device may transmit SRS signals during the RRC_CONNECTED state using the first configuration parameters and may transmit SRS signals during the RRC_INACTIVE state use the second configuration parameters.

The wireless device may receive an RRC release message indicating transitioning from the RRC_CONNECTED state to the RRC_INACTIVE state and/or suspending an RRC connection for the wireless device. For example, the RRC release message may comprise a suspend config IE indicating the transition from the RRC_CONNECTED state to the RRC_INACTIVE state. The wireless device may transition from the RRC_CONNECTED state to the RRC_INACTIVE state based on the receiving the RRC release message. In an example, the suspend config IE may comprise second configuration parameters for SRS transmission during the RRC_INACTIVE state.

In an example, the first configuration parameters may comprise a first periodicity and/or offset parameter and the second configuration parameters may comprise a second periodicity and/or offset parameter. The first periodicity and/or offset parameter may be used for determining transmission timing of SRS signals during the RRC_CONNECTED state and the second periodicity and/or offset parameter may be used for determining transmission timing of SRS signals during the RRC_INACTIVE state.

In an example, the first configuration parameters may comprise one or more first parameters indicating first resources (e.g., first timing, first comb structure, etc.) for transmitting first SRS signals, during the RRC_CONNECTED state, and the second configuration parameters may comprise second parameters indicating second resources (e.g., second timing, second comb structure, etc.) for transmitting second SRS signals, during the RRC_INACTIVE state.

In an example, the first configuration parameters may comprise one or more first power control parameters for power calculation of the one or more first SRS signals, during the RRC_CONNECTED state, and the second configuration parameters may comprise second power control parameters for power calculation of the one or more second SRS signals, during the RRC_INACTIVE state. The wireless device may transmit the one or more first SRS signals using the power levels calculated based on the one or more first power control parameters and may transmit one or more second SRS signals using the power levels calculated using the one or more second power control parameters.

In an example, the first configuration parameters may comprise one or more first frequency hopping parameters and the second configuration parameters may comprise one or more second frequency hopping parameters.

The base station may use the transmitted SRS signals during the RRC_INACTIVE state for estimating uplink channel conditions during the RRC_INACTIVE state. The base station may transmit a suspend config IE to the wireless device to reconfigure one or more parameters during the RRC_INACTIVE and/or for transitioning an RRC state of the wireless device (e.g., to the RRC_CONNECTED state or to the RRC_IDLE state). For example, the base station may start a network initiated RRC resume procedure and transmit the suspend config IE with new configuration parameters based on the receiving the SRS signals during the RRC_INACTIVE state.

Figure 37:
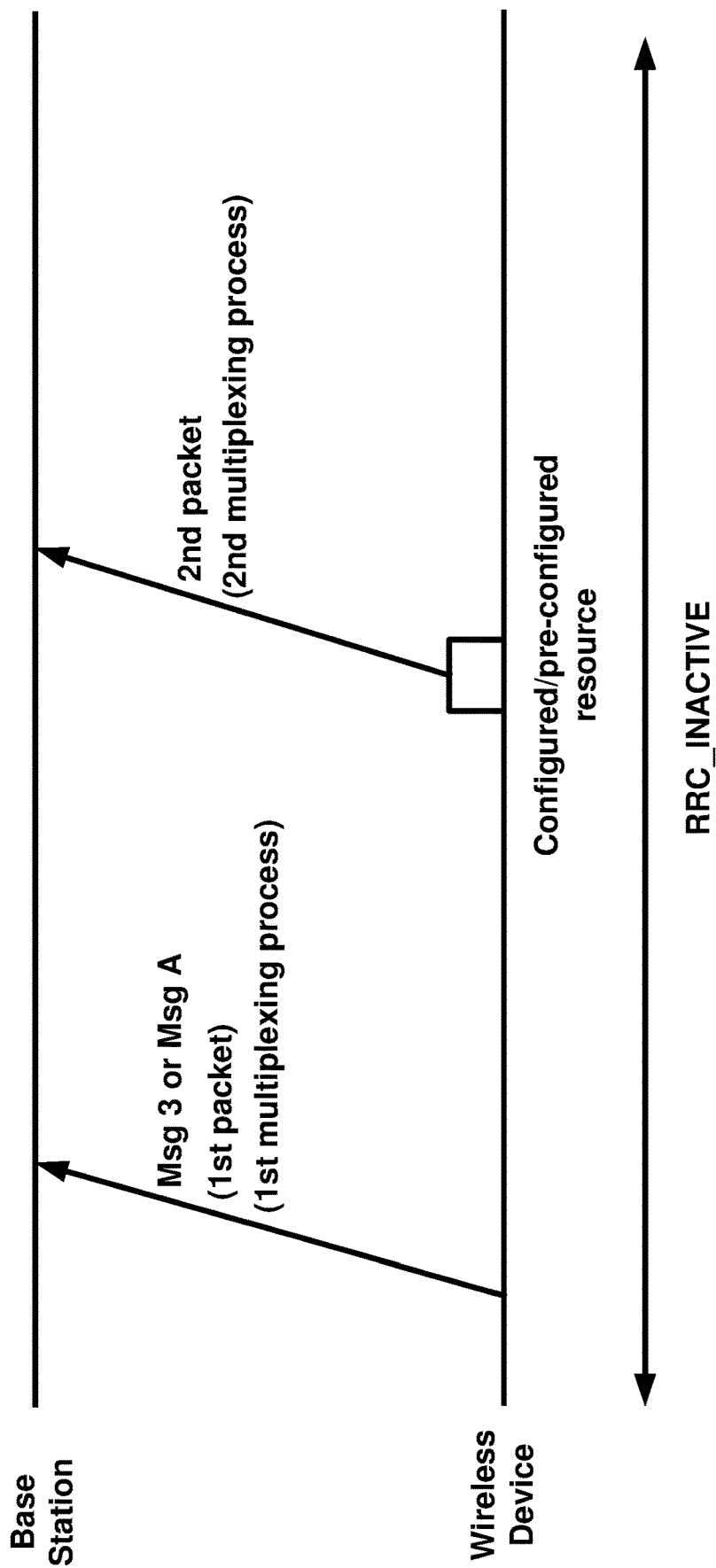
FIG. 37 shows an example process in accordance with several of various embodiments of the present disclosure.

In an example embodiment as shown in FIG. 37, a wireless device may be in an RRC_INACTIVE state. The wireless device may transmit uplink data during the RRC_INACTIVE state using a random access process (e.g., a two-step or a four-step random access process) or based on pre-configured/configured resources (e.g., configured grant Type 1 resources). The wireless device may multiplex data from one or more logical channels corresponding to radio bearers (e.g., data radio bearers and/or signaling radio bearers) in a TB and transmit the TB via the random access process (e.g., Msg A in two-step random access process or Msg 3 in four-step random access process) or a pre-configured/configured resource. For example, for transmission based on a four-step random access process, the wireless device may receive a random access response comprising an uplink grant for transmission of a packet. For example, for transmission based on a two-step random access process, the wireless device may transmit a packet in Msg A. For example, for transmission based on a pre-configured/configured grant resource, the wireless device may receive configuration parameters of the pre-configured/configured grant configuration indicating a plurality of resources comprising the pre-configured/configured grant resource. For example, the wireless device may receive an RRC release message indicating transitioning of the wireless device form an RRC_CONNECTED state to the RRC_INACTIVE state and/or suspending an RRC connection for the wireless device, wherein the RRC release message (or a suspend config IE in the RRC release message) comprise the configuration parameters of the pre-configured/configured grant configuration. The wireless device may create a packet based on the configuration parameters and transmit the packet.

The wireless device may employ different multiplexing processes for an uplink transmission based on a random access process and an uplink transmission based on a pre-configured/configured grant resource. The wireless device may transmit a first packet (e.g., a first TB) based on a random access process and based on a first multiplexing process. The wireless device may transmit a second packet (e.g., a second TB) based on a pre-configured/configured grant resource and based on a second multiplexing process.

Figure 38:
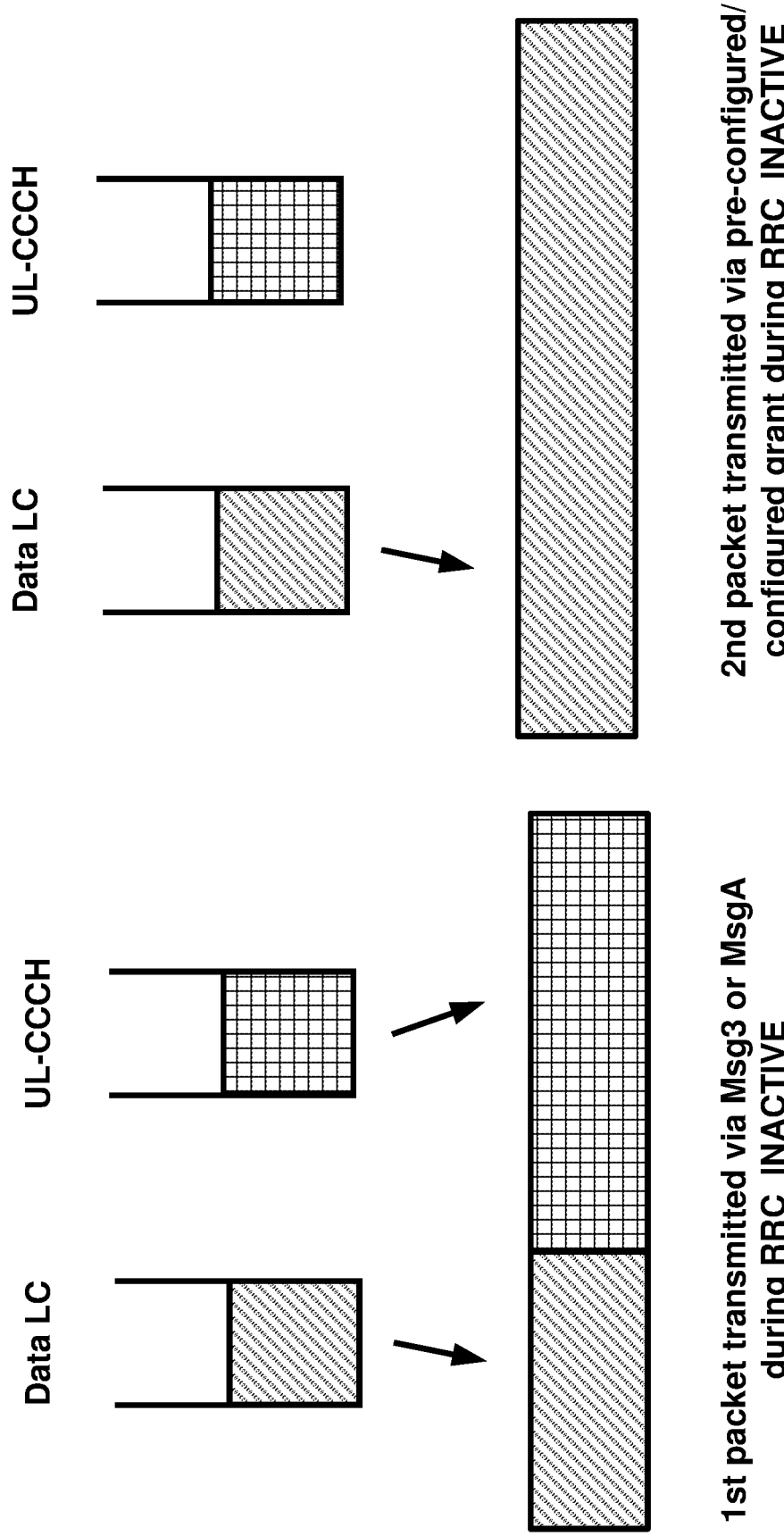
FIG. 38 shows multiplexing processes in accordance with several of various embodiments of the present disclosure.

In an example embodiment as shown in FIG. 38, the first multiplexing process, for transmission of the first packet based on the random access process, may include/allow data of one or more logical channels in the first packet. The second multiplexing process, for transmission of the second packet based on the pre-configured/configured grant resource, may exclude/disallow data of the one or more logical channels in the second packet. In an example, the one or more logical channels may comprise a common control channel (CCCH) logical channel. The CCCH logical channel may be mapped to a signaling radio bearer. The CCCH logical channel may be for transmission of one or more RRC messages (e.g., an RRC resume request message, etc.).

In an example, the first multiplexing procedure may comprise a first logical channel prioritization (LCP) procedure and the second multiplexing procedure may comprise a second LCP procedure. One or more parameters of the first LCP procedure may be different from one or more parameters of the second LCP procedure.

For example, the first multiplexing/LCP procedure may comprise a first logical channel selection process and the second multiplexing/LCP procedure may comprise a second logical channel selection process. The first logical channel selection process may select logical channel(s) for the first multiplexing process and for including in the first packet. The second logical channel selection process may select logical channel(s) for the second multiplexing process and for including in the second packet. The first logical channel selection process may select one or more first logical channels comprising the one or more logical channels. The first logical channel selection process may select one or more first logical channels without excluding the one or more logical channels. The second logical channel selection process may select one or more second logical channels not comprising the one or more logical channels. The second logical channel selection process may select one or more second logical channels with excluding the one or more logical channels.

In an example, a wireless device may receive one or more messages comprising configuration parameters. The one or more messages may comprise one or more RRC messages. The one or more RRC message may comprise configuration parameters for the wireless device operation during an RRC_CONNECTED state. The one or more messages may comprise first configuration parameters for wireless device operation during an RRC_INACTIVE state.

In an example embodiment, a wireless device may receive configuration parameters of a logical channel. The configuration parameters may comprise a first parameter indicating whether the logical channel is mapped to (e.g., is allowed to be transmitted via resources indicated by) an uplink grant for transmission during an RRC_INACTIVE state. An example logical channel configuration with the first parameter (e.g., RRCInactiveAllowed, other names may be used) is shown in FIG. 39A. In an example, the first parameter may indicate that the logical channel is mapped to and/or allowed to be transmitted via a resource (e.g., a periodic resource, pre-configured resource, configured grant/configured grant Type 1 resource, resource used during a random access process, e.g., based on uplink grant indicated by RAR or Msg A) in an RRC_INACTIVE state.

In an example embodiment, a wireless device may receive configuration parameters of a logical channel. The configuration parameters may comprise a first parameter indicating whether the logical channel is mapped to (e.g., is allowed to be transmitted via resources indicated by) a configured grant or a configured grant Type 1 for transmission during an RRC_INACTIVE state. An example logical channel configuration with the first parameter (e.g., configuredGrantType1RRCInactiveAllowed, other names may be used) is shown in FIG. 39B. In an example, the first parameter may indicate that the logical channel is mapped to and/or allowed to be transmitted via a pre-configured/configured grant resource (e.g., configured grant Type 1 resource) in an RRC_INACTIVE state.

In an example as shown in FIG. 39A and FIG. 39B, the logical channel configuration parameters may further comprise a second parameter indicating that the logical is allowed to be transmitted via a configured grant resource (e.g., configured grant Type 1 resource) during the RRC_CONNECTED state. In an example, the configuration parameters may comprise different parameters indicating whether the logical channel is mapped to/allowed to be transmitted based on a configured grant resource (e.g., configured grant Type 1 resource) during the RRC_CONNECTED state and the RRC_INACTIVE state. In an example, a single parameter may indicate whether the logical channel is mapped to/allowed to be transmitted based on a configured grant resource (e.g., configured grant Type 1 resource) in RRC_CONNECTED and RRC_INACTIVE state.

Figure 40:
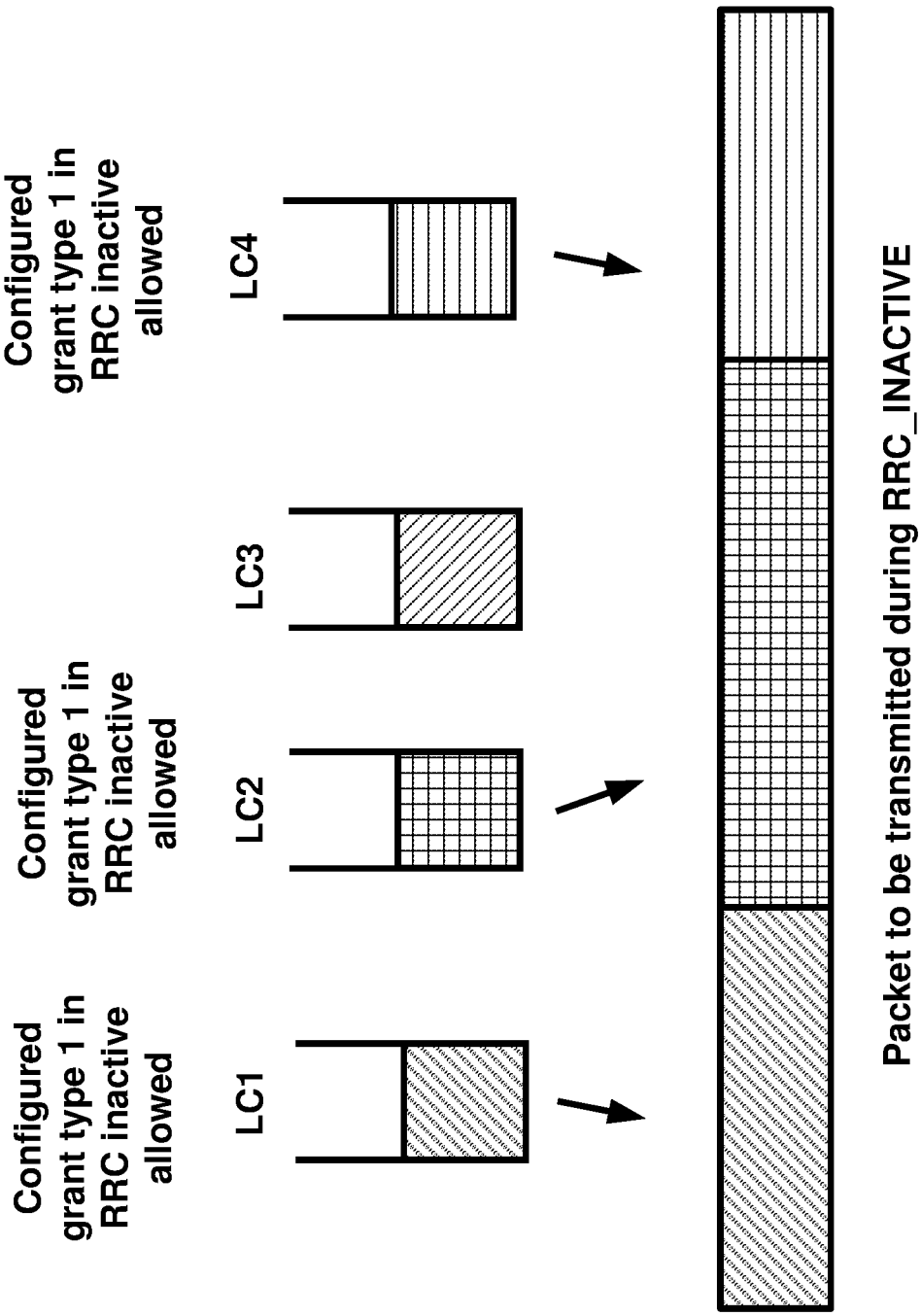
FIG. 40 shows an example multiplexing process in accordance with several of various embodiments of the present disclosure.

In an example embodiment, in response to the logical channel being mapped to/allowed to be transmitted via a resource in RRC_INACTIVE state, the wireless device may multiplex one or more logical channel, comprising the logical channel, in a packet and transmit the packet via the resource. In an example as shown in FIG. 40, LC1, LC2 and LC4 logical channels are mapped to/allowed to be transmitted via a resource in RRC_INACTIVE state. For example, the configuration parameters of LC1, LC2 and LC4 may comprise parameters indicating that the LC1, LC2 and LC4 are mapped to/allowed to be transmitted via a resource in an RRC_INACTIVE state. The configuration parameters of LC3 may not comprise a parameter indicating that the LC3 logical channel is mapped to/allowed to be transmitted via a resource in the RRC_INACTIVE state. In response to the logical channel configuration parameters indicating that the LC1, LC2 and LC4 are mapped to/allowed to be transmitted via a resource in RRC_INACTIVE state and LC3 is not mapped to/allowed to be transmitted via a resource in RRC_INACTIVE state, the wireless device may multiplex data from LC1, LC2 and LC4 in a packet for transmission via a resource during the RRC_INACTIVE state and may exclude LC3. The wireless device may transmit the packet based on the resource.

Figure 41:
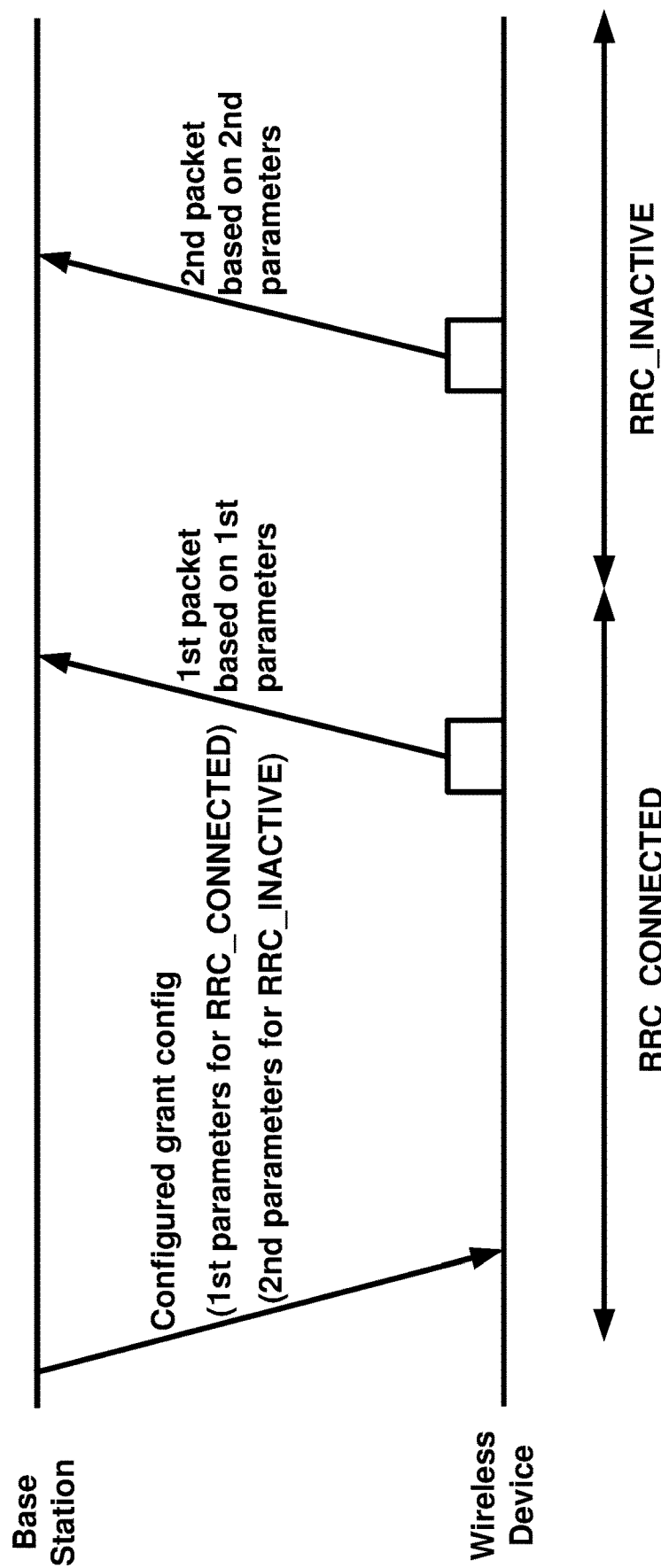
FIG. 41 shows an example process in accordance with several of various embodiments of the present disclosure.

In an example embodiment as shown in FIG. 41, a wireless device may receive configuration parameters of a configured grant configuration. The configuration parameters of the configured grant configuration may comprise one or more first parameters for an RRC_CONNECTED state and one or more second parameters for an RRC_INACTIVE state. In an example, the configuration parameters of the configured grant configuration may comprise a first information element comprising the one or more first parameters and a second information element comprising the one or more second parameters. The wireless device may transmit a first packet (e.g., a first TB), while in an RRC_CONNECTED state, based on the one or more first parameters. The wireless device may transmit a second packet (e.g., a second TB), while in an RRC_INACTIVE state, based on the one or more second parameters.

In an example, the one or more first parameters may comprise one or more HARQ related parameters and the one or more second parameters may not comprise a HARQ related parameter. For example, the one or more HARQ related parameters may comprise a number of HARQ processes. The one or more first parameters may indicate a number of HARQ processes and the one or more second parameters may not indicate a number of HARQ processes.

In an example, the one or more first parameters may comprise a first periodicity parameter and the one or more second parameters may comprise a second periodicity parameter. The wireless device may determine time occasions of first configured grant resources during the RRC_CONNECTED state based on the first periodicity parameter. The wireless device may determine time occasions of second configured grant resources during the RRC_INACTIVE state based on the second periodicity number. The wireless device may further determine first HARQ process identifiers of the first configured grant transmissions during the RRC_CONNECTED state based on the first periodicity parameter. The wireless device may not determine HARQ process identifiers for transmissions based on configured grant resources during the RRC_INACTIVE state.

In an example, the one or more first parameters may comprise a first wireless device identifier/RNTI. The one or more second parameters may comprise a second wireless device identifier/RNTI. In an example, the one or more second parameters may not comprise a wireless device identifier/RNTI associated with configured grant configuration and may comprise a wireless device identifier/RNTI associated with wireless device operation in RRC_INACTIVE state.

In an example, the one or more first parameters may comprise a first repetition parameter for transmission repetitions during the RRC_CONNECTED state. The wireless device may repeat uplink transmissions corresponding to the configured grant configuration during the RRC_CONNECTED state based on the first repetition parameter. The one or more second parameters may comprise a second repetition parameter for transmission repetitions during the RRC_INACTIVE state. The wireless device may repeat uplink transmissions corresponding to the configured grant configuration during the RRC_INACTIVE state based on the second repetition parameter.

In an example, the one or more first parameters may comprise a first power control parameter for transmissions corresponding to the configured grant configuration during the RRC_CONNECTED state. The wireless device may calculate transmission power levels of configured grant uplink transmissions during the RRC_CONNECTED state based on the first power control parameter and may transmit the configured grant uplink transmissions during the RRC_CONNECTED state based on the calculated transmission power levels. The one or more second parameters may comprise a second power control parameter for transmissions corresponding to the configured grant configuration during the RRC_INACTIVE state.

Figure 42:
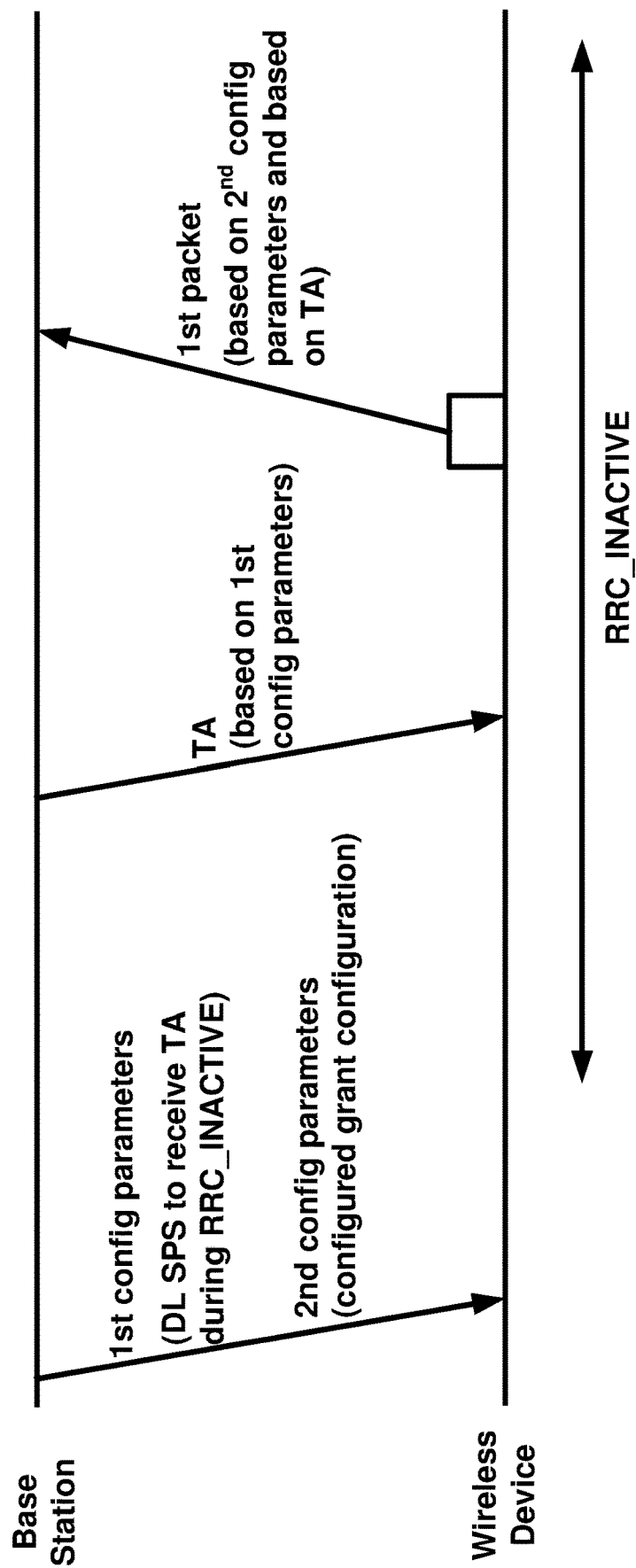
FIG. 42 shows an example process in accordance with several of various embodiments of the present disclosure.

In an example embodiment as shown in FIG. 42, a wireless device may receive first configuration parameters of a downlink semi-persistent scheduling (SPS) configuration. The downlink SPS configuration may be for receiving timing advance values for uplink transmissions during an RRC_INACTIVE state. For example, the first configuration parameters may comprise a parameter indicating that the downlink SPS configuration is for wireless device operation during the RRC_INACTIVE state and/or for receiving timing advance values during an RRC_INACTIVE state. The wireless device may activate a plurality of resources, during the RRC_INACTIVE state, based on the receiving the first configuration parameters. The wireless device may activate the plurality of resources based on the receiving the first configuration parameters and without receiving an L1 activation command. The wireless device may receive second configuration parameters of a configured grant configuration for transmitting uplink data packets during an RRC_INACTIVE state. The wireless device may determine configured grant resources during the RRC_INACTIVE state based on the second configuration parameters.

In an example, the wireless device may receive an RRC release message indicating transitioning of the wireless device to the RRC_INACTIVE state and/or suspension of an RRC connection for the wireless device. For example, the RRC release message may comprise a suspend config IE indicating the transitioning of the wireless device form the RRC_CONNECTED state to the RRC_INACTIVE state. The suspend config IE may comprise configuration parameters of the wireless device for the wireless device operation during the RRC_INACTIVE state. For example, the RRC release message or the suspend config IE in the RRC release message may comprise the first configuration parameters of the downlink SPS configuration and/or the second configuration parameters of the uplink configured grant configuration.

The wireless device may receive timing advance values, during the RRC_INACTIVE state, based on the first configuration parameters. The wireless device may receive downlink packets based on the first configuration parameters and via the downlink SPS resources, wherein the downlink packets may comprise the timing advance values. For example, the wireless device may receive timing advance command MAC CEs indicating the timing advance values, wherein the timing advance MAC CEs are multiplexed in the downlink packets. The first configuration parameters may comprise a first periodicity parameter. The wireless device may activate a plurality of downlink assignments based on the first periodicity parameter. For example, the wireless device may determine time occasions of the plurality of downlink assignments based on the first periodicity parameter. The wireless device may receive the downlink packets via the plurality of the downlink assignments.

The wireless device may transmit uplink packets, during the RRC_INACTIVE state, based on the second configuration parameters and based on the received timing advance values. The second configuration parameters may comprise a second periodicity parameter. The wireless device may determine a plurality of pre-configured/configured grant resources based on the second periodicity parameter. The wireless device may transmit the uplink packets base don the plurality of the pre-configured/configured grant resources.

Figure 43:
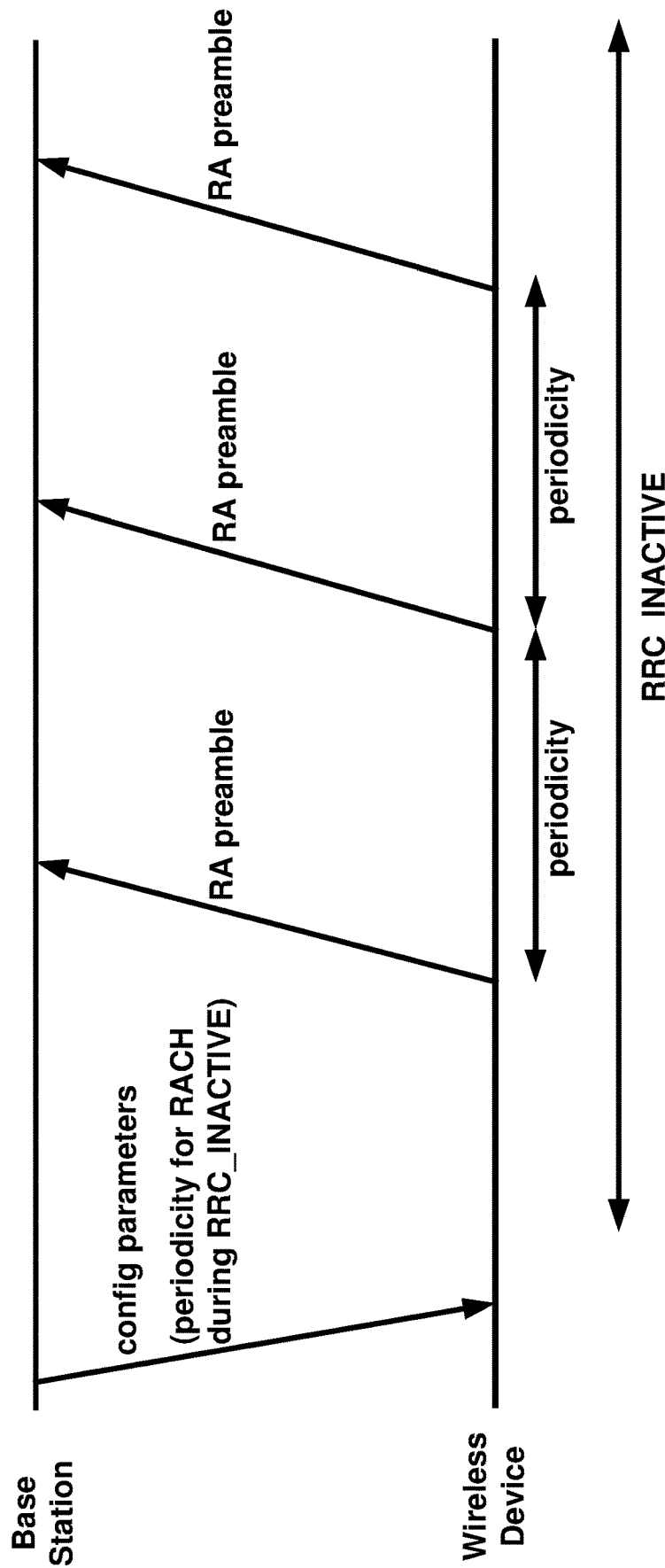
FIG. 43 shows an example process in accordance with several of various embodiments of the present disclosure.

In an example embodiment as shown in FIG. 43, a wireless device may receive configuration parameters for obtaining timing advance values during an RRC_INACTIVE state. For example, the configuration parameters may comprise a periodicity parameter. In an example, the wireless device may receive an RRC release message indicating wireless device transition form an RRC_CONNECTED state to an RRC_INACTIVE state, wherein the RRC release message may comprise the periodicity parameter. In an example, a suspend config IE of the RRC release message may comprise the periodicity parameter. In an example the periodicity parameter may be in terms of a number of slots or symbols or milliseconds. The wireless device may determine timings for transmissions of random access preambles, during RRC_INACTIVE state, based on the periodicity parameter. The wireless device may transmit, during the RRC_INACTIVE state, random access preambles based on the periodicity parameter and at the determined timings. In response to the transmissions of the random access preambles, the wireless device may receive timing advance values for uplink transmissions during the RRC_INACTIVE state.

Figure 44:
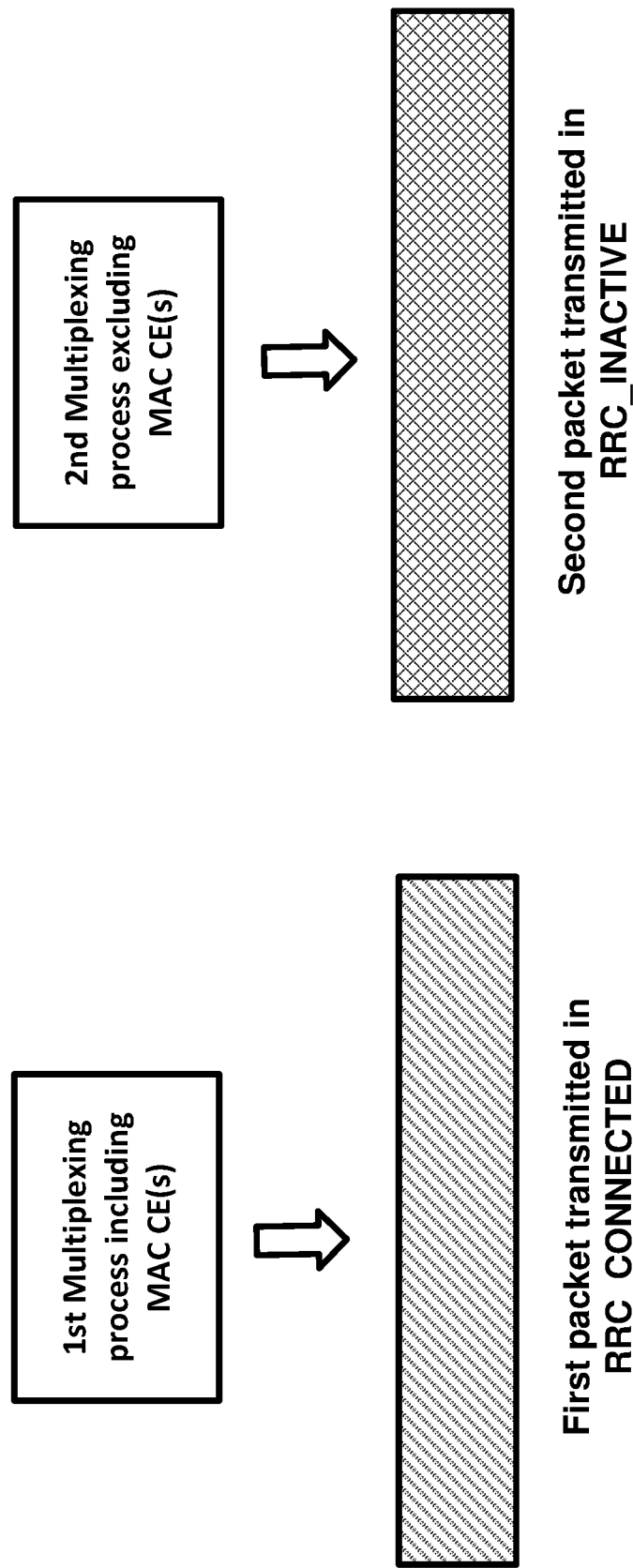
FIG. 44 shows example multiplexing processes in accordance with several of various embodiments of the present disclosure.

In an example embodiment as shown in FIG. 44, a wireless device may transmit uplink packets during an RRC_CONNECTED state and an RRC_INACTIVE state. The wireless device may transmit uplink packets, during the RRC_CONNECTED state, based on dynamic or configured grants or based on random access processes. The wireless device may transmit the uplink packets, during the RRC_INACTIVE state, based on random access processes or based on pre-configured/configured grant resources. The wireless device may transmit a first uplink packet based on a first uplink grant during the RRC_CONNECTED state. The wireless device may transmit the first uplink packet based on a first multiplexing process. The wireless device may multiplex/include one or more MAC CEs in the first packet. The wireless device may transmit a second uplink packet based on a second uplink grant during the RRC_INACTIVE state. The wireless device may transmit the second packet based on a second multiplexing process. The wireless device may not multiplex and/or may exclude the one or more MAC CEs in the second packet.

In an example embodiment, priorities associated with the one or MAC CEs, for a multiplexing/LCP process, may be different in RRC_CONNECTED state and the RRC_INACTIVE state. For example, the one or more MAC CEs may have a lower priority in the RRC_INACTIVE state compared to the RRC_CONNECTED state. For example, the one or more MACC CEs may have higher priority than data logical channels in RRC_CONNECTED state and may have lower priority than data logical channels in RRC_INACTIVE state. In an example, the one or more MAC CEs may comprise at least one of BSR and PHR.

Figure 45:
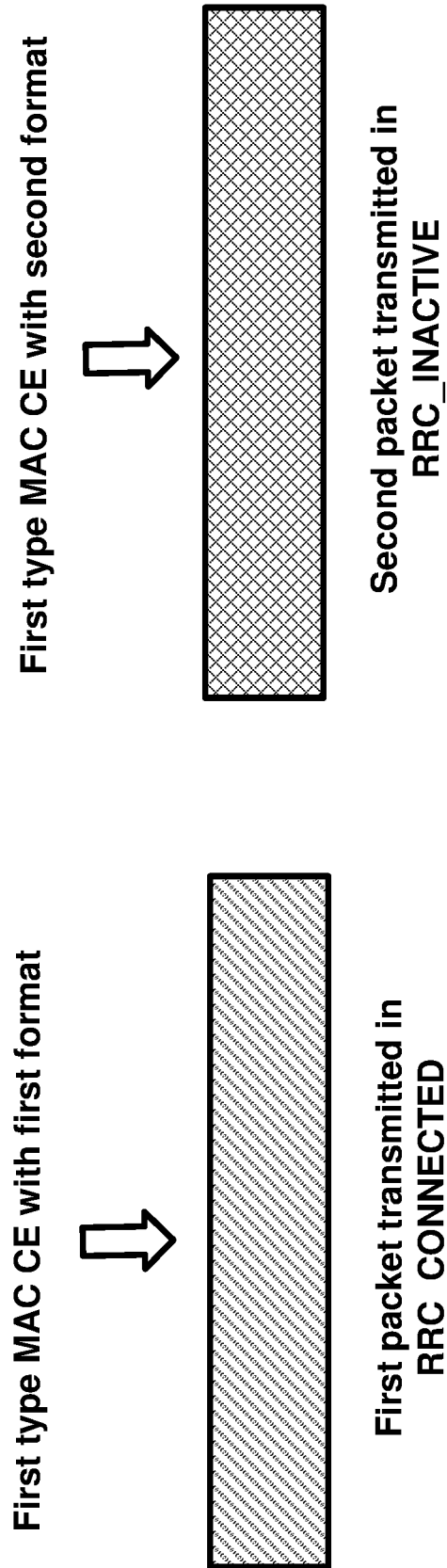
FIG. 45 shows example processes in accordance with several of various embodiments of the present disclosure.

In an example embodiment as shown in FIG. 45, a wireless device may transmit a first MAC CE of a first type via a first uplink grant in an RRC_CONNECTED state. The wireless device may transmit the first MAC CE by multiplexing the first MAC CE in a first packet (e.g., a first TB) and may transmit the first packet based on the first uplink grant. The first type of the first MAC CE may be a BSR or a PHR or another uplink MAC CE. The wireless device may transmit a second MAC CE of the first type via a second uplink grant in an RRC_INACTIVE state. The wireless device may transmit the second MAC CE by multiplexing the second MAC CE in a second packet (e.g., a second TB) and may transmit the second packet based on the second uplink grant. Based on the first MAC CE being transmitted during the RRC_CONNECTED state, the wireless device may transit the first MAC CE using a first format for the first type MAC CEs. Based on the second MAC CE being transmitted during the RRC_INACTIVE state, the wireless device may transit the second MAC CE using a second format for the first type MAC CEs.

Figure 46:
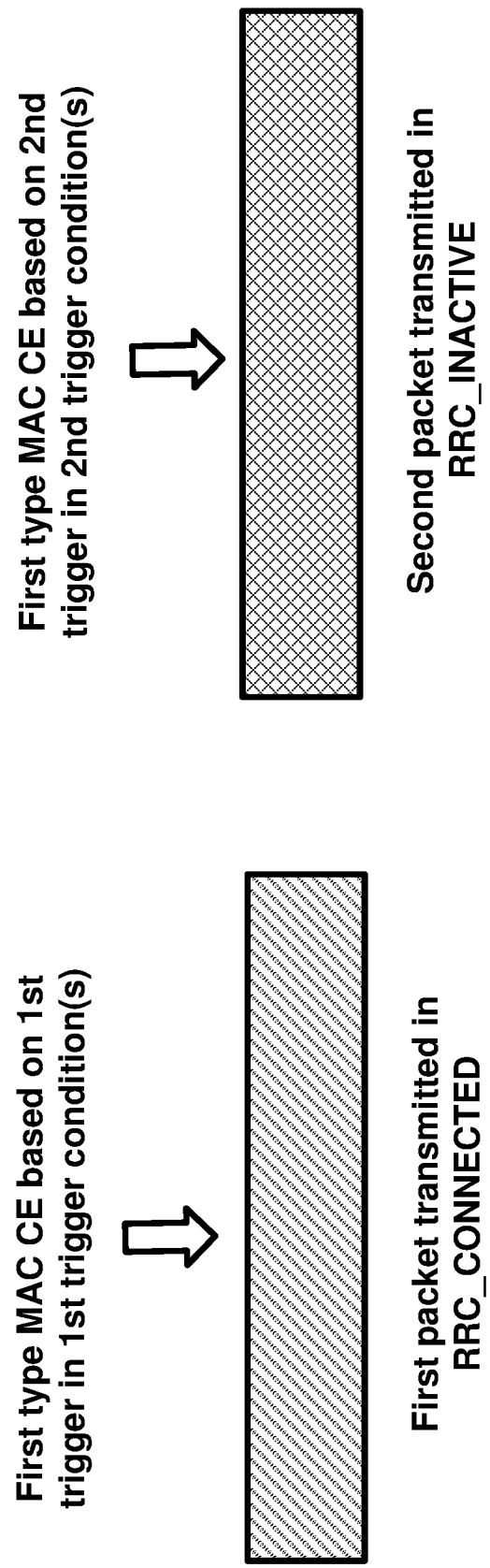
FIG. 46 shows example processes in accordance with several of various embodiments of the present disclosure.

In an example embodiment as shown in FIG. 46, the first MAC CE of the first type may be triggered based on a first trigger condition of one or more first trigger conditions. The one or more first trigger conditions may be for triggering the first type MAC CEs during an RRC_CONNECTED state. The second MAC CE may be triggered based on a second trigger condition of one or more second trigger conditions. The one or more second trigger conditions may be for triggering the first type MAC CEs during an RRC_INACTIVE state. In an example, the one or more first trigger conditions for triggering the first type MAC CE during an RRC_CONNECTED state may be different from the one or more second trigger conditions for triggering the first type MAC CE during an RRC_INACTIVE state.

In an example embodiment, a wireless device may receive a first MAC CE of a first type based on first downlink resources in an RRC_CONNECTED state. The first type of the first MAC CE may be a downlink MAC CE. The wireless device may receive a second MAC CE of the first type based on second downlink resources in an RRC_INACTIVE state. Based on the first MAC CE being received during the RRC_CONNECTED state, the wireless device may receive the first MAC CE according to a first format for the first type MAC CEs. Based on the second MAC CE being received during the RRC_INACTIVE state, the wireless device may receive the second MAC CE according to a second format for the first type MAC CEs.

In an example, a wireless device may receive an RRC release message indicating transitioning of the wireless device form an RRC_CONNECTED state to an RRC_INACTIVE state and/or suspending an RRC connection for the wireless device. In an example, embodiment, the wireless device may flush one or more HARQ buffers based on the receiving the RRC release message and/or based on the transitioning from the RRC_CONNECTED state to the RRC_INACTIVE state and/or suspending the RRC connection. In an example embodiment, the wireless device may transmit packets stored in the HARQ buffers via resources (e.g., pre-configured/configured grant resources) during the RRC_INACTIVE state. The wireless device may ignore the association of the packets stored in the HARQ buffers with HARQ process identifiers when transmitting the packets via resources during the RRC_INACTIVE state. In an example embodiment, the wireless device may reset one or more timers associate with the configured grant processes (e.g., one or more configured grant timers associated with one or more HARQ processes) based on the receiving the RRC release message and/or based on the transitioning from the RRC_CONNECTED state to the RRC_INACTIVE state and/or suspending the RRC connection.

In an example embodiment, a wireless device may receive an RRC release message indicating transitioning from an RRC connected state to an RRC inactive state. The wireless device may start a time alignment timer based on the receiving the RRC release message. In an example, the wireless device may start the time alignment timer based on transitioning from the RRC inactive state to the RRC inactive state.

In an example, the starting the time alignment timer may be at a timing offset to a reference timing.

In an example, the reference timing may be a reference system frame number (SFN) (e.g., system frame number 0).

In an example, the timing reference may be a first slot/symbol in a reference system frame number (e.g., system frame number 0).

In an example, the timing offset may be in terms of a first number of symbols.

In an example, the RRC release message may comprise a timing offset. The starting the time alignment timer may be based on the timing offset. In an example, a suspend config IE in the RRC release message may comprise the timing offset.

In an example embodiment, a wireless device may receive configuration parameters of one or more cells comprising a first cell. The wireless device may receive an RRC release message indicating transitioning of the wireless device from an RRC connected state to an RRC inactive state. The wireless device may determine a timing advance value associated with the one or more cells while the wireless device is in the RRC connected state and before the receiving the RRC release message. In an example, wireless device may determine a timing advance value associated with the one or more cells while the wireless device is in the RRC connected state and before the transitioning from the RRC connected state to the RRC inactive state. The wireless device may transmit, while in the RRC inactive state and via the first cell, one or more uplink packets based on the timing advance value.

In an example, the one or more cells may be grouped into a timing advance group. In an example, the timing advance group may a primary timing advance group; and the first cell may be a primary cell.

In an example, the transmitting the one or more uplink packets, based on the timing advance value, may be while a timer is running. In an example, the timer may be a time alignment timer. In an example, the timer may be started at a MAC layer. In an example, the timer may be maintained by a MAC layer. In an example, the timer may be an RRC timer and may be started at the RRC layer. In an example, the timer may be an RRC timer and may be maintained by an RRC layer.

In an example, the RRC release message may comprise a suspend config IE comprising first configuration parameters for wireless device operation in the RRC inactive state.

In an example, the wireless device may start a timer with a timer value based on the receiving the RRC release message. In an example, the wireless device may start a timer based on transitioning from the RRC connected state to the RRC inactive state. In an example, the RRC release message may comprise/indicate the timer value. In an example, the RRC release may comprise a suspend config IE comprising/indicating the timer value. The transmitting the one or more uplink packets based on the timing advance value may be while a timer is running. In an example, the starting the starting the timer may be at a timing offset to a reference timing. In an example, the reference timing may be a reference system frame number (SFN) (e.g., system frame number 0). In an example, the reference timing may be a first slot/symbol in a reference system frame number (e.g., system frame number 0). In an example, the timing offset may be in terms of a first number of symbols. In an example, the RRC release message may comprise/indicate the timing offset. In an example, a suspend config IE in the RRC release message may comprise/indicate the timing offset.

In an example embodiment, a wireless device, in a radio resource control (RRC) connected state, may receive an RRC release message comprising a suspend config information element. The suspend config information element may indicate a transition from the RRC connected state to an RRC inactive state. The suspend config information element may comprise configuration parameters for wireless device operation in the RRC inactive state. The configuration parameters may comprise one or more parameters for determining uplink timing for uplink transmission. The wireless device may transmit, while in the RRC inactive state, uplink data based on the one or more parameters.

In an example, the one or more parameters may comprise a timing advance value. In an example, the one or more uplink transmissions during the RRC inactive state may be based on the timing advance value. In an example, the one or more uplink transmissions during the RRC inactive state may be based on the timing advance value and based on a timer running.

In an example, the one or more parameters may comprise a timing alignment timer value for a time alignment timer. In an example, the wireless device may transmit, while in an RRC inactive state, random access preambles based on the time alignment timer. In an example, the wireless device may start a time alignment timer with the time alignment timer value based on the receiving the RRC release message. In an example, the wireless device may start a time alignment timer with the time alignment timer value based on the transitioning from the RRC connected state to the RRC inactive state. In an example, the starting the time alignment timer may be at a timing offset to a reference timing. In an example, the reference timing may be a reference system frame number (SFN) (e.g., system frame number 0). In an example, the reference timing may be a first slot/symbol in a reference system frame number (e.g., system frame number 0). In an example, the timing offset may be in terms of a first number of symbols. In an example, the RRC release message may indicate the timing offset. In an example, a suspend config IE in the RRC release message may indicate the timing offset.

In an example embodiment, a wireless device, in a radio resource control (RRC) inactive state, may transmit a random access preamble for obtaining a timing advance value. The wireless device may receive a random access response comprising a timing advance value. The wireless device may transmit an RRC resume request message comprising a resume cause information element indicating a cause for RRC resume request as a timing advance request. The wireless device may transmit, while in the RRC inactive state, uplink data based on the timing advance value.

In an example, the transmitting random access preamble may be based on an expiry of a time alignment timer. In an example, the wireless device may receive configuration parameters comprising a time alignment timer value for the time alignment timer. In an example, the wireless device may receive an RRC release message comprising the configuration parameters. In an example, the wireless device may receive broadcast system information comprising a time alignment timer value for the time alignment timer. In an example, the wireless device may receive paging information comprising a time alignment timer value for the time alignment timer.

In an example, the transmitting random access preamble may be based on a periodicity parameter.

In an example embodiment, a wireless device, in a radio resource control (RRC) inactive state, may start a random access process for obtaining a timing advance value. The wireless device may transmit an RRC resume request message comprising a resume cause information element indicating a cause for RRC resume request as a timing advance request. The wireless device may receive a message comprising a timing advance value. The wireless device may transmit, while in the RRC inactive state, uplink data based on the timing advance value.

In an example, wherein the starting the random access process may be based on an expiry of a time alignment timer. In an example, the wireless device may receive configuration parameters comprising a time alignment timer value for the time alignment timer. In an example, the wireless device may receive an RRC release message comprising the configuration parameters. In an example, the wireless device may receive broadcast system information comprising the time alignment timer. In an example, the wireless device may receive paging information comprising a time alignment timer value for the time alignment timer.

In an example, the starting the random access process may be based on a periodicity parameter.

In an example, the wireless device may receive configuration parameters comprising/indicating the periodicity parameter.

In an example, the cause information element may further indicate that the cause for RRC resume request is not for resuming a suspended RRC connection.

In an example, the transmitting the uplink data may be via a configured/pre-configured resource.

In an example embodiment, a wireless device in a radio resource control (RRC) inactive state, may transmit a random access preamble indicating that: the wireless device is requesting a timing advance value; and the wireless device is not requesting resumption of a suspended RRC connection. The wireless device may receive a random access response comprising the timing advance value. In an example, the wireless device may receive a message (e.g., Msg B in a two-step random access process) comprising the timing advance value. The wireless device may transmit a packet based on the timing advance value.

In an example, the wireless device may receive configuration parameters indicating one or more random access preambles, comprising the random access preamble, indicating that: the wireless device is requesting a timing advance value; and the wireless device is not requesting resumption of a suspended RRC connection.

In an example, the transmitting random access preamble may be based on an expiry of a timing alignment timer. In an example, the wireless device may receive configuration parameters comprising a time alignment timer value for the time alignment timer. In an example, the wireless device may receive an RRC release message comprising the configuration parameters. In an example, the wireless device may receive broadcast system information comprising a time alignment timer value for the time alignment timer. In an example, the wireless device may receive paging information comprising a time alignment timer value for the time alignment timer.

In an example, the transmitting the random access preamble may be based on a periodicity parameter. In an example, the wireless device may receive receiving parameters comprising/indicating the periodicity parameter.

In an example, the transmitting the packet may be via a configured/pre-configured resource.

In an example, the random access response may comprise an uplink grant. A size of the uplink grant may be based on the random access preamble indicating that the wireless device is not requesting resumption of a suspended RRC connection.

In an example embodiment, a wireless device, in a radio resource control (RRC) inactive state, may transmit a random access preamble indicating whether the wireless device is requesting resumption of a suspended RRC connection or not. In an example, a wireless device, in a radio resource control (RRC) inactive state, may transmit a random access preamble indicating whether the wireless device is requesting an uplink grant for transmitting UL-CCCH or requesting an uplink for data transmission without UL-CCCH. The wireless device may receive a random access response comprising an uplink grant, wherein a size of the uplink grant is based on the random access preamble. The wireless device may transmit a packet based on the uplink grant.

In an example embodiment, a wireless device in a radio resource control (RRC) inactive state, may transmit a random access preamble indicating that the wireless device is requesting an uplink grant for transmitting UL-CCCH. The wireless device may receive a random access response comprising an uplink grant, wherein the uplink grant is useful for transmission of UL-CCCH. The wireless device may transmit a packet, comprising data form UL-CCCH, based on the uplink grant.

In an example embodiment, a wireless device may receive a plurality of timing advance values via a control channel. In an example, the wireless device may receive downlink control information comprising a plurality of timing advance values. The wireless device may determine a first timing advance value in the plurality of timing advance values. The wireless device may transmit, while in RRC inactive state, uplink data based on the first timing advance value.

In an example, the receiving the control channel/the downlink control information and the transmitting the uplink data may be while the wireless device is in a radio resource control (RRC) inactive state.

In an example, the determining the first timing advance value, in the plurality of timing advance values, may be based on an index/identifier associated with the wireless device. The wireless device may receive configuration parameters indicating the index/identifier. In an example, the wireless device may receive an RRC release message indicating transitioning of the wireless device from an RRC connected state to an RRC inactive state, wherein the RRC release message may comprise the configuration parameters. In an example, the RRC release message may comprise a suspend config information element comprising the configuration parameters; and the configuration parameters may be for the wireless device operation during the RRC inactive state.

In an example, the wireless device may receive configuration parameters of a control resource set and/or a search space, wherein the receiving the downlink control information/control channel may be via the control resource set and/or the search space. In an example, the wireless device may receive an RRC release message indicating transitioning of the wireless device from an RRC connected state to an RRC inactive state, wherein the RRC release message may comprise the configuration parameters of the control resource set and/or the search space. In an example, the RRC release message may comprise an RRC suspend config information element comprising the configuration parameters of the control resource set and/or the search space.

In an example, the wireless device may receive paging information via a paging channel, the paging information indicating configuration parameters of a control resource set and/or a search space, wherein the receiving the downlink control information and/or the control channel may be is via the control resource set and/or the search space.

In an example, the wireless device may receive broadcast system information indicating configuration parameters of a control resource set and/or search space, wherein the receiving the downlink control information and/or the control channel may be via the control resource set and/or the search space. In an example, the broadcast system information may be received via a master information block (MIB). In an example, the broadcast system information may be received via a system information block (SIB). In an example, the SIB may be a SIB 1.

In an example, a search space for receiving the downlink control information and/or the control channel may be a common search space.

In an example, the downlink control information/control channel may be associated with a first wireless device identifier/RNTI. The wireless device may receive configuration parameters comprising/indicating the wireless device identifier/RNTI. In an example, the wireless device may receive an RRC release message comprising a suspend config information element. The suspend config information element may comprise the configuration parameters. The configuration parameters may be for the wireless device operation during the RRC inactive state.

In an example embodiment, a wireless device, in a radio resource control (RRC) inactive state, may receive paging information via a paging channel, the paging information indicating scheduling information for receiving a timing advance value. The wireless device may receive the timing advance value based on the scheduling information. The wireless device may transmit a packet based on the timing advance value.

In an example, the scheduling information may indicate radio resources and/or a downlink assignment for receiving a downlink packet. The downlink packet may comprise the timing advance value. In an example, the downlink packet may comprise a MAC control element indicating the timing advance value.

In an example, the scheduling information may indicate a control resource set and/or search space for receiving a downlink assignment of a downlink packet. The downlink packet may comprise the timing advance value. In an example, the wireless device may receive the downlink packet based on the downlink assignment. In an example, the downlink packet may comprise a MAC control element indicating the timing advance value.

In an example, the paging information may comprise a field indicating the scheduling information.

In an example, the paging information may comprise a field indicating a wireless device identifier/RNTI. In an example, the wireless device may receive configuration parameters comprising the wireless device identifier/RNTI.

In an example, the wireless device may receive an RRC release message comprising a suspend config information element. The suspend config information element may comprise configuration parameters. The configuration parameters may be for the wireless device operation in the RRC inactive state.

In an example, the paging information may comprise a paging record comprising a wireless device identifier/RNTI. The paging record may indicate the scheduling information for the wireless device.

In an example, the receiving the paging information via the paging channel may be in a paging occasion. In an example, the paging occasion may be based on a periodicity. In an example, the wireless device may receive configuration parameters indicating the periodicity.

In an example, the wireless device may receive an RRC release message comprising the configuration parameters. In an example, a suspend config in an RRC release message may comprise the configuration parameters.

In an example embodiment, a wireless device, in a radio resource control (RRC) inactive state, may receive paging information via a paging channel, the paging information indicating a timing advance value for the wireless device. The wireless device may transmit a packet via a configured grant resource and based on the timing advance value.

In an example, the wireless device may receive configuration parameters comprising a wireless device identity/RNTI, wherein: the paging information comprises a paging record comprising the wireless device identity/RNTI; and the paging record comprises/indicates the timing advance value. In an example, the wireless device may receive an RRC release message comprising the configuration parameters. In an example, the RRC release message may comprise a suspend config information element comprising a parameter indicating the wireless device identity/RNTI. In an example, the wireless device identity may be a full wireless device identity/RNTI. In an example, the wireless device identity may be a short wireless device identity/RNTI.

In an example, the receiving the paging information via the paging channel may be at a paging occasion. In an example, the paging occasion may be based on a periodicity. In an example, the wireless device may receive configuration parameters indicating the periodicity. In an example, the wireless device may receive an RRC release message comprising the configuration parameters. In an example, a suspend config information element in an RRC release message may comprise the configuration parameters.

In an example embodiment, a wireless device, in a radio resource control (RRC) connected state, may receive a first timing advance command MAC CE with a first MAC CE format indicating a first timing advance command. The wireless device may transmit a first uplink packet, in the RRC connected state, based on the first timing advance command. The wireless device may receive, in an RRC inactive state, a second timing advance command MAC CE with a second MAC CE format indicating a second timing advance command. The wireless device may transmit a second uplink packet, in the RRC inactive state, based on the second timing advance.

In an example, the first MAC CE format may comprise a TAG ID field; and the second MAC CE format may not comprise a TAG ID field.

In an example, the first MAC CE format may comprise a TAG ID field; and the second MAC CE format may comprise a field comprising reserved bits. In an example, the reserved bits may be all zeros.

In an example embodiment, a wireless device in a radio resource control (RRC) connected state, may receive configuration parameters of a configured grant configuration, wherein the configuration parameters may be used in the RRC connected state and in an RRC inactive state. The wireless may determine a first resource based on the configured grant configuration parameters. The wireless device may transmit a first packet via the first resource. The wireless device may receive an RRC release message indicating a transition from the RRC connected state to the RRC inactive state. The wireless device may determine a second resource based on the configuration parameters. The wireless device may transmit a second packet via the second resource. The transmitting the first packet may be based on and/or with determining one or more HARQ parameter. The transmitting the second packet may not be based on determining one or more HARQ parameter (e.g., without determining one or more HARQ parameter).

In an example, the configuration parameters may comprise a periodicity parameter. The determining the first resource may be based on the periodicity parameter. The determining the second resource may be based on the periodicity parameter.

In an example, the configuration parameters of the configured grant configuration comprise: first configuration parameters for the RRC connected state; and second configuration parameters for the RRC inactive state. In an example, the determining the first resource may be based on the first configuration parameters; and the determining the second resource may be based on the second configuration parameters.

In an example embodiment, a wireless device, in a radio resource control (RRC) connected state, may receive first configuration parameters of a first configured grant configuration. The wireless device may determine a first resource based on the first configuration parameters. The wireless device may transmit a first packet via the first resource. The wireless device may an RRC release message indicating a transition from the RRC connected state to an RRC inactive state, wherein: the RRC release message may comprise second configuration parameters of a second configured grant configuration; and the second configuration parameters may be for the RRC inactive state. The wireless device may determine a second resource based in the second configuration parameters. The wireless device may transmit a second packet via the second resource. The transmitting the first packet may be based on and/or with determining one or more HARQ parameters. The transmitting the second packet may not be based on determining one or more HARQ parameter (e.g., without determining one or more HARQ parameter).

In an example, the RRC release message may comprise a suspend config information element comprising the second configuration parameters of a second configured grant configuration.

In an example embodiment, a wireless device in a radio resource control (RRC) connected state may receive: first configuration parameters of a first configured grant configuration for the wireless device in the RRC connected state; and second configuration parameters of a second configured grant configuration for the wireless device in an RRC inactive state. The wireless device may determine a first resource based on the first configuration parameters. The wireless device may transmit a first packet via the first resource. The wireless device may receive an RRC release message indicating a transition from the RRC connected state to an RRC inactive state. The wireless device may determine a second resource based in the second configuration parameters. The wireless device may transmit a second packet via the second resource. The transmitting the first packet may be based on and/or with determining one or more HARQ parameters. The transmitting the second packet may not be based on determining one or more HARQ parameter (e.g., without determining one or more HARQ parameter).

In an example, the first configuration parameters may comprise a first periodicity parameter. The determining the first resource may be based on the first periodicity parameter. The second configuration parameters may comprise a second periodicity parameter. The determining the second resource may be based on the second periodicity parameter.

In an example, the one or more HARQ parameters may comprise a HARQ process identifier.

In an example, the one or more HARQ parameters may comprise a new data indicator.

In an example, the one or more HARQ parameters may comprise a redundancy version.

In an example, the wireless device may store the first packet in a HARQ buffer associated with a HARQ process identifier. The wireless device may not store the second packet in a HARQ buffer.

In an example, the RRC release message may comprise a suspend config information element comprising one or more configuration parameters for the RRC inactive state. In an example, the suspend config information element may comprise one or more wireless device identifiers (e.g., one or more radio network temporary identifiers). In an example, the one or more identifiers/RNTIs may comprise a full inactive state RNTI and a short inactive state RNTI. In an example, the transmitting the second packet may be based on an identifier/RNTI of the one or more identifiers/RNTIs.

In an example, the one or more HARQ parameters may comprise a HARQ process identifier. The determining the HARQ process identifier may be based on configured grant configuration parameters.

In an example embodiment, a wireless device may receive first configuration parameters for sounding reference signal (SRS) transmission while in a radio resource control (RRC) connected state; and second configuration parameters for SRS transmission while in an RRC inactive state. The wireless device may transmit one or more first SRS signals based on the first configuration parameters while in the RRC connected state. The wireless device may transmit one or more second SRS signals based on the second configuration parameters while in the RRC inactive state.

In a example, the wireless device may receive an RRC release message indicating transition from the RRC connected state to the RRC inactive state, wherein the RRC release message may comprise the second configuration parameters. In an example, the RRC release message may comprise a suspend config information element comprising the second configuration parameters.

In an example, the first configuration parameters may comprise a first periodicity and/or offset parameter; and the second configuration parameters may comprise a second periodicity and/or offset parameter.

In an example, the first configuration parameters may comprise one or more first parameters indicating first resources for transmitting the one or more first SRS signals. The second configuration parameters may comprise one or more second parameters indicating second resources for transmitting the one or more second SRS signals.

In an example, the first configuration parameters may comprise one or more first power control parameters for power calculation of the one or more first SRS signals. The second configuration parameters comprise one or more second power control parameters for power calculation of the one or more second SRS signals.

In an example, the first configuration parameters may comprise one or more first frequency hopping parameters. The second configuration parameters may comprise one or more second frequency hopping parameters.

In an example embodiment, a wireless device in a radio resource control (RRC) inactive state, may transmit a first packet based on a random access process and using a first multiplexing process. The wireless device, in the RRC inactive state, may transmit a second packet based on a configured grant/preconfigured resource and using on a second multiplexing process. The first multiplexing process may include one or more logical channels in the first packet. The second multiplexing process may exclude the one or more logical channels in the second packet.

In an example, the one or more logical channels comprise a common control channel (CCCH) logical channel. In an example, the CCCH logical channel may be for transmission of one or more RRC messages. In an example, the CCCH logical channel may correspond to one or more signaling radio bearers.

In an example, the wireless device may receive a random access response comprising an uplink grant in a four-step random access process, wherein the transmitting the first packet may be based on the uplink grant.

In an example, the transmitting the first packet may be based on a Msg A in a two-step random access process.

In an example, the wireless device may receive configured grant/pre-configured resource configuration parameters, wherein the configured grant/preconfigured resource may be based on the configured grant/preconfigured resource configuration parameters. In an example, the wireless device may receive an RRC release message comprising the configured grant/preconfigured resource configuration parameters. In an example, the RRC release message may comprise a suspend config information element comprising the configured grant/preconfigured resource configuration parameters.

In an example, the first multiplexing process may comprise a first logical channel selection process selecting one or more first logical channels comprising the one or more logical channels. In an example, the first multiplexing process may comprise a first logical channel selection process selecting one or more first logical channels without excluding the one or more logical channels. The second multiplexing process may comprise a second logical channel selection process selecting one or more second logical channels not comprising the one or more logical channels. The second multiplexing process may comprise a second logical channel selection process selecting one or more second logical channels excluding the one or more logical channels.

In an example embodiment, a wireless device may receive configuration parameters of a logical channel, the configuration parameters comprising a first parameter indicating that the logical channel is allowed to be transmitted via a resource in a radio resource control (RRC) inactive state. The wireless device may transmit a packet, comprising data of the logical channel, via a resource while the wireless device is in an RRC inactive state.

In an example, the resource may be a periodic resource. In an example, the resource may be a pre-configured resource. In an example, the resource may be a configured grant resource. In an example, the configured grant resource may be a configured grant Type 1 resource.

In an example, the configuration parameters may further comprise a second parameter indicating that the logical channel is allowed to be transmitted via a configured grant resource in an RRC connected state. In an example, the configured resource may be a configured grant type 1 resource.

In an example, the wireless device may multiplex one or more logical channel, comprising the logical channel, for transmission via the resource.

In an example, the wireless device may determine that the logical channel is allowed to be transmitted via the resource based on the first parameter.

In an example embodiment, a wireless device may receive configuration parameters of a configured grant configuration, the configuration parameters comprising: one or more first configuration parameters for a radio resource control (RRC) connected state; and one or more second configuration parameters for an RRC inactive state. The wireless device may transmit a first packet based on the one or more first configuration parameters while the wireless device is in an RRC connected state. The wireless device may transmit a second packet based on the one or more second configuration parameters while the wireless device is in an RRC inactive state.

In an example, the configuration parameters of the configured grant configuration may comprise a first information element comprising the one or more first configuration parameters and a second information element comprising the second configuration parameters.

In an example, the first configuration parameters may indicate a number of HARQ processes. The second configuration parameters may not indicate a number of HARQ processes.

In an example, the first configuration parameters comprise a first periodicity parameter. The second configuration parameters may comprise a second periodicity parameter.

In an example, the first configuration parameters may comprise a first wireless device identifier/RNRI. The second configuration parameters may comprise a second wireless device identifier/RNTI.

In an example, the first configuration parameters may comprise a first repetition parameter. The second configuration parameters may comprise a second repetition parameter.

In an example, the first configuration parameters may comprise a repetition parameter. The second configuration parameters may not comprise a repetition parameter.

In an example, the first configuration parameters may comprise a first power control parameter. The second configuration parameters may comprise a second power control parameter.

In an example embodiment, a wireless device may receive first configuration parameters of a downlink semi-persistent scheduling (SPS) configuration for receiving timing advance values for uplink transmissions during a radio resource control (RRC) inactive state; and second configuration parameters of a configured grant configuration for transmitting uplink data packets during an RRC inactive state. The wireless device may receive a timing advance value based on the first configuration parameters. The wireless device may transmit an uplink data packet based on the timing advance value and based on the second configuration parameters.

In an example, the wireless device may receive an RRC release message comprising at least one of the first configuration parameters and the second configuration parameters. In an example, the RRC release message may comprise a suspend config information element comprising the first configuration parameters and the second configuration parameters.

In an example, the wireless device may activate a plurality of resources for receiving the timing advance values based on the receiving the first configuration parameters. The wireless device may activate a plurality of resources, without receiving a physical layer activation, for receiving the timing advance values based on the receiving the first configuration parameters.

In an example, the timing advance value may be received via a downlink packet. In an example, the downlink packet may comprise a MAC CE comprising the timing advance value.

In an example, the first configuration parameters may indicate a first periodicity. The first configuration parameters may indicate a plurality of downlink assignments based on the first periodicity. The time advance values may be received via the plurality of downlink assignments.

In an example, the second configuration parameters may indicate a second periodicity. The second configuration parameters may indicate a plurality of configured grant/preconfigured resources for transmission of uplink data packets.

In an example embodiment, a wireless device may receive configuration parameters comprising a periodicity parameter for obtaining timing advance values. The wireless device may transmit random access preambles in a radio resource control (RRC) inactive state and based on the periodicity parameter. The wireless device may receive the timing advance values based on the transmitting the random access preambles. The wireless device may transmit uplink packets based on the timing advance values.

In an example embodiment, a wireless device in a radio resource control (RRC) connected state, may transmit a first packet based on a first uplink grant and using a first multiplexing process. The wireless device may transmit, in an RRC inactive state, a second packet based on a second uplink grant and using on a second multiplexing process. The first multiplexing process may include one or more MAC CEs in the first packet. The second multiplexing process may exclude the one or more MAC CEs in the second packet.

In an example, the one or more MAC CEs may comprise at least one of BSR and PHR.

In an example embodiment, a wireless device may transmit, in a radio resource control (RRC) connected state, a first packet comprising a first BSR MAC CE. The wireless device may transmit, in an RRC inactive state, a second packet comprising a second BSR MAC CE. The first BSR MAC CE may be based on a first format. The second BSR MAC CE may be based on a second format.

In an example embodiment, a wireless device may transmit, in a radio resource control (RRC) connected state, a first packet comprising a first PHR MAC CE. The wireless device may transmit, in an RRC inactive state, a second packet comprising a second PHR MAC CE. The first PHR MAC CE may be based on a first format. The second PHR MAC CE may be based on a second format.

In an example embodiment, a wireless device may transmit, in a radio resource control (RRC) connected state, a first packet comprising a first BSR MAC CE. The wireless device may transmit, in an RRC inactive state, a second packet comprising a second BSR MAC CE. The first BSR MAC CE may be triggered based on a first trigger in one or more first trigger conditions. The second BSR MAC CE may be triggered based on a second trigger in one or more second trigger conditions.

In an example embodiment, a wireless device may transmit, in a radio resource control (RRC) connected state, a first packet comprising a first PHR MAC CE. The wireless device may transmit, in an RRC inactive state, a second packet comprising a second PHR MAC CE. The first PHR MAC CE may be triggered based on a first trigger in one or more first trigger conditions. The second PHR MAC CE may be triggered based on a second trigger in one or more second trigger conditions.

A wireless device in an RRC inactive state may have to resume the connection (e.g., move to an RRC connected state) for DL (e.g., mobile terminate (MT)) and UL (e.g., mobile originated (MO)) data. Connection setup and subsequently release to the RRC inactive state may occur for each data transmission even for small and infrequent data packets. This may result in unnecessary power consumption and signaling overhead. Existing solutions for small data transmission during the RRC inactive state may be inefficient and may lead to degraded wireless device and wireless network performance. Example embodiments enhance wireless device and wireless network performance during the RRC inactive state.

Figure 47:
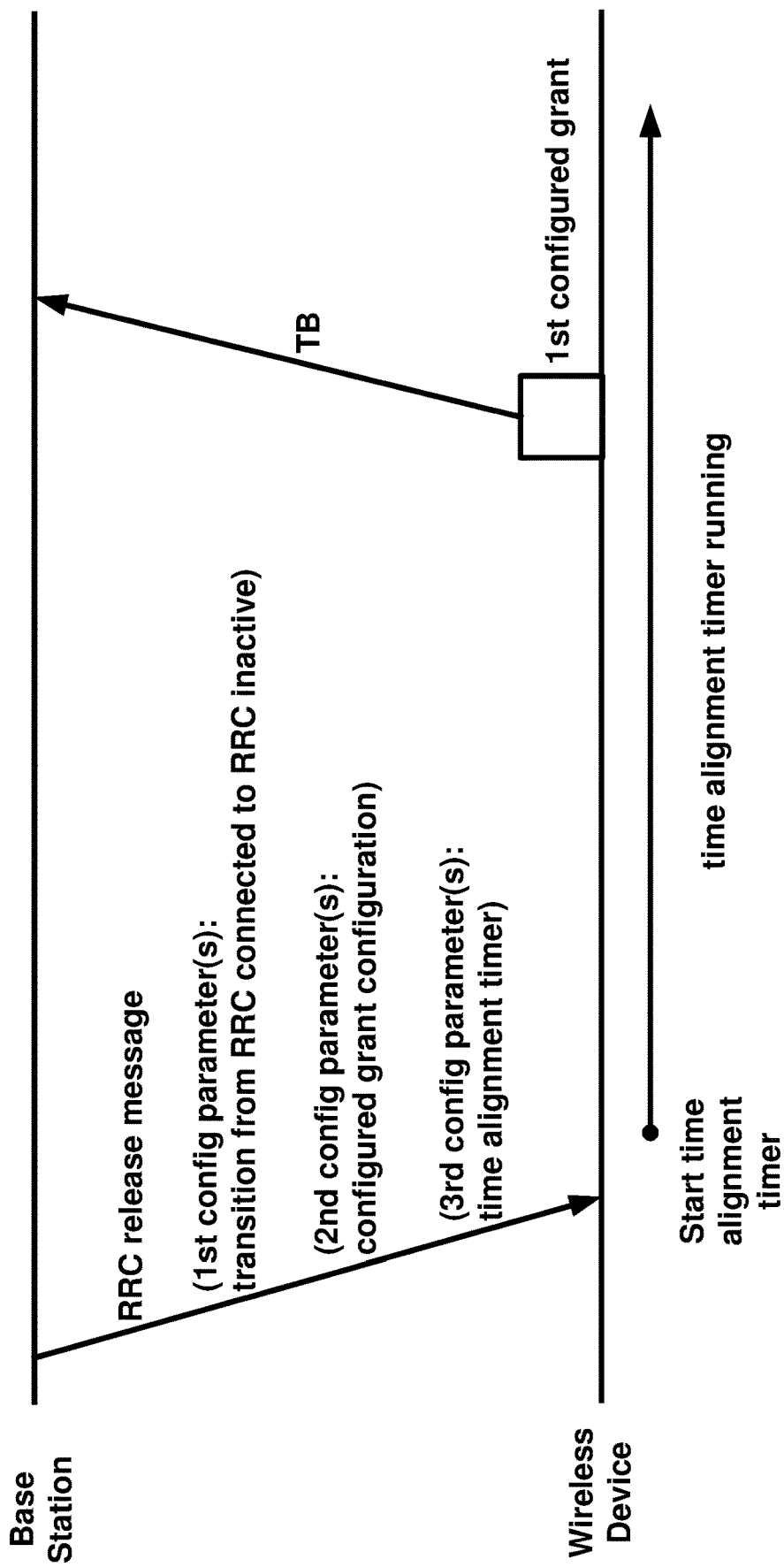
FIG. 47 shows an example data transmission process in inactive state in accordance with several of various embodiments of the present disclosure.

In an example embodiment as shown in FIG. 47, a wireless device be in an RRC connected state. The wireless device may have an RRC connection with a base station. The wireless device may be served by one or more cells provided by one or more base stations. The wireless device may receive an RRC release message. The RRC release message may indicate transitioning of the wireless device to an RRC Inactive state. For example, the RRC release message may comprise a suspend config IE comprising one or more first configuration parameters indicating transitioning of the wireless device from the RRC connected state to the RRC inactive state. The one or more first configuration parameters may be used by the wireless device for operation during the RRC inactive state. For example, the one or more first configuration parameters may comprise one or more RNTIs (e.g., a fullI-RNTI and/or a shortI-RNTI) for operation during the RRC inactive state, a ran-PagingCycle parameter indicating a wireless device-specific cycle for RAN-initiated paging, a timer (e.g., t380) indicating a timer that triggers the periodic RNA Update procedure in wireless device, a RAN notification area information parameter, etc. The RRC release message (for example the suspendconfig IE in the RRC release message) may further comprise one or more second configuration parameters of a configured grant configuration. The configured grant configuration may be for transmissions by the wireless device during the RRC inactive state. The configured grant configuration may be a Type 1 configured grant configuration and the wireless device may activate a plurality of configured grants in response to receiving the RRC release message and based on the one or more second configuration parameters. The wireless device may activate the plurality of configured grants in response to receiving the RRC release message and without receiving an activation DCI. The RRC release message may further comprise one or more third configuration parameters of a time alignment timer. The one or more third configuration parameters may indicate a time alignment timer value of the time alignment timer. The wireless device may use the time alignment timer and may determine whether the uplink of the wireless device is time-aligned or not, during the RRC inactive state, based on the time alignment timer running or not running. For example, the wireless device may release the configured grant configuration and/or deactivate configured grants associated with the configured grant configuration in response to the time alignment timer not running. In an example, the suspend config IE of the RRC release message may comprise the one or more first configuration parameters, the one or more second configuration parameters and the one or more third configuration parameters.

In response to receiving the RRC release message, the wireless device may start the time alignment timer. The wireless device may start the time alignment timer based on the one or more third configuration parameters, included in the RRC release message, in response to receiving the RRC release message. The wireless device may start the time alignment timer in response to receiving the RRC release message and the RRC release message comprising the one or more third configuration parameters of the time alignment timer. For example, the one or more third configuration parameters may comprise a time alignment timer value and the wireless device may start the time alignment timer with the time alignment timer value. In an example, the wireless device may determine a first timing, after the reception timing of the RRC release message, to start the time alignment timer. The wireless device may start the time alignment timer in the first timing, wherein the first timing may be based on a reference timing. For example, the reference timing may be based on a system frame number (SFN) (e.g., SFN 0). For example, the first timing may be an offset (e.g., in a first number of symbols/slots) to the reference timing. In an example, the RRC release message (e.g., the suspend config IE in the RRC release message) may comprise a parameter indicating the offset (e.g., indicating the number of symbols/slots).

While in the RRC inactive state and based on the time alignment timer, associated with the inactive state, running, the wireless device may transmit a transport block based on a first configured grant associated with the configured grant configuration. The wireless device may determine radio resources of the configured grant based on the configuration parameters and may transmit the transport block via the determined radio resources. The wireless device may multiplex one or more logical channels in the transport block based on a multiplexing/logical channel prioritization procedure. The wireless device may select the one or more logical channels for multiplexing in the transport block based on the one or more logical channels being configured for/allowed for transmission in the RRC inactive state. For example, the wireless device may receive configuration parameters of the one or more logical channels indicating that the one or more logical channels are allowed/configured for transmission during the RRC inactive state. For example, the configuration parameters of the one or more logical channels may indicate that the one or more logical channels are allowed/configured for transmission during the RRC inactive state and based configured grants.

The wireless device may transmit the transport block based on a timing advance value. In an example, the wireless device may determine the timing advance associated with the transport block based on a parameter in in the RRC release message. For example, the RRC release message may comprise a parameter indicating a timing advance value and uplink transmissions (e.g., transmissions based on configured grants) during the RRC inactive state, while the time alignment timer is running, may be based on the timing advance value.

In an example, the wireless device may determine the timing advance value as timing advance value used by the wireless device on or before reception of the RRC release message. The wireless device may start the time alignment timer value in response to receiving the RRC release message and may perform uplink transmissions (e.g., uplink transmissions based on configured grants) based on the timing advance value and while the time alignment timer is running.

While in the RRC inactive state, the wireless device may receive a timing advance command (e.g., via a RAR message in a random access process or based on a timing advance MAC CE or based on an RRC message (e.g., a parameter in an RRC release message may indicate the timing advance)). The timing advance command may indicate a timing advance value. The wireless device may start the time alignment timer in response to receiving the timing advance command. The wireless device may start the time alignment timer with the time alignment timer value (e.g., the time alignment timer value indicated by the one or more third configuration parameters included in the RRC release message). The wireless device may transmit a second transport block, e.g., based on a second configured grant, and based on the timing advance value indicated by the timing advance command.

Figure 48:
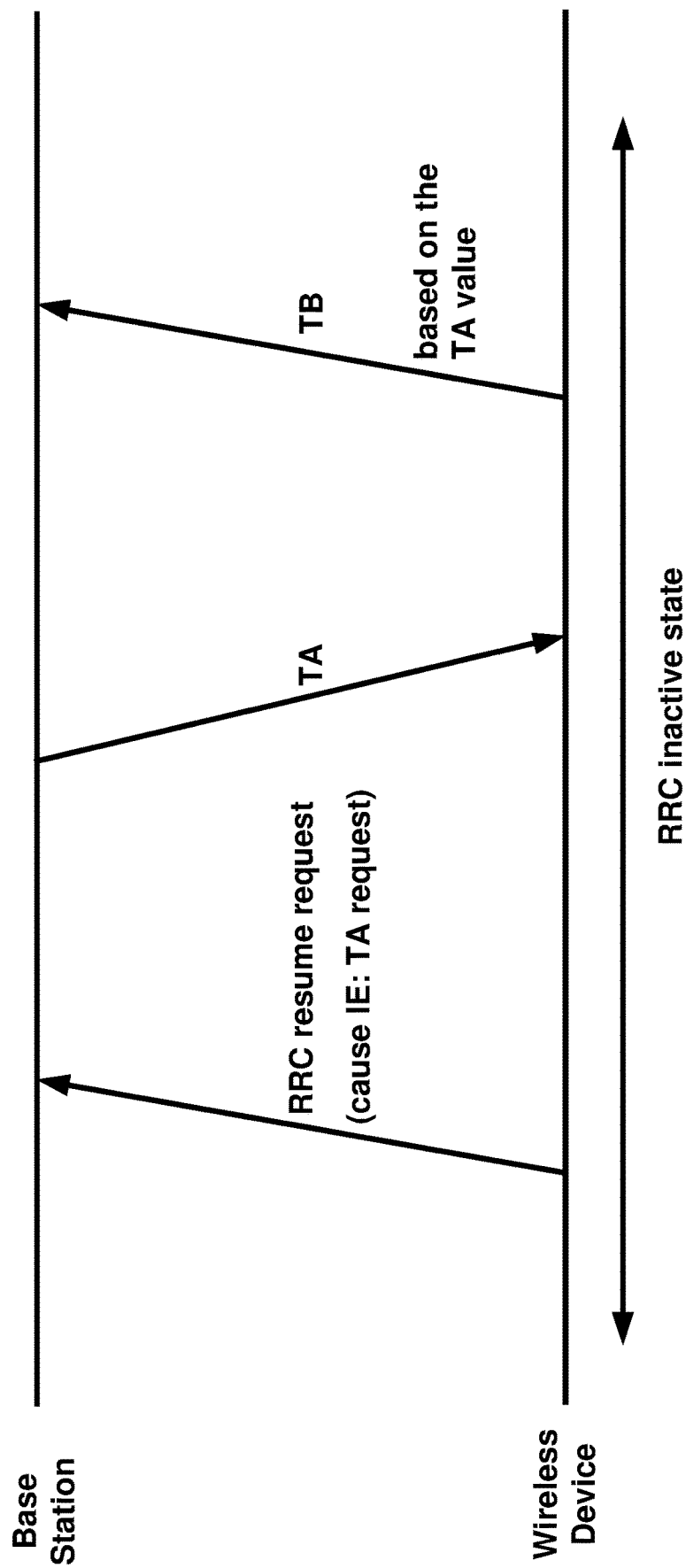
FIG. 48 shows an example data transmission process in inactive state in accordance with several of various embodiments of the present disclosure.

In an example embodiment as shown in FIG. 48, a wireless device may be in an RRC inactive state. The wireless device may transition from an RRC connected state to the RRC inactive state in response to receiving an RRC release message. For example, the RRC release message may comprise a suspend config IE comprising configuration parameters for wireless device operation during the RRC inactive state. In an example, the wireless device may perform uplink transmissions during the RRC inactive state based on a time alignment timer, associated with the RRC inactive state, running. For example, the RRC release message may comprise configuration parameters of the time alignment timer indicating a time alignment timer value for the time alignment timer and the wireless device may start the time alignment timer with the time alignment timer value in response to receiving the RRC release message. In an example, the time alignment timer may expire. The wireless device may transmit a resume request message comprising a cause IE, wherein a value of the cause IE may indicate a timing advance request. For example, the cause IE may indicate that the cause of the resume request message is for obtaining/receiving the timing advance value and not for resuming the RRC connection. For example, the wireless device may transmit the resume request message based on a random access message of a random access process. For example, the wireless device may transmit the resume request message based on a Msg 3 of four-step random access process or a Msg A of a two-step random access process. In an example, the wireless device may transmit the resume request message in response to the time alignment timer expiring. The wireless device may receive a timing advance value in response to transmitting the resume request message. For example, the wireless device may receive the timing advance value in a Msg 2 (e.g., RAR) of the four-step random access process or a Msg B of the two-step random access process. For example, the RAR or the Msg B may comprise a field with a value indicating the timing advance value. The wireless device may transmit a transport block based on the timing advance value while in the RRC inactive state. In an example, the wireless device may transmit the transport block based on a configured grant.

Figure 49:
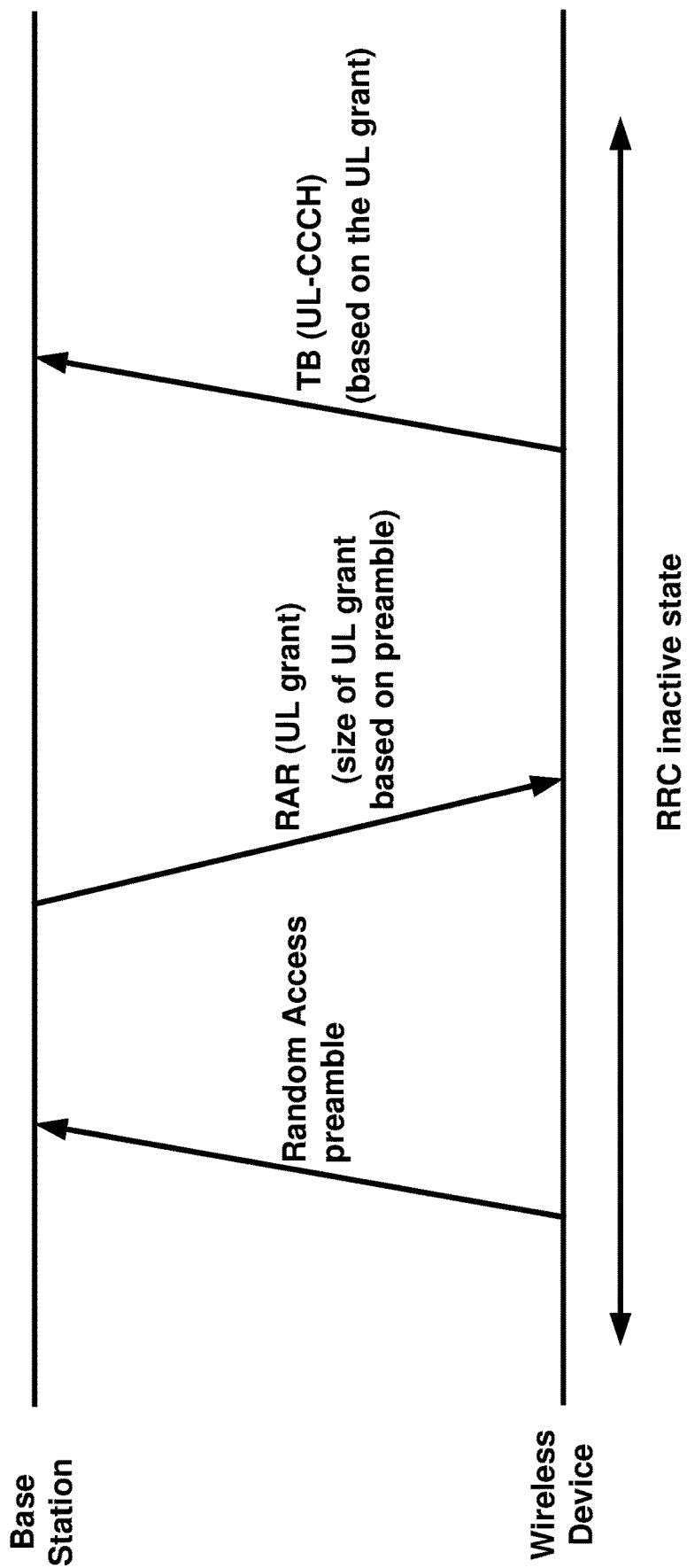
FIG. 49 shows an example data transmission process in inactive state in accordance with several of various embodiments of the present disclosure.

In an example embodiment as shown in FIG. 49, a wireless device may a wireless device may be in an RRC inactive state. The wireless device may transition from an RRC connected state to the RRC inactive state in response to receiving an RRC release message. For example, the RRC release message may comprise a suspend config IE comprising configuration parameters for wireless device operation during the RRC inactive state. The wireless device may perform small data transmissions during the RRC inactive state based on performing random access processes. For example, the wireless device may transmit a random access preamble for small data transmission during the RRC inactive state. The wireless device may select the random access preamble based on a size of an uplink grant requested to be received in a RAR/MsgB in response to transmitting the random access preamble. The wireless device may determine the size of the requested uplink grant based on a size of an uplink common control channel (UL-CCCH) for transmission of an RRC message to be transmitted based on the uplink grant. For example, the wireless device may select the random access preamble from one or more first preambles based on the requested uplink grant size being smaller than or equal to a first size. For example, the wireless device may select the random access preamble from one or more second preambles based on the requested uplink grant size being larger than or equal to the first size. In an example, a plurality of random access preambles may be partitioned to a plurality of sets of random access preambles and each set of random access preamble may be associated with a size of a requested uplink grant. In response to receiving the uplink grant (e.g., in a RAR), the wireless device may transmit a transport block based on the uplink grant. The wireless device may multiplex one or more logical channels comprising an uplink common control channel logical channel in a transport block and may transmit the transport block.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 50:
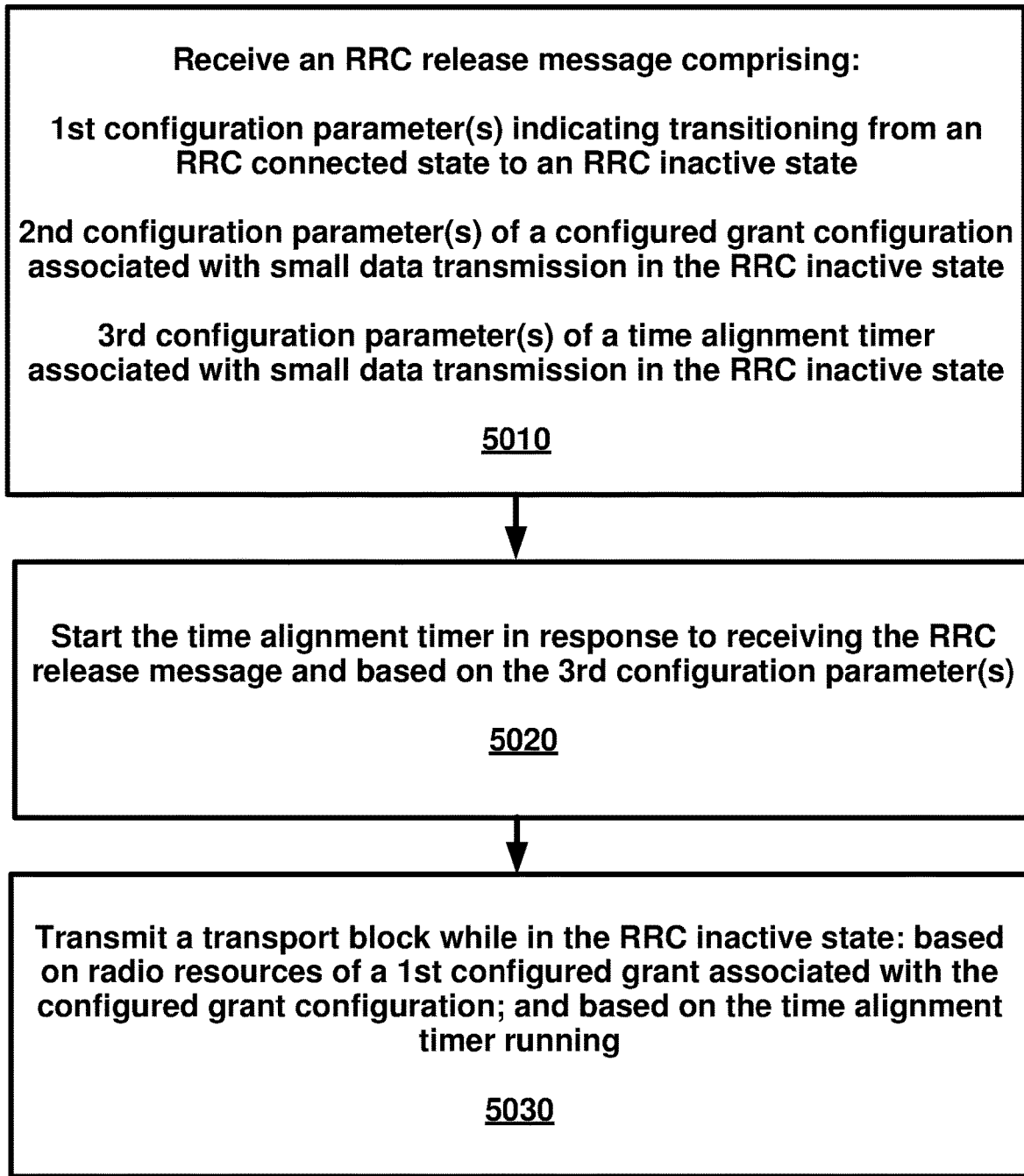
FIG. 50 shows an example flow diagram in accordance with several of various embodiments of the present disclosure.

FIG. 50 shows an example flow diagram in accordance with several of various embodiments of the present disclosure. At 5010, a wireless device may receive a radio resource control (RRC) release message comprising: one or more first configuration parameters indicating transitioning from an RRC connected state to an RRC inactive state; one or more second configuration parameters of a configured grant configuration associated with small data transmission in the RRC inactive state; and one or more third configuration parameters of a time alignment timer associated with small data transmission in the RRC inactive state. At 5020, the wireless device may start the time alignment timer in response to receiving the RRC release message and based on the one or more third configuration parameters. At 5030, the wireless device may transmit a transport block while in the RRC inactive state: based on radio resources of a first configured grant associated with the configured grant configuration; and based on the time alignment timer running.

In an example embodiment, the one or more third configuration parameters, received by the wireless device at 5010, may indicate a time alignment timer value of the time alignment timer. The starting the time alignment timer, at 5020, may be with the time alignment timer value.

In an example embodiment, the transmitting the transport block, at 5030, may further be based on a timing advance value. In an example embodiment, the wireless device may determine the timing advance value. In an example embodiment, the determining the timing advance value may be based on a first timing advance value used by the wireless device before receiving the RRC release message. In an example embodiment, the RRC release message, received at 5010, may comprise a parameter indicating the timing advance value. In an example embodiment, the RRC release message may comprise a suspend config information element comprising the parameter.

In an example embodiment, the wireless device may activate, a plurality of configured grants, comprising the first configured grant, associated with the configured grant configuration in response to receiving the RRC release message, at 5010, and based on the one or more second configuration parameters. In an example embodiment, the activating the plurality of configured grants may be in response to receiving the RRC release message, at 5010, and without reception of an activation downlink control information.

In an example embodiment, the configured grant configuration, for which the one or more second configuration parameters may be received at 5010, may be a type 1 configured grant.

In an example embodiment, the starting the time alignment timer, at 5020, may be based on a reference timing. In an example embodiment, the starting the time alignment timer, at 5020, may be based on an offset to the reference timing. In an example embodiment, the offset may be in a first number of symbols. In an example embodiment, the RRC release message, received at 5010, may comprise a parameter indicating the offset and/or the first number. In an example embodiment, the RRC release message, received at 5010, may comprise a suspend config information element comprising a parameter indicating the offset and/or the first number. In an example embodiment, the reference timing may be based on a system frame number. In an example embodiment, the system frame may be system frame zero.

In an example embodiment, the wireless device may receive a timing advance command indicating a first timing advance. The wireless device may start the time alignment timer based on the receiving the timing advance command. In an example embodiment, the wireless device may transmit a second transport block based on radio resources of a second configured grant and based on the first timing advance.

In an example embodiment, the wireless device may multiplex one or more logical channels in the transport block wherein the one or more logical channels are configured for transmission of small data in the RRC inactive state.

In an example embodiment, the RRC release message, received at 5010, may comprise a suspend config information element comprising the one or more first configuration parameters, the one or more second configuration parameters and the one or more third configuration parameters.

Figure 51:
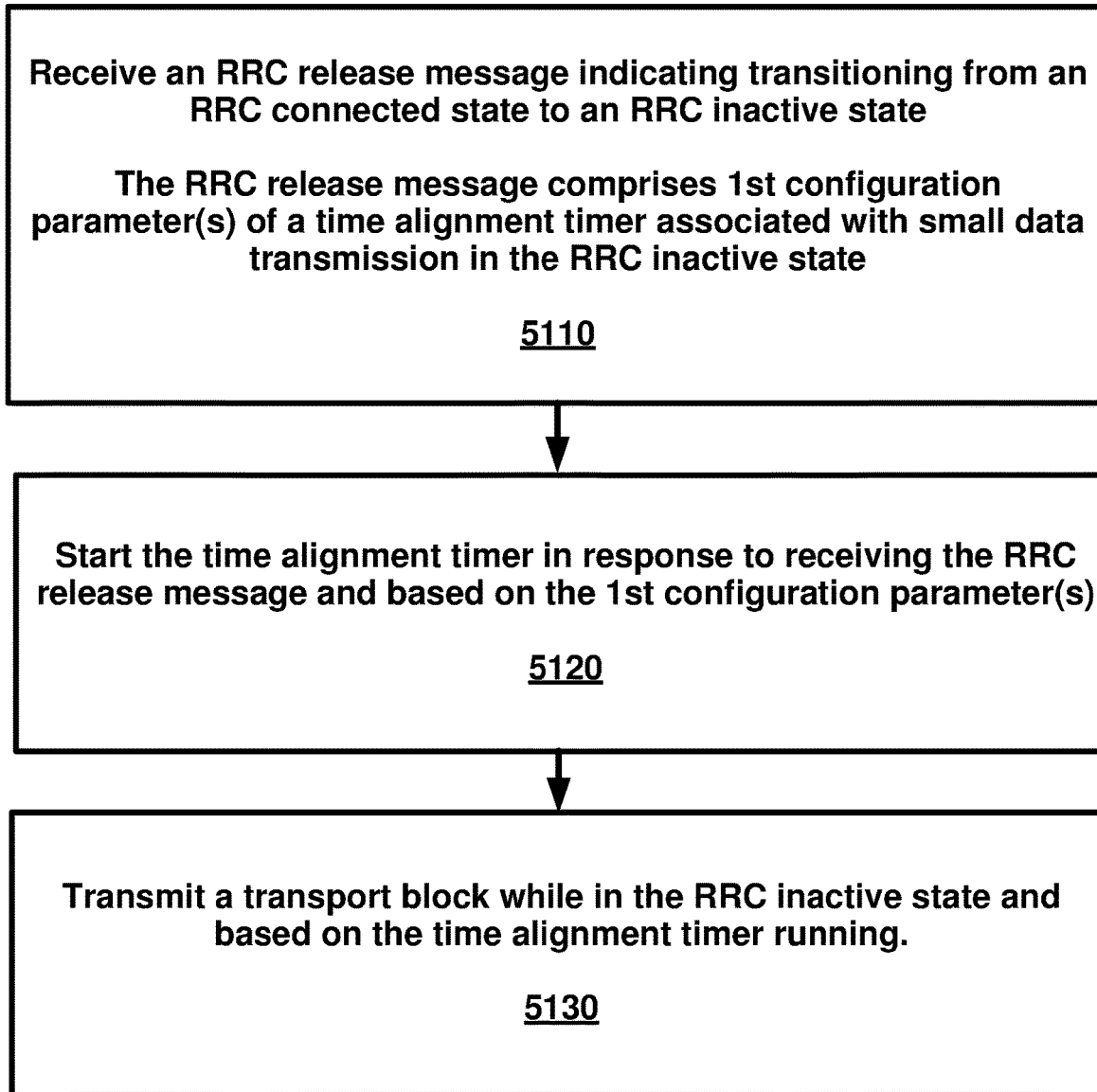
FIG. 51 shows an example flow diagram in accordance with several of various embodiments of the present disclosure.

FIG. 51 shows an example flow diagram in accordance with several of various embodiments of the present disclosure. At 5110, a wireless device may receive a radio resource control (RRC) release message indicating transitioning from an RRC connected state to an RRC inactive state, wherein the RRC release message may comprise one or more first configuration parameters of a time alignment timer associated with small data transmission in the RRC inactive state. At 5120, the wireless device may start the time alignment timer in response to receiving the RRC release message and based on the one or more first configuration parameters. At 5130, the wireless device may transmit a transport block while in the RRC inactive state and based on the time alignment timer running.

In an example embodiment, the RRC release message, received at 5110, may further comprise one or more second configuration parameters of a configured grant configuration, wherein the transmitting the transport block may be based on a configured grant associated with the configured grant configuration.

Figure 52:
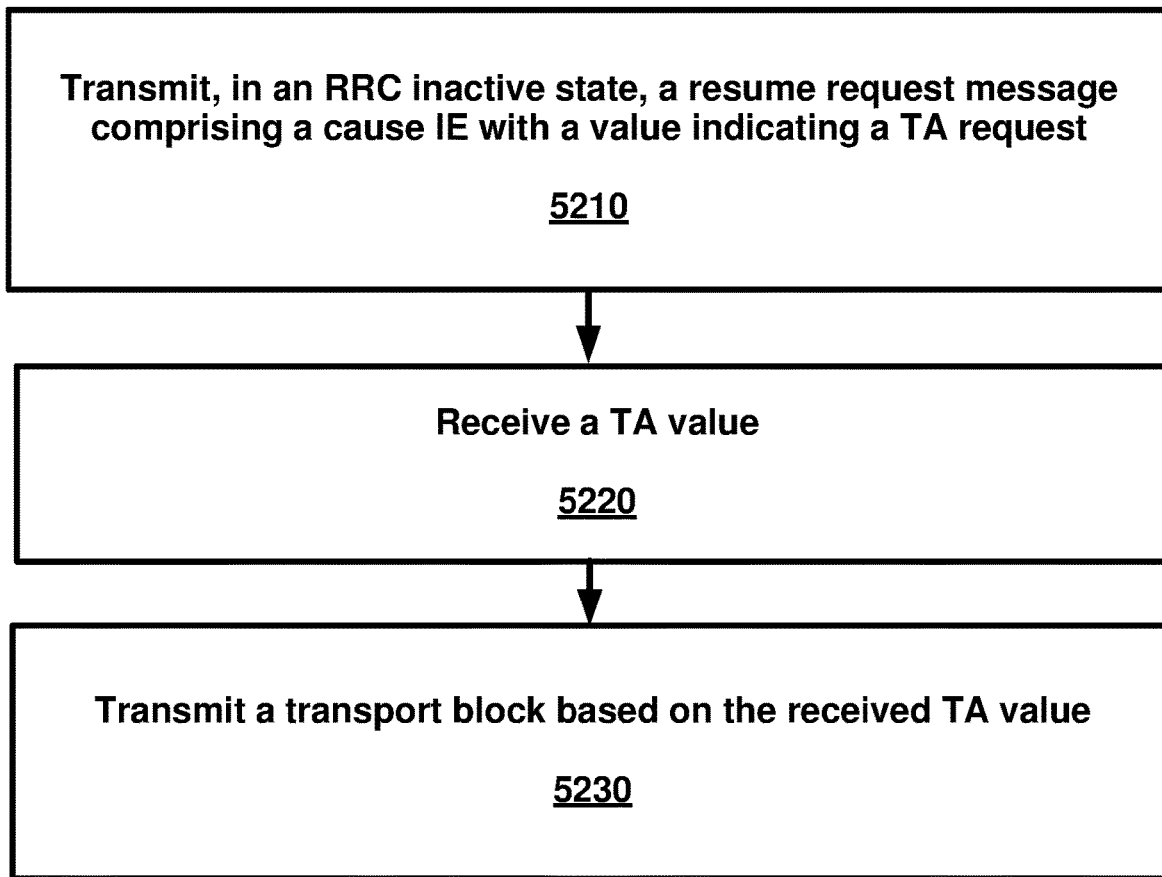
FIG. 52 shows an example flow diagram in accordance with several of various embodiments of the present disclosure.

FIG. 52 shows an example flow diagram in accordance with several of various embodiments of the present disclosure. At 5210, a wireless device may transmit, in a radio resource control (RRC) inactive state, a resume request message comprising a cause information element with a value indicating a timing advance request. At 5220, the wireless device may receive a timing advance value. At 5230, the wireless device may transmit a transport block based on the received timing advance value.

In an example embodiment, the transmitting the resume request message, at 5210, may be based on an expiry of a time alignment timer.

In an example embodiment, the wireless device may receive an RRC release message comprising a parameter indicating a time alignment timer value. The wireless device may start a time alignment timer with the time alignment timer value.

In an example embodiment, the transmitting the resume request message, at 5210, may be based on a random access message of a random access process. In an example embodiment, the random access process may be a four-step random access process. The random access message may be a Message 3 of the four-step random access process. In an example embodiment, the random access process may be a two-step random access process. The random access message may be a Message A of the two-step random access process. In an example embodiment, the random access process may be a four-step random access process. The receiving the timing advance value, at 5220, may be based on a Message 2 (e.g., RAR) of the four-step random access process. In an example embodiment, the random access process may be a two-step random access process. The receiving the timing advance value may be based on a Message B of the two-step random access process. In an example embodiment, a random access response message or the Msg B, of the random access process, may comprise a field indicating the timing advance value.

In an example embodiment, the value of the cause information element, in the resume request message transmitted at 5210, may further indicate that the cause of the RRC resume request is not for resuming a suspended RRC connection.

In an example embodiment, the transmitting the transport block may be while the wireless device is in the RRC inactive state.

Figure 53:
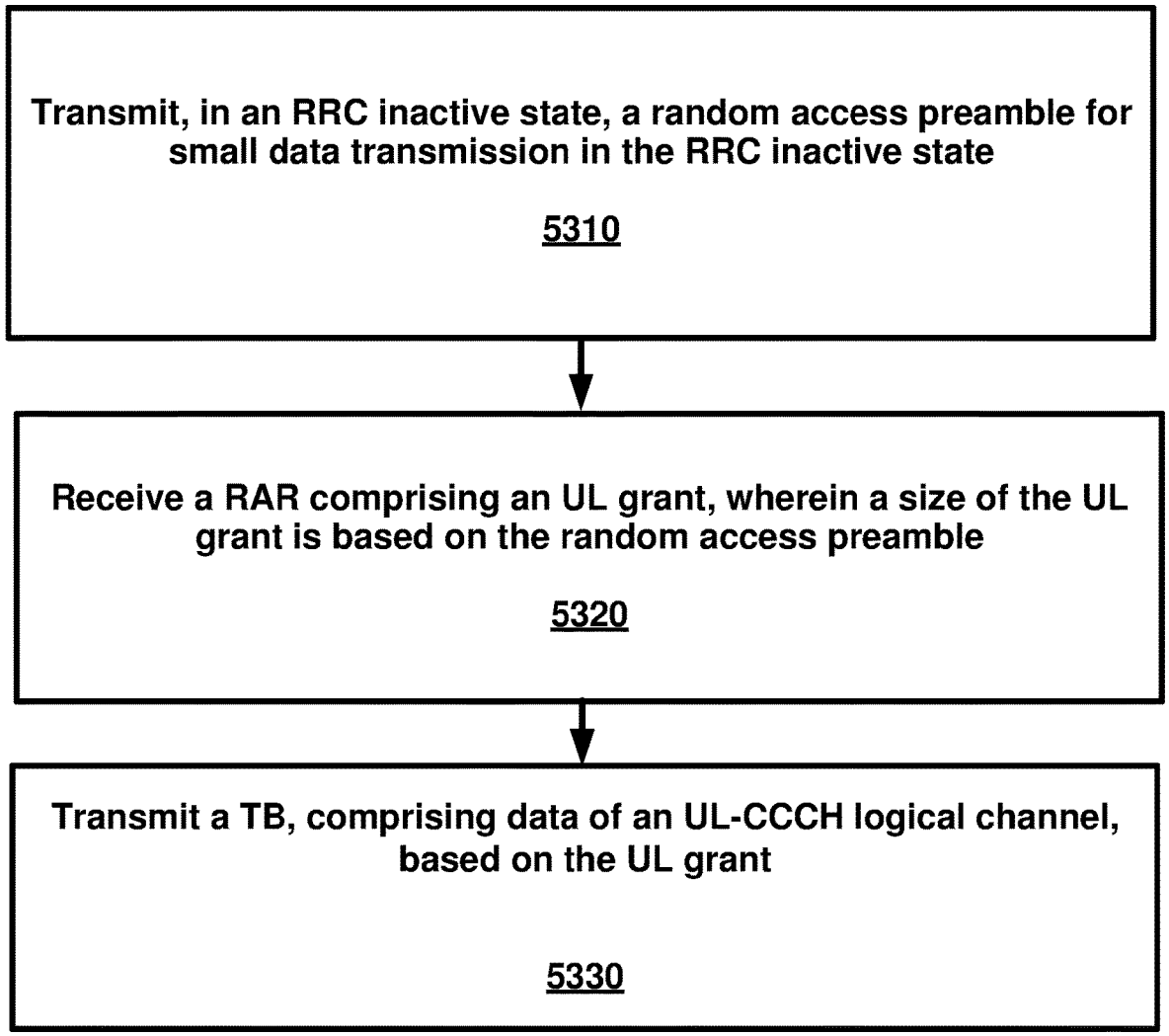
FIG. 53 shows an example flow diagram in accordance with several of various embodiments of the present disclosure.

FIG. 53 shows an example flow diagram in accordance with several of various embodiments of the present disclosure. At 5310, a wireless device may transmit, in a radio resource control (RRC) inactive state, a random access preamble for small data transmission in the RRC inactive state. At 5320, the wireless device may receive a random access response comprising an uplink grant, wherein a size of the uplink grant is based on the random access preamble. At 5330, the wireless device may transmit a transport block, comprising data of an uplink common control channel logical channel, based on the uplink grant.

Figure 54:
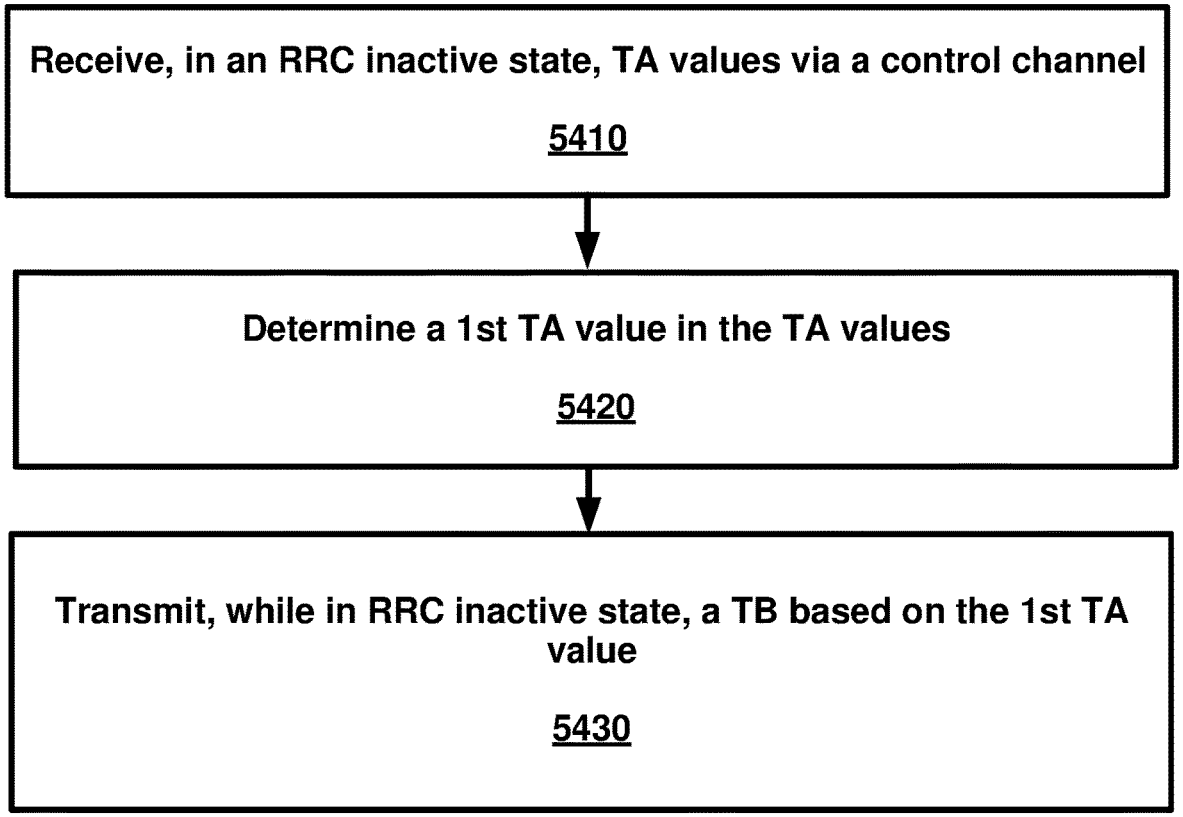
FIG. 54 shows an example flow diagram in accordance with several of various embodiments of the present disclosure.

FIG. 54 shows an example flow diagram in accordance with several of various embodiments of the present disclosure. At 5410, a wireless device may receive, in a radio resource control (RRC) inactive state, a plurality of timing advance values via a control channel. At 5420, the wireless device may determine a first timing advance value in the plurality of timing advance values. At 5430, the wireless device may transmit, while in RRC inactive state, a transport block based on the first timing advance value.

In an example embodiment, the plurality of timing advance values, received at 5410, may be received in a downlink control information.

In an example embodiment, the determining the first timing value in the plurality of timing advance values, at 5420, may based on an index/identifier associated with the wireless device.

FIG. 55 shows an example flow diagram in accordance with several of various embodiments of the present disclosure. At 5510, a wireless device may receive, in a radio resource control (RRC) inactive state, paging information via a paging channel, wherein the paging information is associated with a timing advance value. At 5520, the wireless device may transmit, while in the RRC inactive state, a transport block based on the timing advance value.

In an example embodiment, the paging information, received at 5510, may indicate scheduling information for receiving the timing advance value. In an example embodiment, the wireless device may receive the timing advance value based on the scheduling information.

In an example embodiment, the paging information may indicate the timing advance value.

FIG. 56 shows an example flow diagram in accordance with several of various embodiments of the present disclosure. At 5610, a wireless device, in a radio resource control (RRC) connected state, may receive a first timing advance command medium access control (MAC) control element (CE), with a first MAC CE format, indicating a first timing advance command. At 5620, the wireless device may transmit a first uplink transport block, in the RRC connected state, based on the first timing advance command. At 5630, the wireless device, in an RRC inactive state, may receive a second timing advance command MAC CE, with a second MAC CE format, indicating a second timing advance command. At 5640, the wireless device may transmit a second uplink transport block, in the RRC inactive state, based on the second timing advance command.

Figure 57:
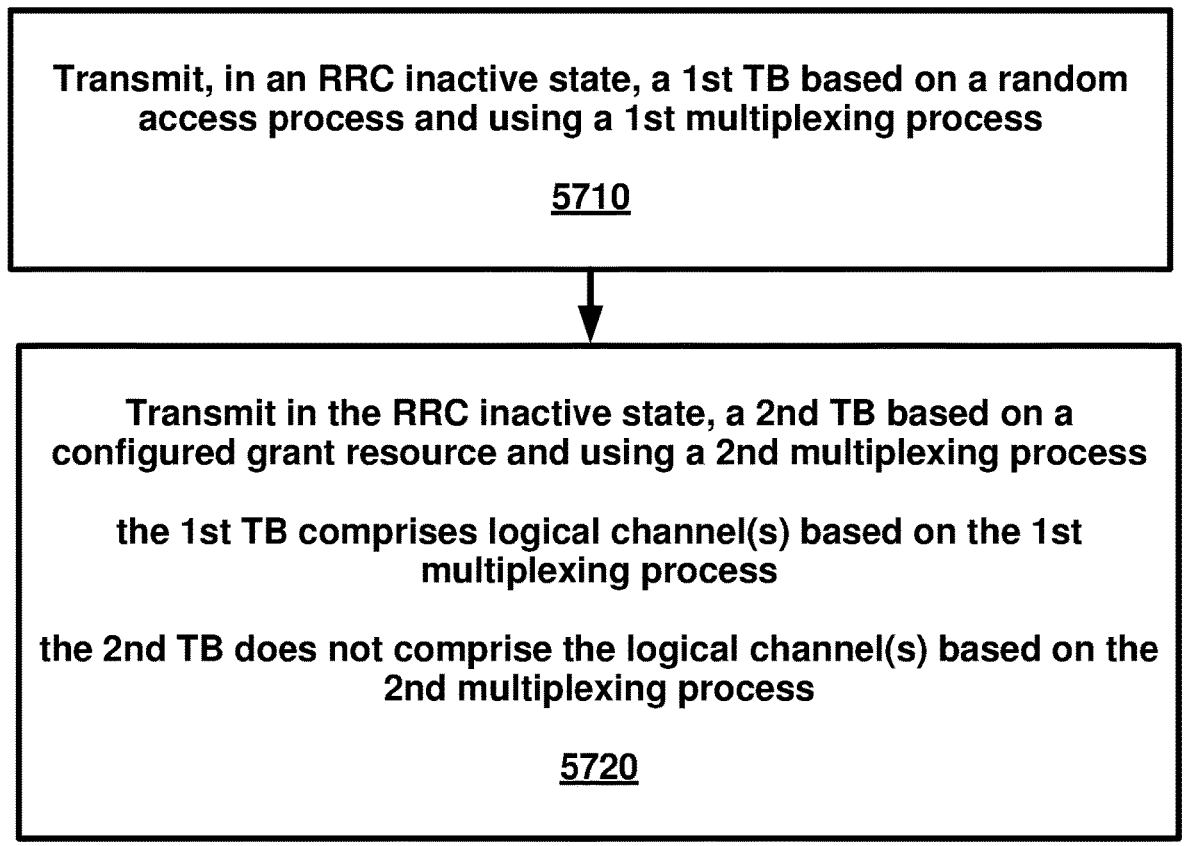
FIG. 57 shows an example flow diagram in accordance with several of various embodiments of the present disclosure.

FIG. 57 shows an example flow diagram in accordance with several of various embodiments of the present disclosure. At 5710, a wireless device, in a radio resource control (RRC) inactive state, may transmit a first transport block based on a random access process and using a first multiplexing process. At 5720, the wireless device, in the RRC inactive state, may transmit a second transport block based on a configured grant resource and using a second multiplexing process. The first transport block may comprise one or more logical channels based on the first multiplexing process. The second transport block may not comprise the one or more logical channels based on the second multiplexing process.

In an example embodiment, the one or more logical channels may be excluded from the second transport block based on the second multiplexing process.

Figure 58:
FIG. 58 shows an example flow diagram in accordance with several of various embodiments of the present disclosure.

FIG. 58 shows an example flow diagram in accordance with several of various embodiments of the present disclosure. At 5810, a wireless device, may receive configuration parameters of a logical channel, the configuration parameters comprising a first parameter indicating that the logical channel is allowed to be transmitted in a radio resource control (RRC) inactive state. At 5820, the wireless device may transmit a transport block, comprising data of the logical channel, while the wireless device is in the RRC inactive state.

Figure 59:
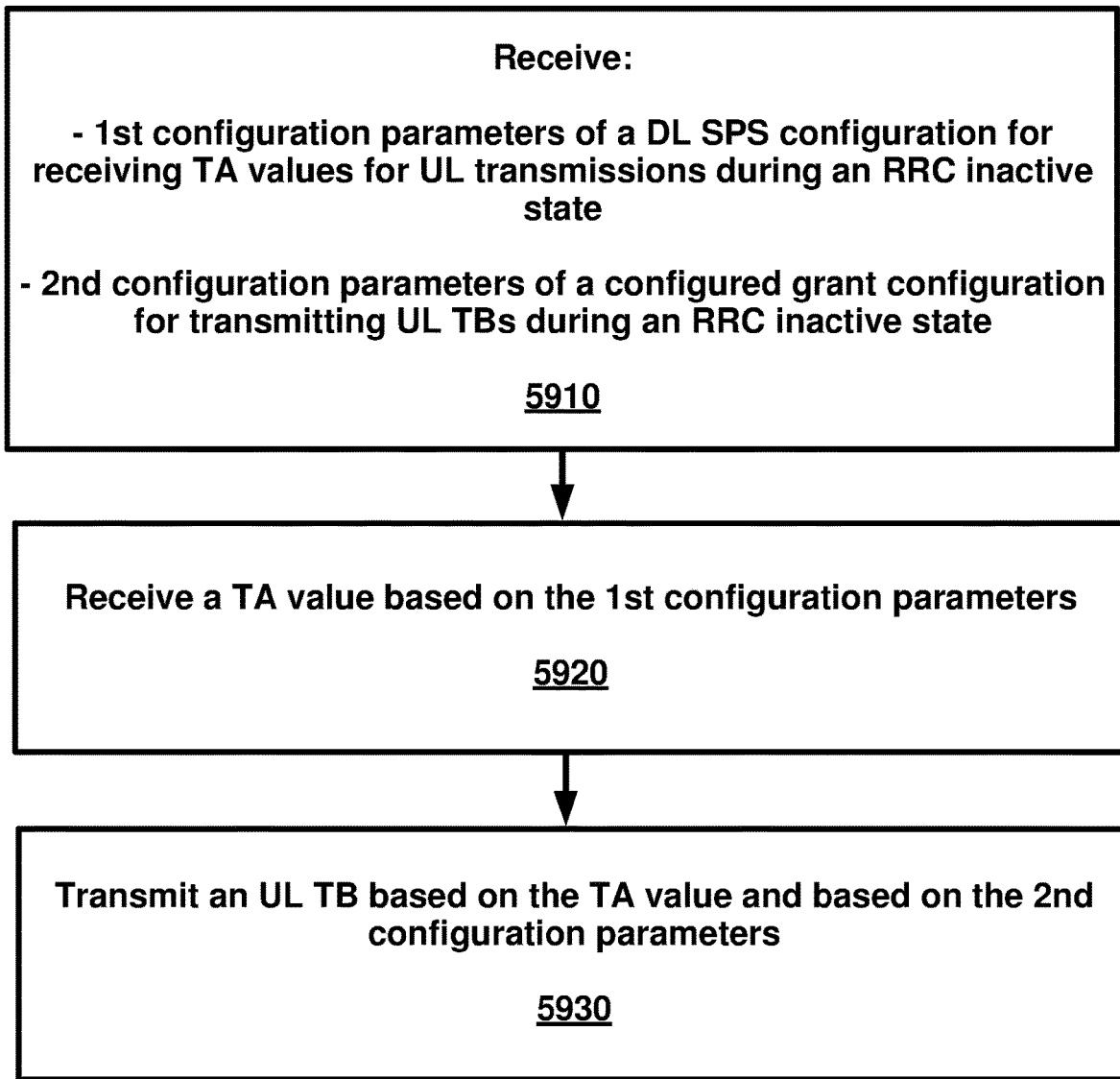
FIG. 59 shows an example flow diagram in accordance with several of various embodiments of the present disclosure.

FIG. 59 shows an example flow diagram in accordance with several of various embodiments of the present disclosure. At 5910, a wireless device may receive first configuration parameters and second configuration parameters. The first configuration parameters may be of a downlink semi-persistent scheduling (SPS) configuration for receiving timing advance values for uplink transmissions during a radio resource control (RRC) inactive state. The second configuration parameters may be of a configured grant configuration for transmitting uplink transport blocks during an RRC inactive state. At 5920, the wireless device may receive a timing advance value based on the first configuration parameters. At 5930, the wireless device may transmit an uplink transport block based on the timing advance value and based on the second configuration parameters.

Figure 60:
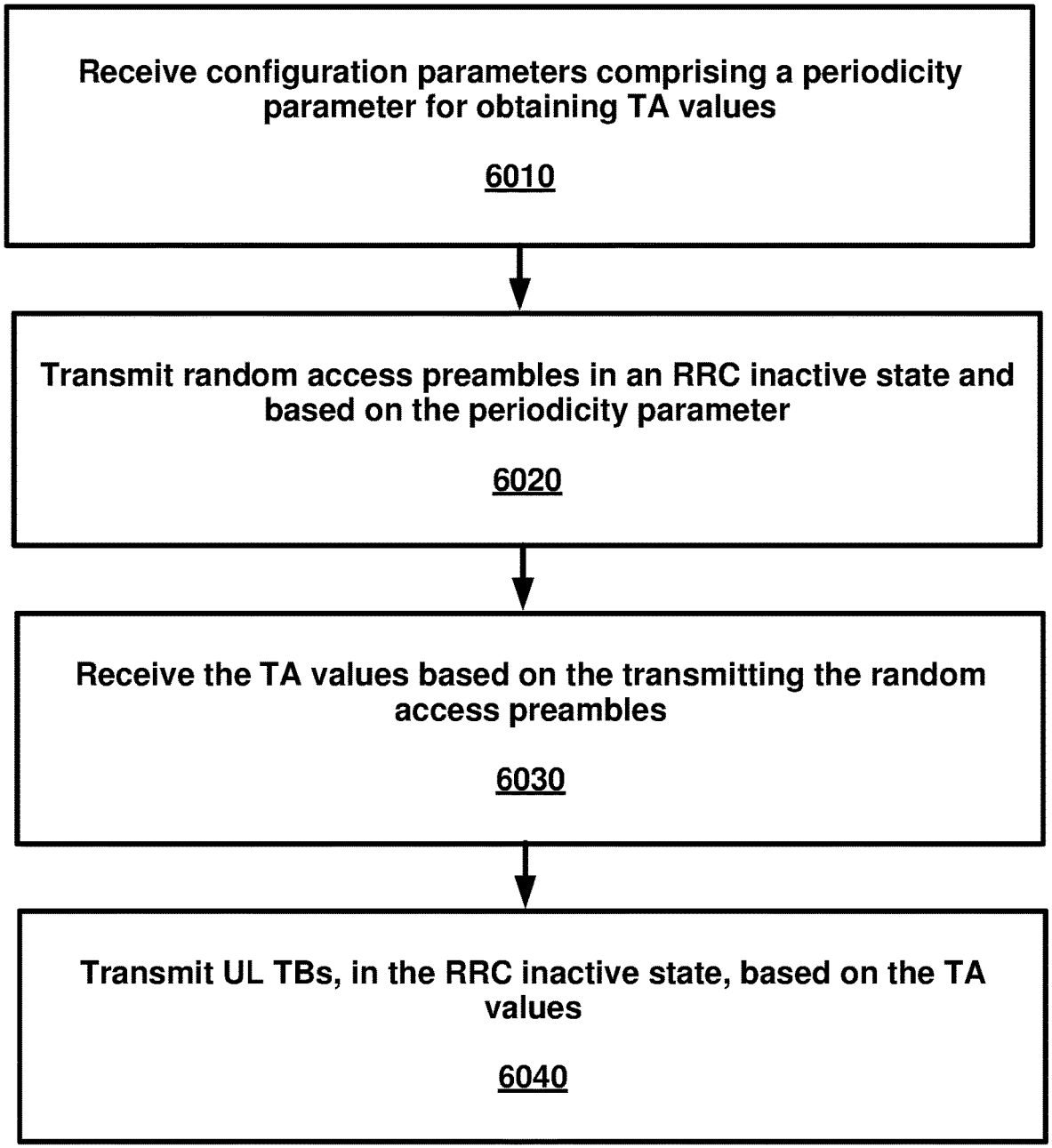
FIG. 60 shows an example flow diagram in accordance with several of various embodiments of the present disclosure.

FIG. 60 shows an example flow diagram in accordance with several of various embodiments of the present disclosure. At 6010, a wireless device may receive configuration parameters comprising a periodicity parameter for obtaining timing advance values. At 6020, the wireless device may transmit random access preambles in a radio resource control (RRC) inactive state and based on the periodicity parameter. At 6030, the wireless device may receive the timing advance values based on the transmitting the random access preambles. At 6040, the wireless device may transmit uplink transport blocks, in the RRC inactive state, based on the timing advance values.

Figure 61:
FIG. 61 shows an example flow diagram in accordance with several of various embodiments of the present disclosure.

FIG. 61 shows an example flow diagram in accordance with several of various embodiments of the present disclosure. At 6110, a wireless device in a radio resource control (RRC) connected state, may transmit a first transport block based on a first uplink grant using a first multiplexing process. At 6120, the wireless device in an RRC inactive state, may transmit a second transport block based on a second uplink grant and using on a second multiplexing process. Based on the first multiplexing process, the first transport block may comprise one or more medium access control (MAC) control elements (CEs). Based on the second multiplexing process, the second transport block may not comprise the one or more MAC CEs.

In an example embodiment, the one or more MAC CEs may be excluded from the second transport block based on the second multiplexing process.

In an example embodiment, the first multiplexing process may be used in the RRC connected state. The second multiplexing process may be used in the RRC inactive state.

FIG. 62 shows an example flow diagram in accordance with several of various embodiments of the present disclosure. At 6210, a wireless device, in a radio resource control (RRC) connected state, may transmit a first transport block comprising a first medium access control (MAC) control element (CE) of a first type. At 6220, the wireless device, in an RRC inactive state, may transmit a second transport block comprising a second MAC CE of the first type. The first MAC CE of the first type maybe of a first format. The second MAC CE of the first type may be of a second format.

In an example embodiment, the first type of MAC CE may be a buffer status report.

In an example embodiment, the first type of MAC CE may be a power headroom report.

In an example embodiment, the first MAC CE of the first type may be of the first format based on transmitting the first MAC CE, at 6210, in the RRC connected state.

In an example embodiment, the second MAC CE of the first type may be of the second format based on transmitting the second MAC CE, at 6220, in the RRC inactive state.

FIG. 63 shows an example flow diagram in accordance with several of various embodiments of the present disclosure. At 6310, a wireless device, in a radio resource control (RRC) connected state, may transmit a first transport block comprising a first medium access control (MAC) control element (CE) of a first type. At 6320, the wireless device, in an RRC inactive state, may transmit a second transport block comprising the second MAC CE of the first type. The first MAC CE of the first type may be triggered based on one or more first trigger conditions. The second MAC CE of the first type may be triggered based on one or more second trigger conditions.

In an example embodiment, the first type of MAC CE may be a buffer status report.

In an example embodiment, the first type of MAC CE may be a power headroom report.

In an example embodiment, the first MAC CE of the first type may be triggered based on the one or more first trigger conditions based on transmitting the first MAC CE, at 6210, in the RRC connected state.

In an example embodiment, the second MAC CE of the first type may be triggered based on the one or more second trigger conditions based on transmitting the second MAC CE, at 6220, in the RRC inactive state.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employ-ing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
    transmitting, by a base station to a wireless device:
        a first configuration parameter indicating whether data of a first logical channel is allowed to be transmitted based on a configured grant of type 1; and
        a second configuration parameters indicating whether data of the first logical channel is allowed to be transmitted based on a configured grant of type 1 while the wireless device is in a radio resource control (RRC) inactive state;
    wherein:
        the type 1 is one of a plurality of configured grant types; and
        the first configuration parameter and the second configuration parameter are specific to configured grants of type 1;
    receiving, from the wireless device while in an RRC connected state, data of the first logical channel based on:
        a first configured grant of type 1; and
        the first configuration parameter indicating that data of the first logical channel is allowed to be transmitted based on a configured grant of type 1; and
    receiving, from the wireless device while in the RRC inactive state, data of the first logical channel based on:
        a second configured grant of type 1; and
        the second configuration parameter indicating that data of the first logical channel is allowed to be transmitted based on a configured grant of type 1 while the wireless device is in the RRC inactive state.

2. The method of claim 1, further comprising transmitting an RRC release message indicating transitioning from the RRC connected state to the RRC inactive state.

3. The method of claim 2, wherein the RRC release message comprises one or more third configuration parameters for uplink data transmission in the RRC inactive state.

4. The method of claim 3, wherein the receiving, from the wireless device while in the RRC inactive state, the data of the first logical channel is based on the one or more third configuration parameters.

5. The method of claim 3, wherein the one or more third configuration parameters indicate a time alignment timer value of a time alignment timer.

6. The method of claim 5, wherein the time alignment timer is started with the time alignment timer value in response to a transitioning from the RRC connected state to the RRC inactive state.

7. The method of claim 5, wherein the receiving, from the wireless device while in the RRC inactive state, the data of the first logical channel is based on the time alignment timer running.

8. The method of claim 3, wherein the one or more third configuration parameters comprise configured grant configuration parameters.

9. The method of claim 8, wherein the second configured grant is based on the configured grant configuration parameters.

10. The method of claim 1, wherein the plurality of configured grant types comprise a type 2.

11. A base station comprising:
one or more processors; and
memory storing instructions that, when executed by the one or more processors, cause the base station to:
 transmit to a wireless device:
  a first configuration parameter indicating whether data of a first logical channel is allowed to be transmitted based on a configured grant of type 1; and
  a second configuration parameters indicating whether data of the first logical channel is allowed to be transmitted based on a configured grant of type 1 while the wireless device is in a radio resource control (RRC) inactive state;
 wherein:
  the type 1 is one of a plurality of configured grant types; and
  the first configuration parameter and the second configuration parameter are specific to configured grants of type 1;
 receive, from the wireless device while in an RRC connected state, data of the first logical channel based on:
  a first configured grant of type 1; and
  the first configuration parameter indicating that data of the first logical channel is allowed to be transmitted based on a configured grant of type 1; and
 receive, from the wireless device while in the RRC inactive state, data of the first logical channel based on:
  a second configured grant of type 1; and
  the second configuration parameter indicating that data of the first logical channel is allowed to be transmitted based on a configured grant of type 1 while the wireless device is in the RRC inactive state.

12. The base station of claim 11, wherein the instructions, when executed by the one or more processors, further cause the base station to transmit an RRC release message indicating transitioning from the RRC connected state to the RRC inactive state.

13. The base station of claim 12, wherein the RRC release message comprises one or more third configuration parameters for uplink data transmission in the RRC inactive state.

14. The base station of claim 13, wherein the receiving, from the wireless device while in the RRC inactive state, the data of the first logical channel is based on the one or more third configuration parameters.

15. The base station of claim 13, wherein the one or more third configuration parameters indicate a time alignment timer value of a time alignment timer.

16. The base station of claim 15, wherein the time alignment timer is started with the time alignment timer value in response to a transitioning from the RRC connected state to the RRC inactive state.

17. The base station of claim 15, wherein the receiving, from the wireless device while in the RRC inactive state, the data of the first logical channel is based on the time alignment timer running.

18. The base station of claim 13, wherein the one or more third configuration parameters comprise configured grant configuration parameters.

19. The base station of claim 18, wherein the second configured grant is based on the configured grant configuration parameters.

20. The base station of claim 11, wherein the plurality of configured grant types comprise a type 2.

* * * * *